(12) United States Patent
Reynolds et al.

(10) Patent No.: US 6,791,738 B2
(45) Date of Patent: Sep. 14, 2004

(54) ELECTROCHROMIC POLYMERS AND POLYMER ELECTROCHROMIC DEVICES

(75) Inventors: John R. Reynolds, Gainesville, FL (US); Kyukwan Zong, Spartanburg, SC (US); Irina Schwendeman, Pittsburgh, PA (US); Gursel Sonmez, Los Angeles, CA (US); Philippe Schottland, Evansville, IN (US); Avni A. Argun, Gainesville, FL (US); Pierre-Henri Aubert, Port-sur-Saone (FR)

(73) Assignee: University of Florida, Gainesville, FL (US)

( * ) Notice: Subject to any disclaimer, the term of this patent is extended or adjusted under 35 U.S.C. 154(b) by 47 days.

(21) Appl. No.: 10/302,164

(22) Filed: Nov. 21, 2002

(65) Prior Publication Data

US 2003/0174377 A1 Sep. 18, 2003

Related U.S. Application Data

(60) Provisional application No. 60/398,401, filed on Jul. 24, 2002, and provisional application No. 60/331,960, filed on Nov. 21, 2001.

(51) Int. Cl.$^7$ .............................. G02F 1/15; G02F 1/00

(52) U.S. Cl. ...................... 359/265; 359/273; 359/275; 252/583; 252/600

(58) Field of Search ................................ 359/265, 273, 359/275; 204/290.07; 428/426; 252/583, 600; 546/257; 544/347

(56) References Cited

U.S. PATENT DOCUMENTS

| | | |
|---|---|---|
| 5,446,577 A | 8/1995 | Bennett et al. |
| 5,995,273 A | 11/1999 | Chandrasekhar |
| 6,466,355 B1 * | 10/2002 | Berneth et al. ............. 359/265 |

OTHER PUBLICATIONS

Sapp et al., "High Contrast Ratio and Fast—Switching Dual Polymer Electrochromic Devices," Chem. Mater., 10:2101–2108, 1998.

Thompson et al., "In Situ Colorimetric Analysis of Electrochromic Polymers and Devices," Chem. Mater., 12:1563–1571, 2000.

Schwendeman et al., "Combined Visible and Infrared Electrochromism Using Dual Polymer Devices," Adv. Mater., 13:634–637, 2001.

Zong et al., "3, 4—Alkylenedioxypyrroles: Functionalized Derivatives as Monomers for New Electron—Rich Conducting and Electroactive Polymers," J. Org. Chem., 66:6873–6882, 2001.

(List continued on next page.)

*Primary Examiner*—Hung Xuan Dang
*Assistant Examiner*—Tuyen Tra
(74) *Attorney, Agent, or Firm*—Akerman Senterfitt

(57) ABSTRACT

The subject invention pertains to electrochromic polymers and polymer electrochromic devices. In a specific embodiment, two complementary polymers can be matched and incorporated into dual polymer electrochromic devices. The anodically coloring polymers in accordance with the subject invention can allow control over the color, brightness, and environmental stability of an electrochromic window. In addition, high device contrast ratios, high transmittance changes, and high luminance changes can be achieved, along with half-second switching times for full color change. Also provided are electrochromic devices such as advertising signage, video monitors, stadium scoreboards, computers, announcement boards, warning systems for cell phones, warning/information systems for automobiles, greeting cards, electrochromic windows, billboards, electronic books, and electrical wiring. The subject invention also provides for the use of complementary electrochromic polymers in the manufacture of electrochromic devices. In some embodiments, the devices of the invention can be prepared using metal vapor deposition or line patterning.

25 Claims, 44 Drawing Sheets

OTHER PUBLICATIONS

Gaupp et al., "Poly (3, 4—ethylenedioxypyrrole): Organic Electrochemistry of a Highly Stable Electrochromic Polymer," Macromolecules, 33:1132–1133, 2000.

Schottland et al., "Poly (3,4—alkylenedioxypyrrole)s: Highly Stable Electronically Conducting and Electrochromic Polymers," Macromolecules, 33:7051–7061, 2000.

Kumar et al., "Conducting Poly (3, 4—alkylenedioxythiophene) Derivatives as Fast Electrochromics with High—Contrast Ratios," Chem. Mater., 10: 896–902, 1998.

Sotzing et al., "Low Band Gap Cyanovinylene Polymers Based on Ethylenedioxythiophene," Macromolecules, 31: 3750–3752, 1998.

* cited by examiner

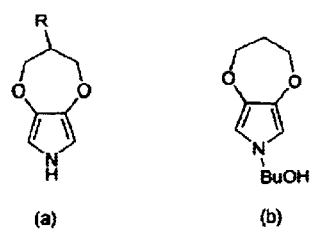
a-) C-alkylated ProDOPs (R= octyl, 2-ethylhexyl and dodecyl)
b-) N-substituted ProDOP-BuOH
FIG. 15
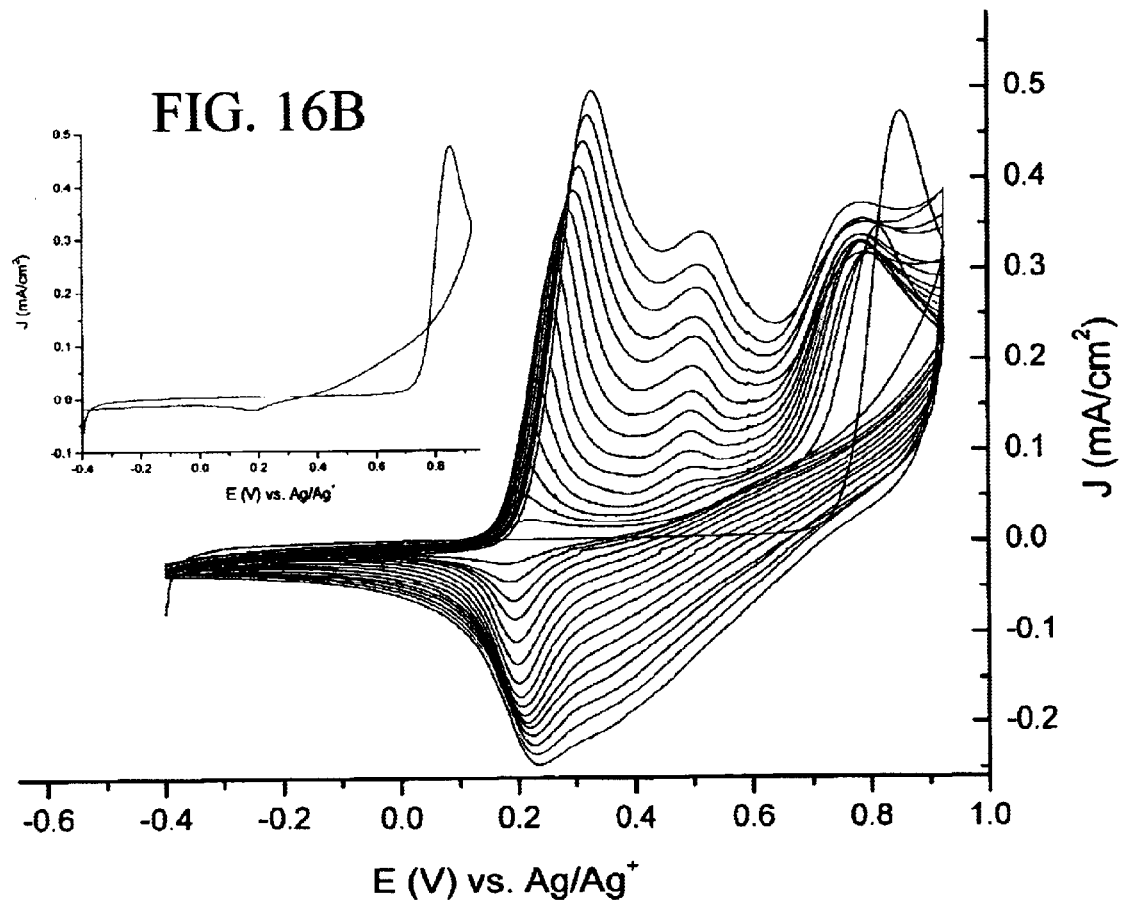
FIG. 16A
FIG. 16B

5a
EDOP

5b
ProDOP

5c
BuDOP

5d
ProDOP-Me

5e
ProDOP-Me$_2$

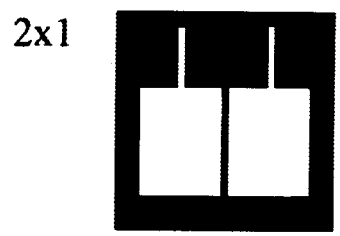
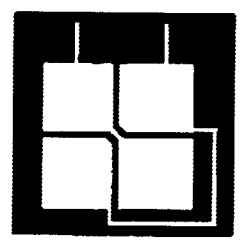
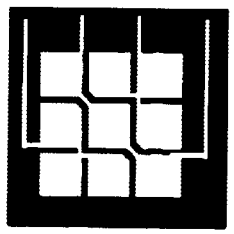
FIG. 35A      FIG. 35B      FIG. 35C
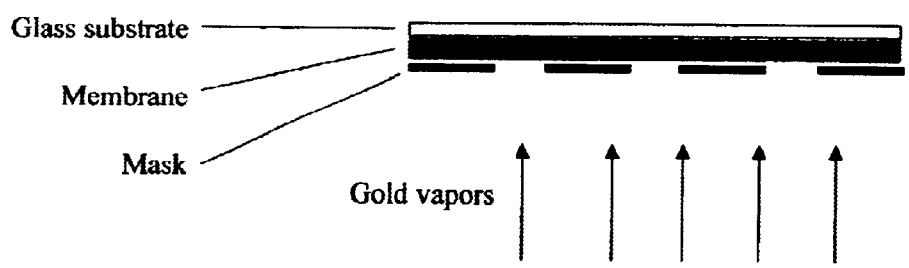
FIG. 35D
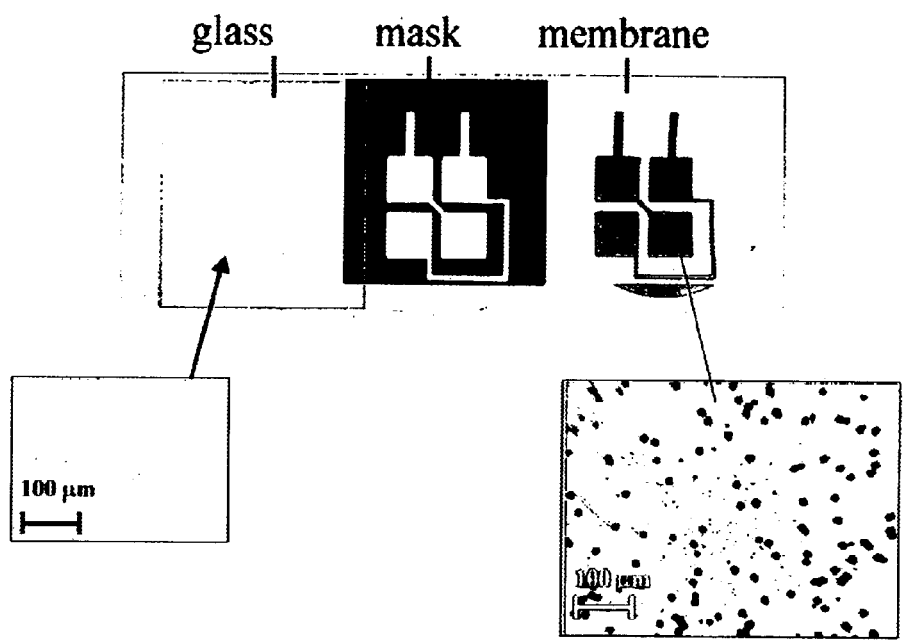
FIG. 35E

-1.2 V   0.4 V   0.7 V

Blue Region: ITO coated conducting plastic.
White Region: Non-conducting plastic.

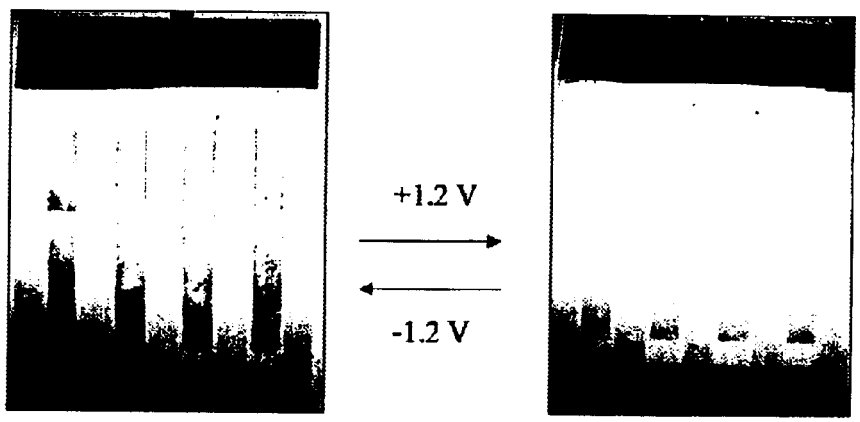
FIG. 48
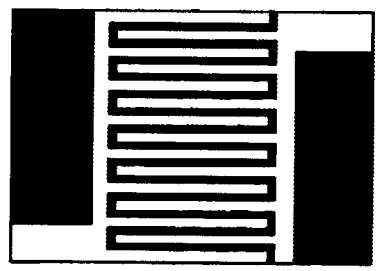
FIG. 49A
FIG. 49B
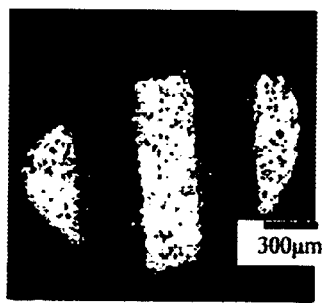 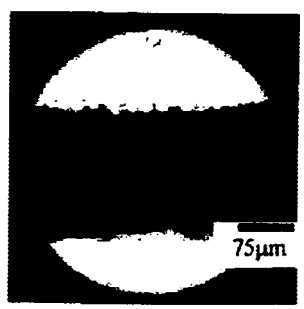 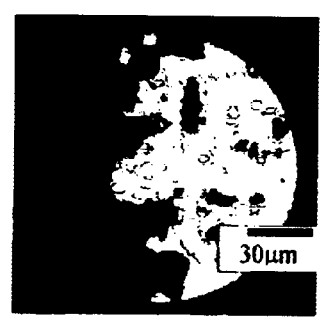
FIG. 50A   FIG. 50B   FIG. 50C

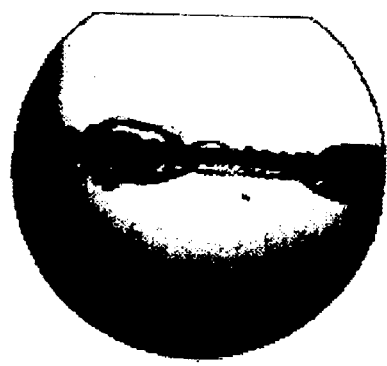
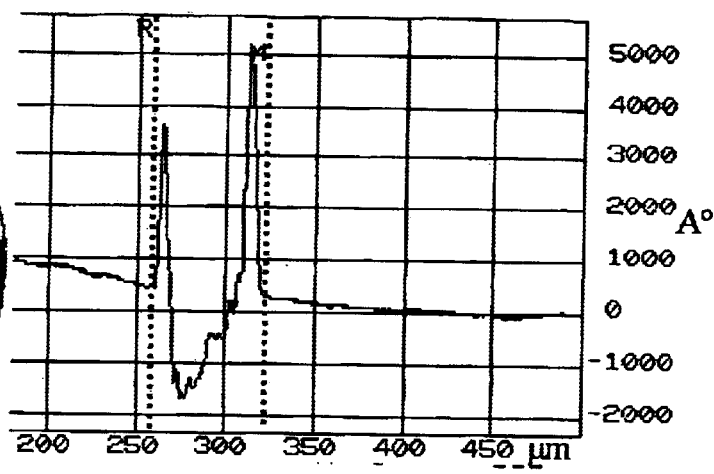
FIG. 54A  FIG. 54B
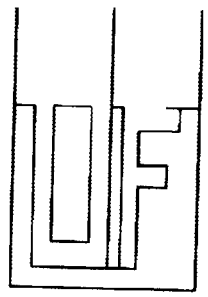
FIG. 55A
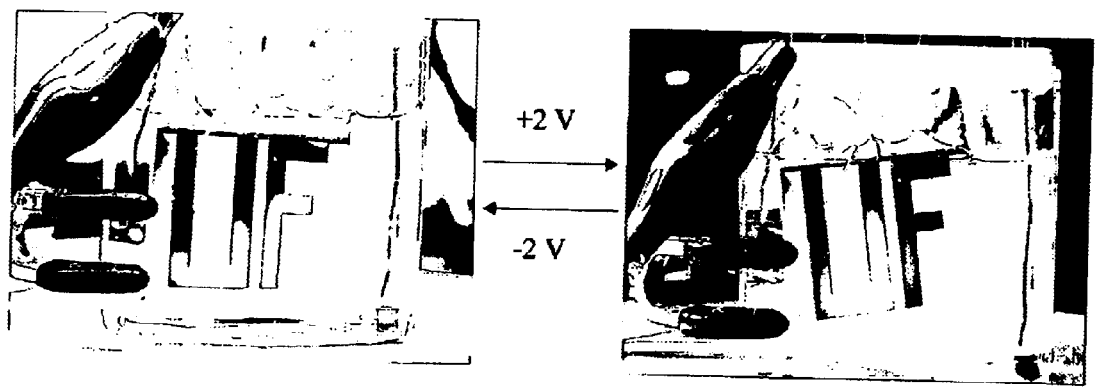
FIG. 55B

ELECTROCHROMIC POLYMERS AND POLYMER ELECTROCHROMIC DEVICES

The subject invention was made with government support under a research project supported by Air Force Office of Scientific Research/PKS (#49620-00-1-0047); Army Research Office (#DAAD19-00-1-002); National Science Foundation (#CHE9629854); and Office of Naval Research (#N000014-00-1-0164).

INCORPORATION OF RELATED APPLICATIONS

This application hereby incorporates each of the provisional applications, as listed on the Application Data Sheet that is associated with the subject application, by reference and in their entireties, including any figures, tables, chemical formulas, and/or drawings.

BACKGROUND OF INVENTION

There are numerous processes responsible for the modulation of visible light. Among them, electrochromic techniques can use the reversible change of color and/or optical density obtained by an electrochemical redox process in which the oxidized and the reduced forms have different colors, indices of refraction, or optical densities. These techniques are readily employed in a multitude of applications such as display panels (1), camouflage materials (2), variable reflectance mirrors (3), variable optical attenuators and variable transmittance windows (4, 5, 6). For example, the Gentex electrochromic mirror system has been successfully commercialized in the automotive industry.

Electrochromic devices (ECDs) based on inorganic semiconductors have a long history, and their performance has improved steadily since their creation (7). When viewed in this context, the recent rapid progress made with organic conducting and electroactive polymers in a variety of fields suggests they may find numerous practical applications in the near term (8). These materials have made valuable contributions to the emerging fields of electrochromic devices (4), as well as organic light emitting diodes (9, 10) and photovoltaics (11). In terms of electrochromics, the remarkable advances in their performance can be viewed from several fronts. First, the range of colors now available effectively spans the entire visible spectrum (12) and also extends through the microwave, near-infrared and mid-infrared regions. This is due to the ability to synthesize a wide variety of polymers with varied degrees of electron-rich character and conjugation. For example, a fine adjustment of the band gap, and consequently of the color, is possible through modification of the structure of the polymer via monomer functionalization (13), copolymerization (14), and the use of blends, laminates and composites (15, 16). Second has been the marked increase in device lifetimes. The key to this is control of the degradation processes within the polymeric materials (by lowering the occurrence of structural defects during polymerization) and the redox system (17, 18). Third, the polymer based ECDs have achieved extremely fast switching times (milliseconds) for large changes in optical density. This fast switching is attributed to a highly open morphology of electroactive films, which allows for fast dopant ion transport (19). Other beneficial properties of polymers are outstanding coloration efficiencies (20) along with their general proccessability.

BRIEF DESCRIPTION OF FIGURES

FIG. 1 The superimposition of the UV-Vis-NIR spectra of individual polymer films deposited on ITO/glass substrates.

FIG. 15. Chemical structures of derivatized ProDOPs.

FIG. 16. Cyclic voltammetric electrodeposition of ProDOP-BuOH on a Pt button electrode at 20 mV/sec. Inset shows the irreversible monomer oxidation and nucleation loop in the first scan. Soluble PProDOP derivatives. The C-alkylated PProDOPs were chemically polymerized by ferric chloride in methanol or chloroform. Higher yields were obtained when methanol was used as a solvent (~90%).

FIGS. 35A–F: Fabrication of patterned ECDs by metal vapor deposition (MVD).

(A–C) Design of the masks used to pattern metal on a planar surface. Left: 2×1 pixels. Middle: 2×2 pixels. Right: 3×3 pixels.

(D) Schematic showing MVD process to coat surfaces with patterned metal electrodes.

(E) Gold electrode patterned on porous polycarbonate membrane. Left picture (and its optical magnification—40×) shows the gold spots (size around 10 μm) deposited on a glass substrate through the pores. Middle picture shows the 2×2 mask used during this process. Right picture shows the gold layer deposited on the polycarbonate membrane. The optical magnification of the picture indicates the porous nature of the gold electrode.

(F) Schematic cross-section view of an ECD construction with a porous membrane.

Figure 36:
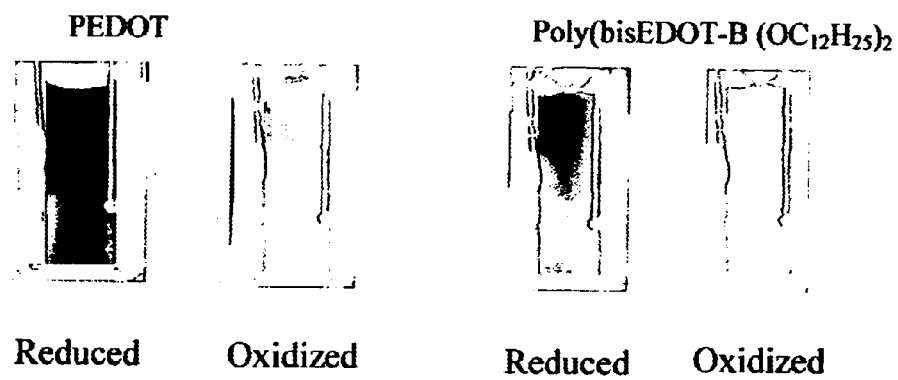

FIG. 36: Photographs of PEDOT and PBEDOT-B $(OC_{12}H_{25})_2$ potentiostatically reduced (left) and oxidized (right) in 0.1M TBAP/ACN electrolyte. The films were deposited on an ITO/glass electrode (1 cm$^2$) using 20 mC of deposition charge.

Figure 37A:
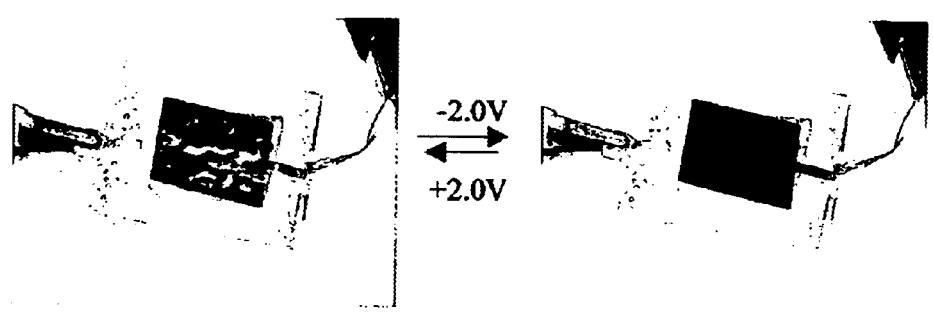
Figure 37B:
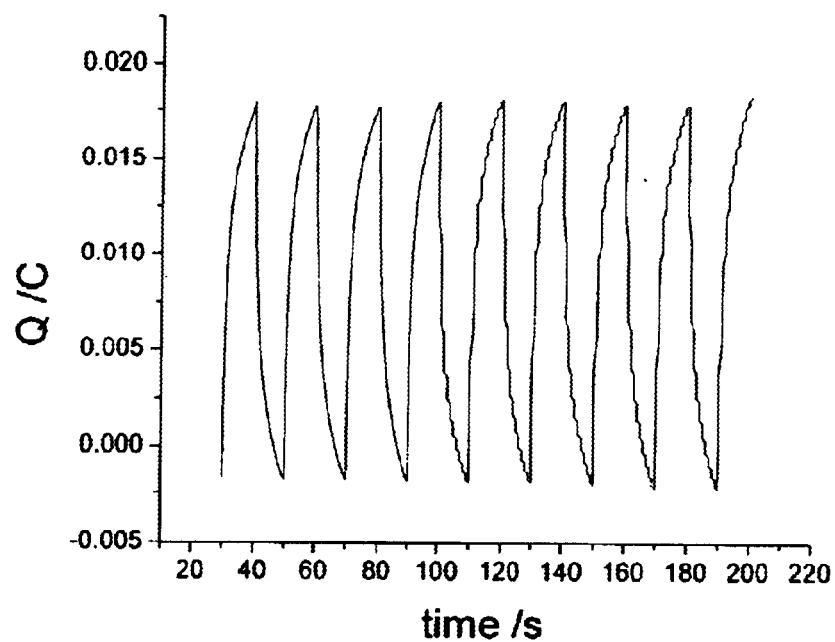

FIGS. 37A–B: Photograph of a 1-pixel device built according FIG. 35F (D2) using PEDOT both as active surface layer and counter-electrode.

(A) Bleached and colored switching states of the active surface layer.

(B) Time dependence of the charge/discharge during the switching process.

Figure 38:
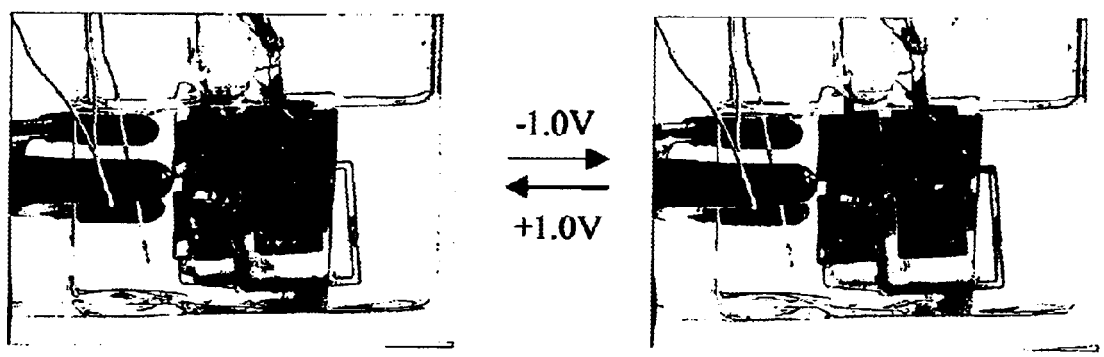

FIG. 38: Photographs of the electrochemical setup of the 2×2 pixel device during switching in 0.1M TBAP/PC, displaying a full reflective to a full colored surface.

Figure 39C:
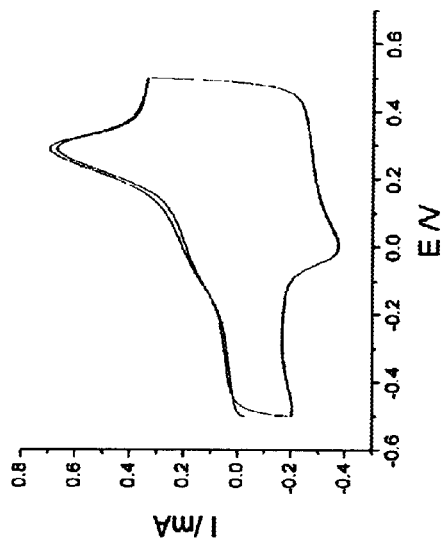
Figure 39B:
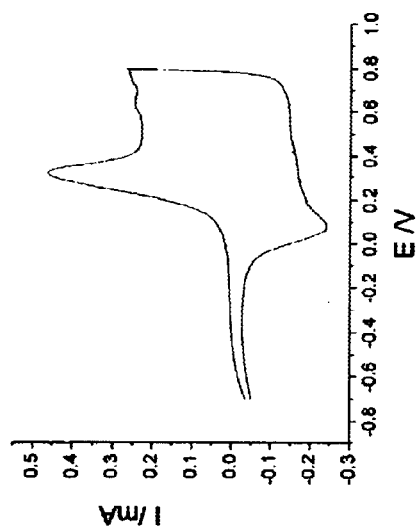
Figure 39A:
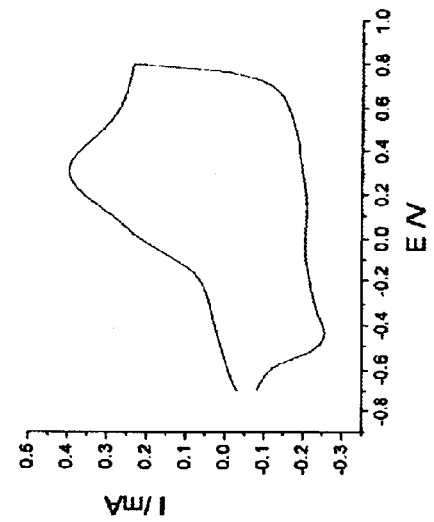

FIGS. 39A–C: CV of PEDOT (39A), PBEDOT-B $(OC_{12}H_{25})_2$ (39B) and the films together (39C) in 0.1M TBAP/PC at 100, 100 and 50 mV/s, respectively for the films in FIG. 38.

Figure 40:
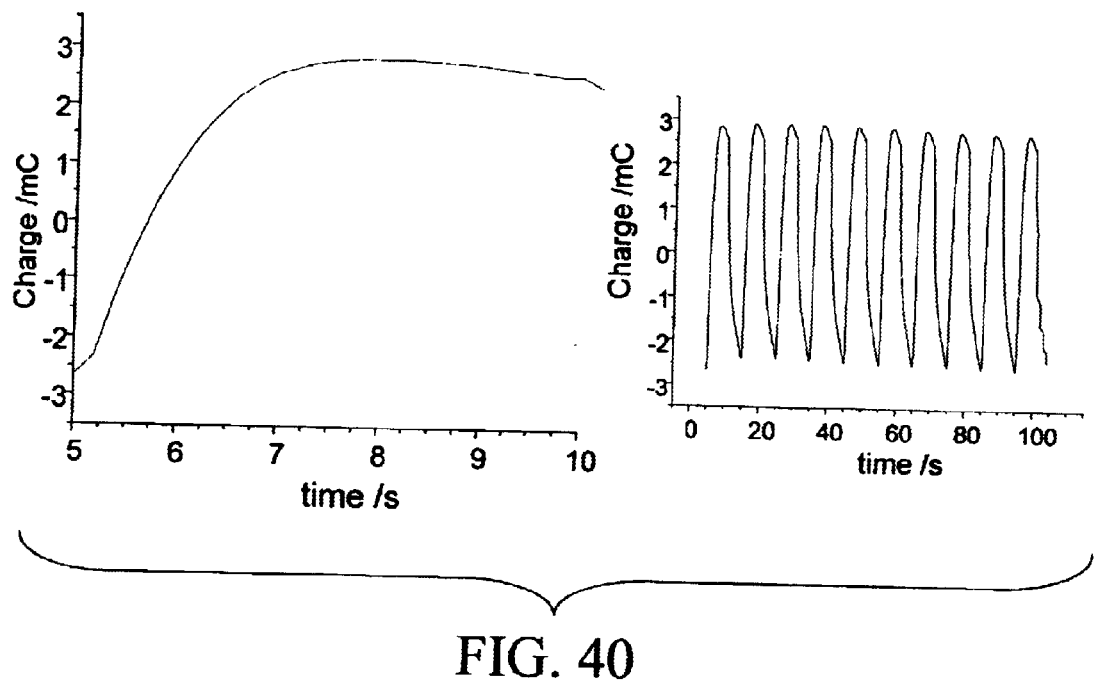

FIG. 40: Charge accumulation of the two films in FIG. 38 in 0.1M TBAP/PC showing the bleached-to-colored transition as a function of time. Inset: time dependence of the repetitive charge/discharge process under the same experimental conditions.

Figure 41:
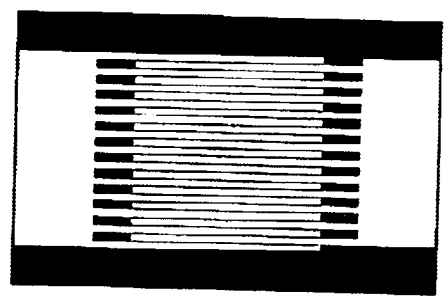

FIG. 41: Schematic diagram of Baytron P® coated, interdigitated transparency film substrate. The color shown in the scheme is the actual color of coated films measured by a Minolta CS-100 colorimeter.

Figure 42:
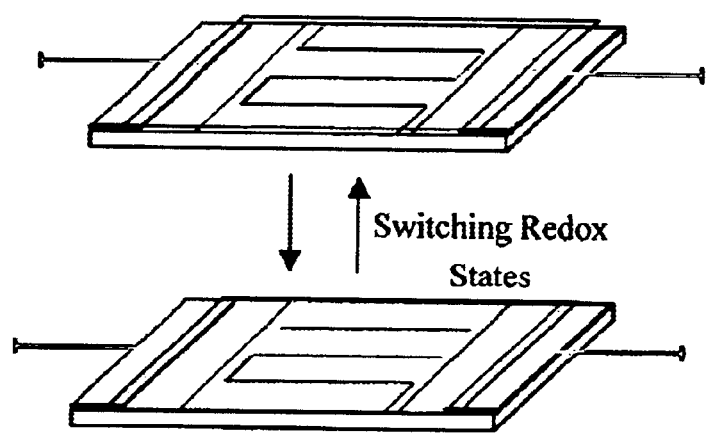

FIG. 42: Schematic depiction of the electrochromic switching of a laterally patterned device between transmissive and colored states. This device comprises two polymers on the same surface.

Figure 43:
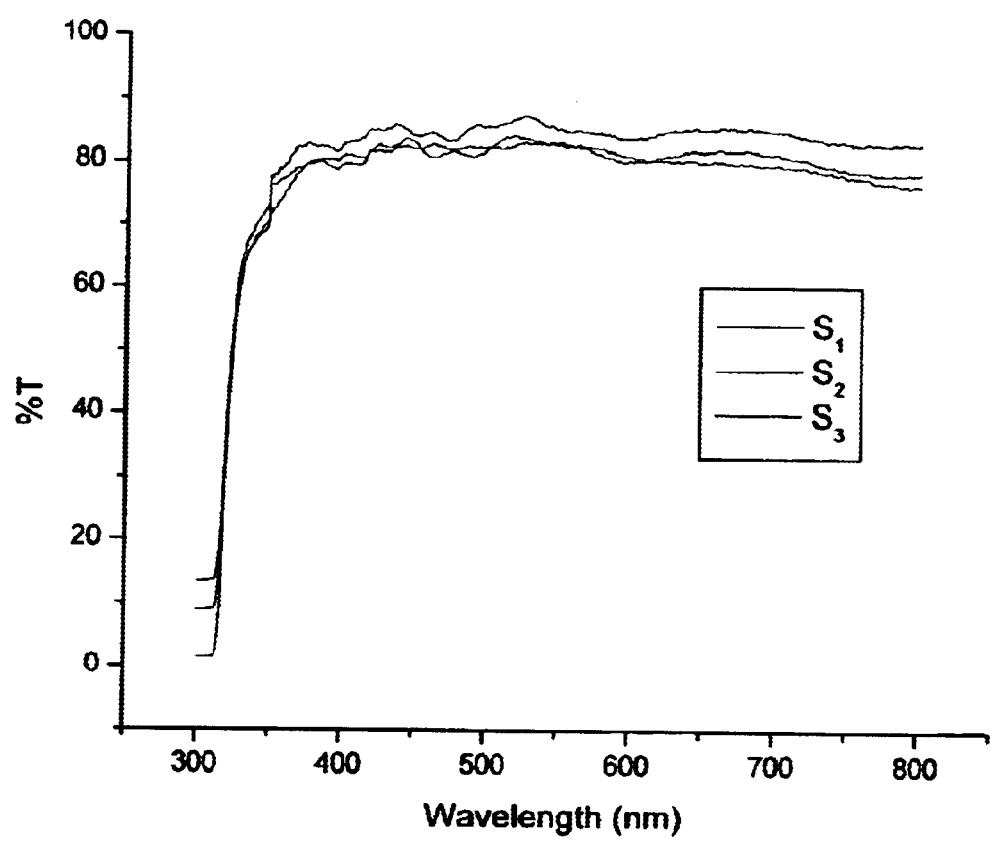

FIG. 43: Percent transmittance (%T) of line patterned, PEDOT coated transparency film substrates ($S_1$=one coat PEDOT, $S_2$=two coats PEDOT, $S_3$=three coats PEDOT).

Figure 44A:
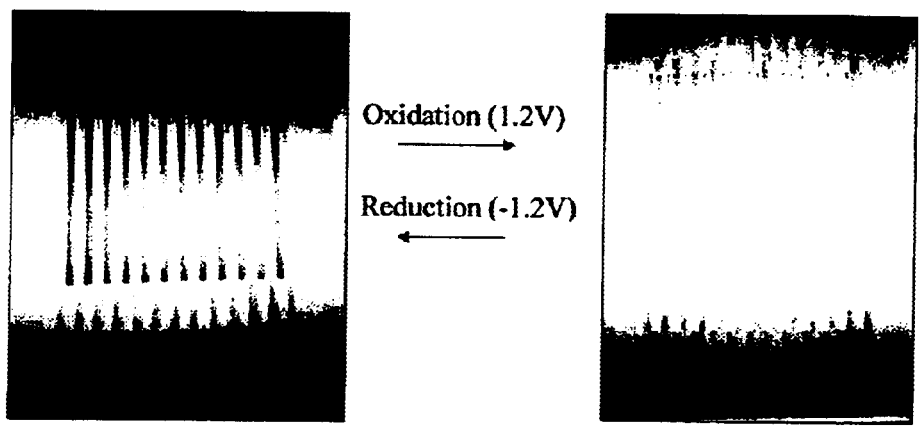
Figure 44B:
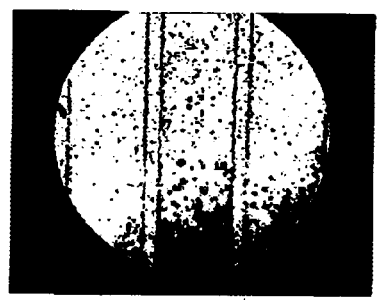

FIGS. 44A–B: Photographs of EC PEDOT deposited on a line patterned PEDOT interdigitated electrode. FIG. 44A shows the electrochromic switching of the PEDOT between its redox states. PEDOT deposited area ~3 cm$^2$, deposition charge ~14 mC/cm$^2$. FIG. 44B shows an optical micrograph of PEDOT deposited (middle line) and non-deposited lines.

Figure 45:
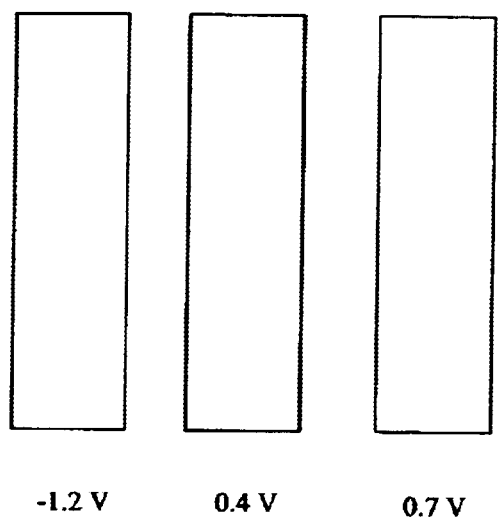

FIG. 45: Color change of PBEDOT-Cz on Baytron P® coated electrode at various potentials based on L*a*b values recorded by Minolta CS-100 colorimeter.

Figure 46:
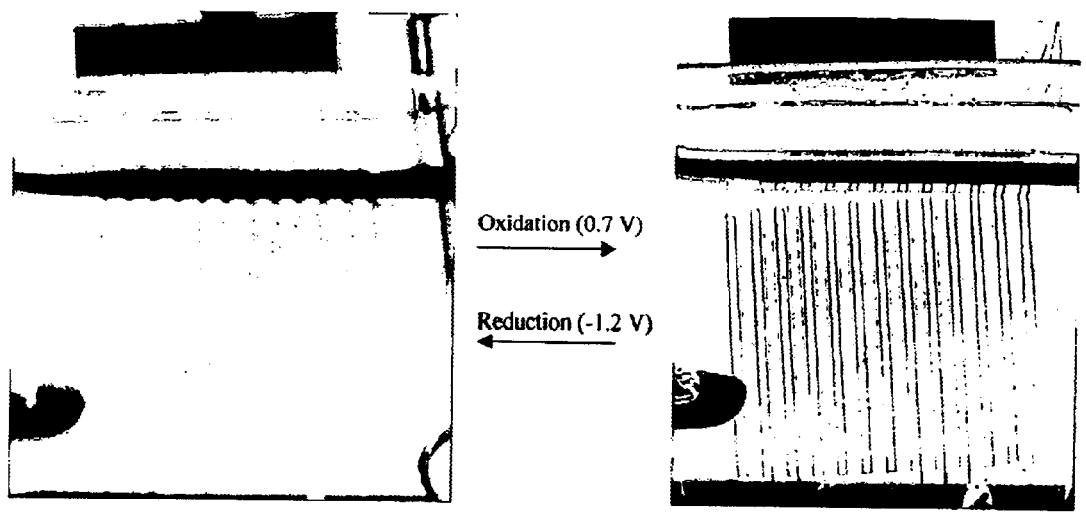

FIG. 46: Photograph of electrochromic switching of PBEDOT-Cz in TBAP (0.1M)/ACN electrolyte solution on a PEDOT, line patterned interdigitated electrode.

Figure 47:
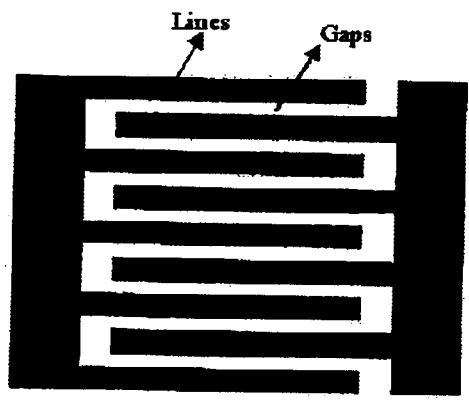

FIG. 47: Schematic illustration of an interdigitated, ITO-coated plastic substrate created with line patterning.

FIG. 48: Photograph demonstrating electrochromic switching of PEDOT on an ITO coated, interdigitated transparency film substrate.

FIGS. 49A–B: Interdigitated electrode designs for electroless gold deposition.

FIGS. 50A–C: Optical micrographs of interdigitated, gold deposited transparency films by line patterning. Patterned lines are shown under (A) 10×, (B) 40×, and (C) 100× magnification.

Figure 51:
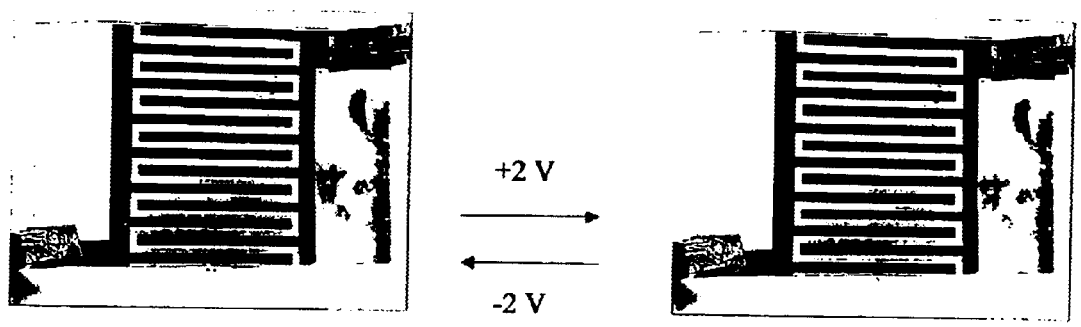

FIG. 51: Photograph demonstrating EC switching of (PEDOT-PEDOT) on line patterned gold in a solid-state device with interdigitated electrodes (IDE).

Figure 52:
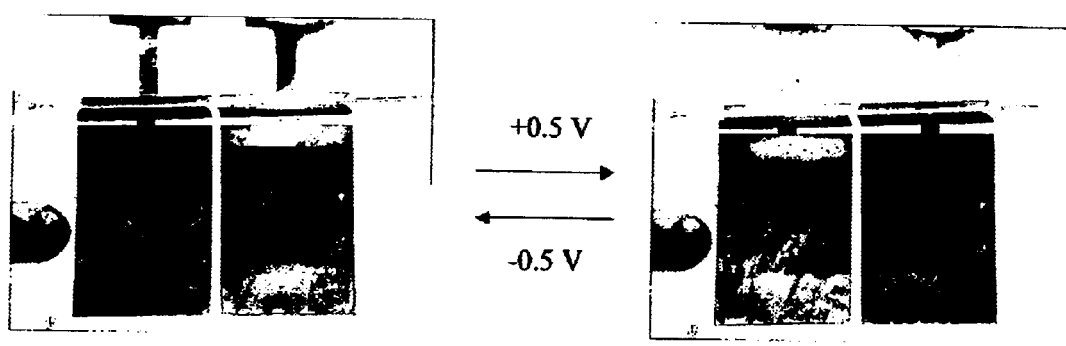

FIG. 52: Photograph demonstrating EC switching of a 2-pixel (PEDOT-PEDOT) line patterned gold device in a 0.1M LiClO$_4$/PC electrolyte solution.

Figure 53:
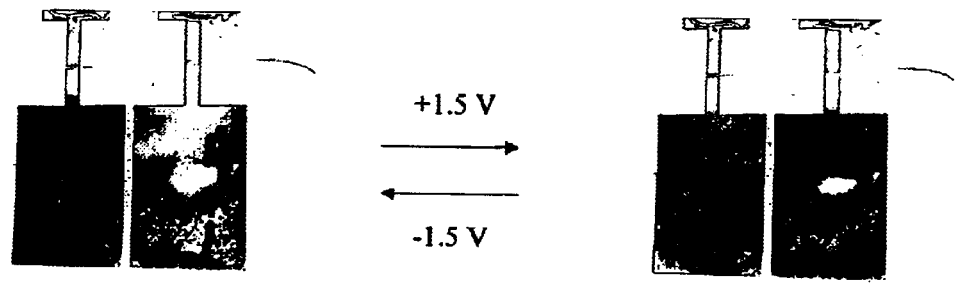

FIG. 53: Photograph demonstrating EC switching of a 2-pixel solid-state (PEDOT-PEDOT) line patterned gold device.

FIGS. 54A–B: FIG. 54A shows an optical micrograph of a scorched line on ITO/glass substrate. Lateral resolution of the lines was determined to be 60 μm. FIG. 54B shows the profilometric scan of a scorched line. Lines drawn on ITO/glass by this method resulted in insulation of patterned regions by >20 MΩ.

FIGS. 55A–B: FIG. 55A is a UF design applied on ITO/polyester substrate. FIG. 55B depicts electrochromic switching of a (P3MTh—P3MTh) based UF device in 0.1 M TBAP/ACN solution.

Figures 56A, 56B:
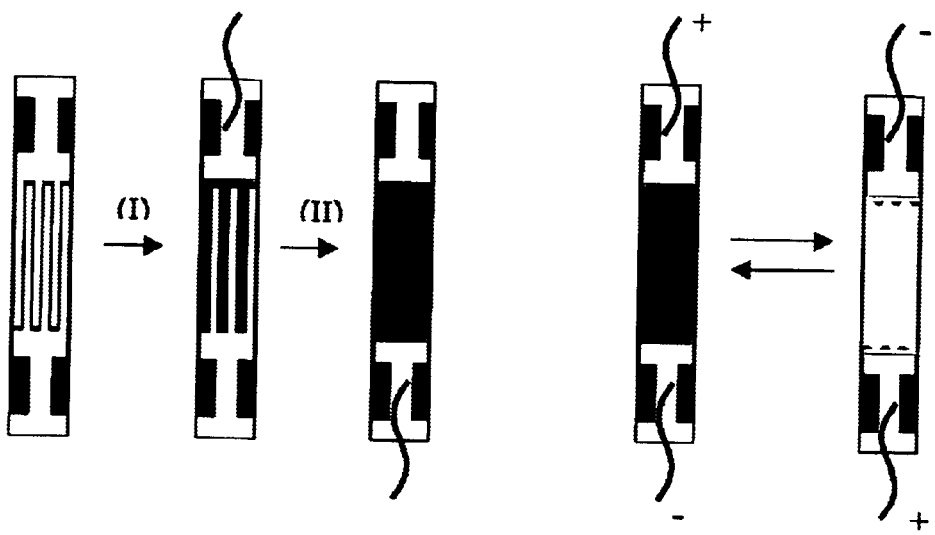

FIGS. 56A–56B: Schematic representation of an interdigitated lateral ECD. FIG. 56A shows separate electropolymerization on interdigitated fingers (I and II). Black areas represent the non-conducting sites. White areas are conducting. FIG. 56B illustrates EC switching of the lateral device between its redox and complementary colored states.

Figures 57A, 57B:
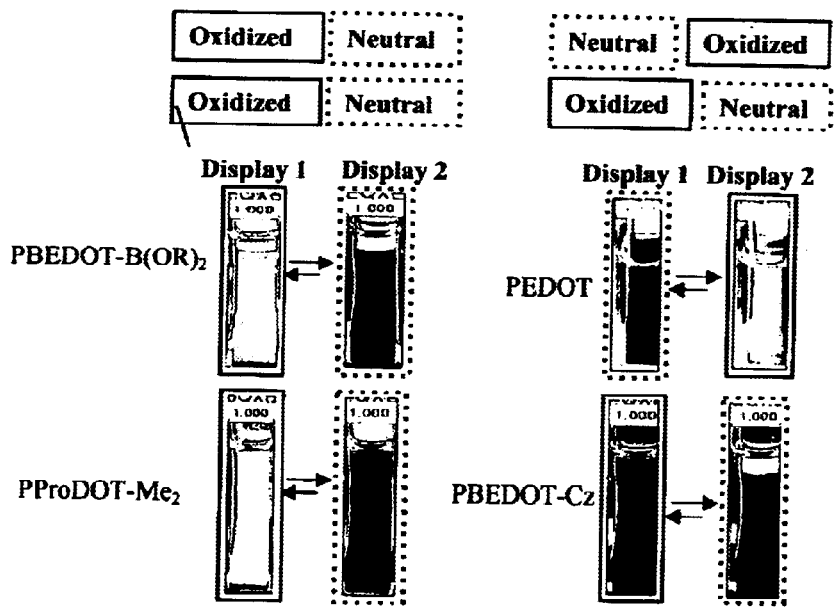

FIGS. 57A–B: Polymer pairs exhibiting high contrast display (left top and bottom) and color match (right top and bottom) using the same bias (FIG. 57A) and opposite bias (FIG. 57B) built devices.

Figures 58A, 58B, 58C:
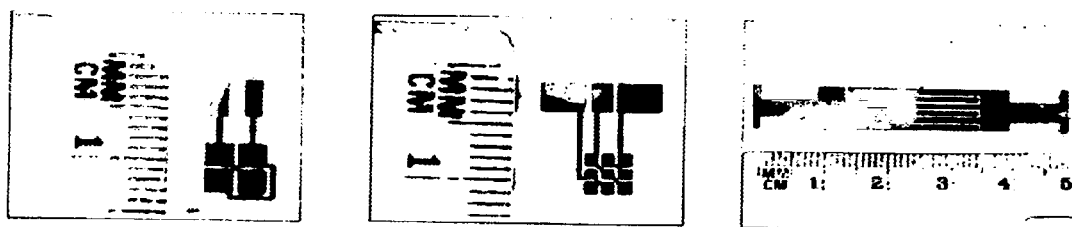

FIGS. 58A–58C: Photographs of gold patterned electrodes obtained by the line patterning method (FIG. 58A: 2×2 pixels electrode, FIG. 58B: 3×3 pixels electrode and FIG. 58C: interdigitated electrode).

BRIEF DESCRIPTIONS OF THE TABLES

Table 1. Oxidation potentials, the ratio between anodic and cathodic peak potentials ($i_{pa}/i_{pc}$), peak separation ($\Delta E_p$), wavelength maximum ($\lambda_{max}$) and band gap ($E_g$) of PProDOPs.

Table 2. Colors observed at different oxidation levels in N-Me PProDOP and N-Gly PProDOP with coordinates expressed in the CIE 1931 Yxy and CIE 1976 L*a*b* color spaces.

Table 3: Specific electrochromic polymers.

Table 4: General electrochromic polymers.

Table 5: Exemplary complementary electrochromic polymers.

Table 6: Exemplary complementary EC polymers and colors.

Table 7: Exemplary complementary EC polymers and colors.

Table 8: General patterning methods.

BRIEF DESCRIPTION OF THE INVENTION

In electrochromic materials, electrochemical oxidation or reduction induces a reversible change in the reflected or transmitted light. Since its discovery in inorganic materials,[21] this ability has aroused the interest of scientists over the past thirty years.[22] Electrochromic properties have proved especially useful or promising for the construction of mirrors,[23] displays,[24,25] windows[26,27,28,29,30] and earth-tone chameleon materials.[31,32,33] Based on this concept, electrochromic rearview[34,35] and exterior wing mirrors have been recently commercialized in the automotive industry.

Even though the first electrochromic devices studied were produced using inorganic compounds like tungsten trioxide ($WO_3$) and iridium dioxide ($IrO_2$),[36] organic compounds have proven interesting for electrochromics including: viologens, metallophtalocyanines and conducting polymers.[37] Different electronic spectra, and therefore different colors, can be observed while switching these compounds between their different redox states. The possibility of combining a lower processing cost with enhanced electrochromic contrast and switching speed has focused the interest of scientists on the use of conducting polymers.[38,39] Indeed, the extended delocalization of the π electrons along the polymer backbone (in the neutral state) results in an optical absorption band (π–π* transition) in the visible region of the electromagnetic spectrum. A redox process (oxidation or reduction) will generate charge carriers in the conjugated backbone which results respectively in the insertion of an anion or a cation. Conducting polymers have several advantages over inorganic compounds as electrochromic materials. First is their outstanding coloration efficiency and fast switching ability, as exhibited by poly(3,4-alkylenedioxythiophene) (PXDOTs) derivatives.[40,41] Second is the ability to produce multiple colors with the same material.[33] Finally, a fine tuning of the band gap, and therefore of the color, is possible through modification of the chemical structure of the polymer.[33,42,43] This listing of the advantages of conducting polymers over inorganic materials would not be complete without mentioning that, if soluble polymers are obtained, low-cost processing techniques like printing (e.g., inkjet, lithographic, gravure, laser, etc.), spin-coating, or spray-coating can be used.

DETAILED DESCRIPTION OF INVENTION

Figure 5:
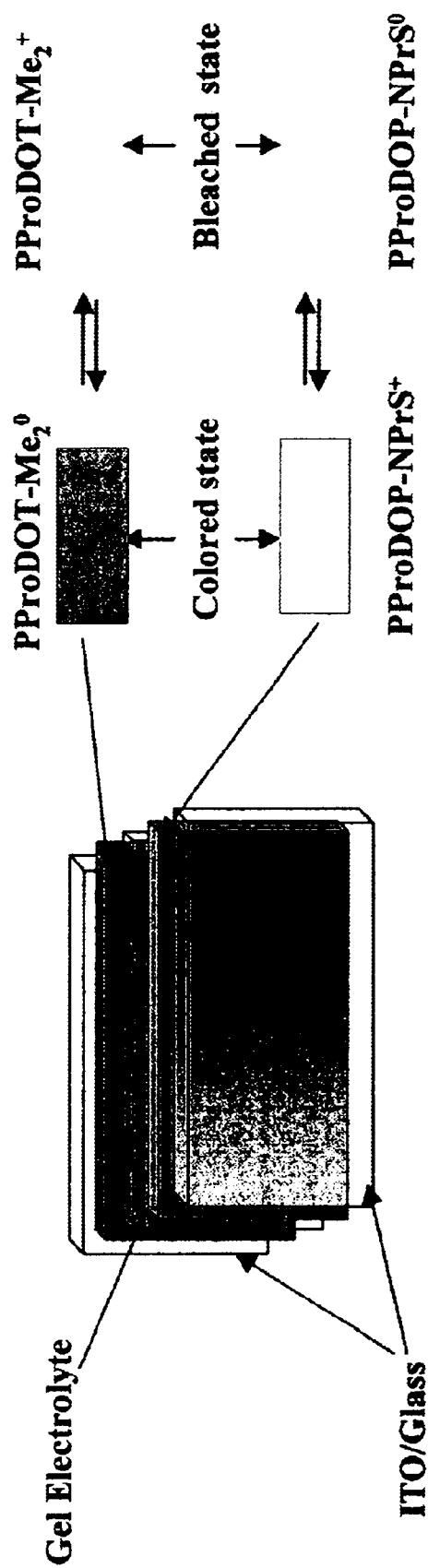
FIG. 5 Schematic representation of a transmissive type ECD. It consists of two polymer thin films deposited on transparent indium tin oxide coated glass (ITO) and separated by a viscous gel electrolyte based on LiN(CF$_3$SO$_2$)$_2$ dissolved in an acetonitrile/propylene carbonate swollen poly(methyl methacrylate) matrix. The device construction is carried out with one polymer oxidatively doped while the other is neutral, and both films are simultaneously in either their transmissive or absorptive states. As such, the device is observed as bleached or colored. Application of a voltage neutralizes the doped polymer with concurrent oxidation of the complementary polymer, inducing color formation, or bleaching. PProDOT-Me$_2$ switches from a highly transmissive light blue in the doped state to a dark blue-purple in the neutral state while PProDOP-NPrS switches from a gray-green state to an almost clear neutral state. The color representations shown are L*a*b* determined color coordinates.

A specific embodiment of a transmissive type electrochromic is shown schematically in FIG. 5. Matching the number of redox sites in each film can enhance the contrast of a device, as the extremes of absorption and transmission can be attained. A cathodically coloring polymer can be defined as one that passes from an almost transparent state to a highly colored state upon charge neutralization (reduction) of the p-doped form, while an anodically coloring polymer can be defined as one which is highly transmissive neutral and absorbs in the oxidatively doped state.

The subject devices can incorporate conducting polymers based on poly(3,4-ethylenedioxythiophene) (PEDOT) and its derivatives, which can exhibit high electrochromic contrasts, low oxidation potentials, high conductivity, as well as good electrochemical and thermal stability (13). For example, dimethyl substituted poly(3,4-propylenedioxythiophene) (PProDOT-Me$_2$) can be used as a cathodically coloring polymer for use in the subject electrochromic devices. Advantageously, PProDOT-Me$_2$ shows a high contrast in the visible region: about 78% at $\lambda_{max}$ (580 nm) and a luminance change of about 60% measured by colorimetry. This high contrast at 580 nm corresponds to a wavelength where the human eye is highly sensitive, the polymer switching from a highly transmissive light blue in the doped state to a dark blue-purple in the neutral state. Accordingly, PProDOT-Me$_2$ can be incorporated into a variable reflectance ECD showing a remarkably high contrast throughout the visible, NIR and mid-IR regions of the electromagnetic spectrum. In a specific embodiment, such a device can allow for thousands to hundreds of thousands of deep double cycles with little loss in contrast.

An anodically coloring polymer can be chosen to have a high band gap ($E_g$)>3.0 eV (π to π* transition onset<410 nm) with all of the absorption lying in the ultraviolet region of the spectrum. In addition to complementary optical properties, preferred ECD operation can include a high degree of electrochemical reversibility and compatibility. Many high gap conjugated polymers (e.g. poly(phenylene vinylene) (PPV), poly(p-phenylene) (PPP), etc.) have high oxidation potentials. In a specific embodiment, the subject invention pertains to easily electrochemically polymerized monomers that can yield polymers having complementary EC properties to the cathodically coloring PProDOT-Me$_2$ so as to achieve an ECD that can undergo a distinct switch from a highly transmissive state to a deeply absorptive state.

Several anodically coloring polymers based on carbazole, biphenyl, and other aromatic units linked via electropolymerizable EDOT moieties have been synthesized(44, 45). While ECDs incorporating these types of polymers showed outstanding coloration efficiencies, lifetimes and switching times (18, 19), the band gaps of the anodically coloring polymers are not sufficiently high for the π–π* absorption to be excluded from the visible region providing a coloration to the transmissive state of the devices. The subject invention relates to the synthesis and electropolymerization and redox switching properties of a new series of conducting polymers based on 3,4-alkylenedioxypyrroles and 3,4-alkylenedioxythiophenes. As pyrroles have somewhat elevated LUMO levels, the band gaps for PEDOP (2.0 eV) and the propylene bridged analog (PProDOP, 2.2 eV) are higher than their thiophene counterparts (PEDOT and PProDOT) which have band gaps of 1.6–1.7 eV.

The subject invention also relates to a series of N-substituted ProDOPs, which can elevate the band gap of the dioxypyrrole polymers even further. In addition to the advantage of this high gap, these polymers can preserve the electron rich character of the PXDOP family, allowing their electrosynthesis and switching under mild conditions. Polymerization can be forced through the 2- and 5-positions as desired giving rise to a material with few structural defects and consequently better electrochemical cyclability when compared to the parent polypyrrole. Finally, N-alkyl substitution inductively increases the electron density in the monomer, thus exhibiting a lower oxidation potential than the underivatized ProDOP. In a specific embodiment, N-propane sulfonated PProDOP (PProDOP-NPrS) can allow the onset of the π–π* transition to be located at the boundary of the visible and ultraviolet regions of the spectrum ($E_g$>3.0 eV). As such, the electronic absorption is transferred to the UV and the polymer is colorless in the neutral state. In addition, PProDOP-NPrS exhibits a relatively fast deposition rate and good film quality, along with attaining a colored doped state.

Figures 1A, 1B:
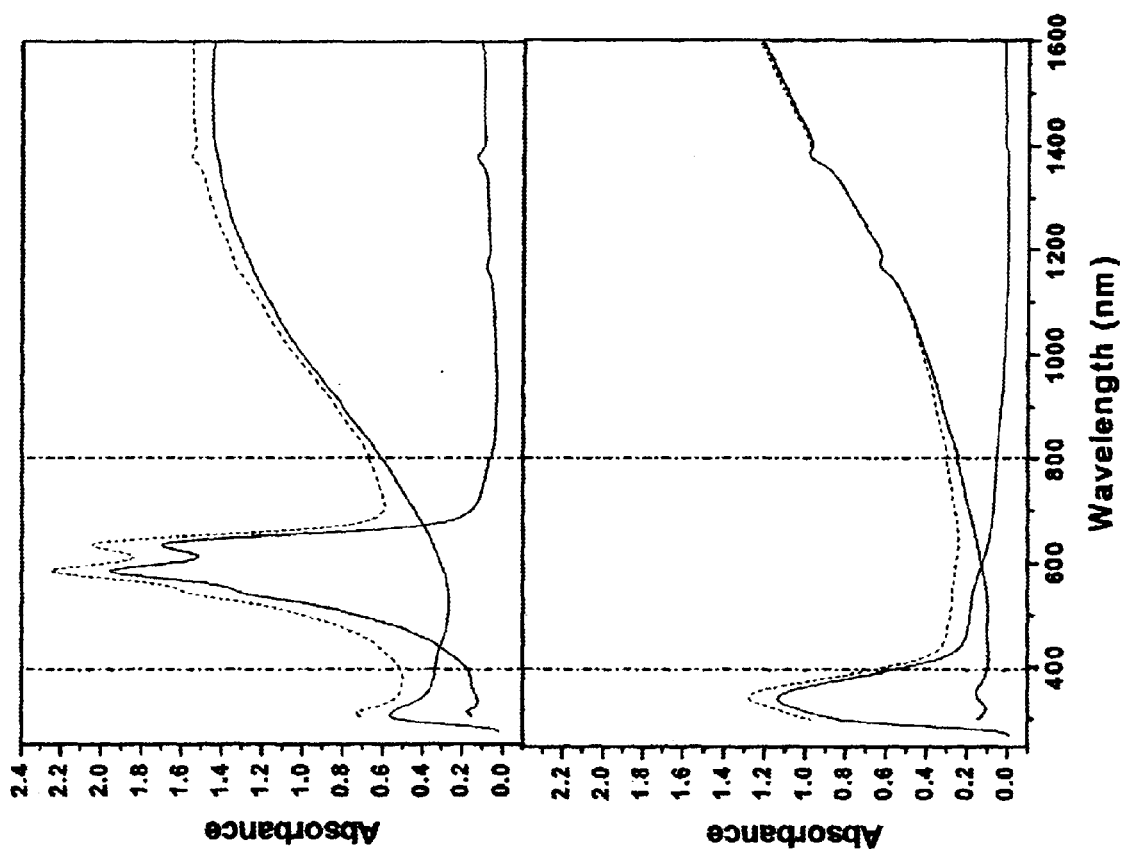
FIG. 1A represents the polymers' absorptive states where PProDOP-NPrS is in the oxidized form and PProDOT-Me$_2$ is in the neutral form. The summation of the two absorption spectra (dashed trace) represents the most probable behavior of the colored state of a device based on these two polymers.
FIG. 1B represents the bleached state of the polymer films. The sum of the neutral PProDOP-NPrS and doped PProDOT-Me$_2$ spectra (dashed trace) provide a high contrast with the colored state throughout the entire visible region, generating a highly transmissive device. For clarification purposes, the visible region of the spectrum (400–800 nm) is marked with dashed vertical lines. All experiments were carried out using a Varian Carry 5E Spectrophotometer. The polymers were switched in a specially designed three-electrode spectroeletrochemical cell.

The subject invention can attain high contrast in dual polymer ECDs by matching the anodically and cathodically properties in order to obtain a color neutral, highly transmissive, window in one state, that shows low absorption throughout the entire visible region. Upon switching a small bias potential (ca. 1.0V) the window can be converted to a relatively colored dark state. FIGS. 1A and 1B demonstrate this by superimposing the UV-visible spectra of the individual polymers in their doped and neutral states. FIG. 1A represents the absorptive state where PProDOP-NPrS is in the oxidized state form and PProDOT-Me$_2$ is in the neutral form. The summation of the two absorption spectra represents the most probable behavior of the colored state of a device based on these two polymers. There are several factors that combine to attain a very saturated color and broadband absorbance window. First, neutral PProDOT-Me$_2$ has its absorption in the middle of the visible region ($\lambda_{max}$= 580 nm) where the human eye is the most sensitive. In addition, the vibrational splitting of the HOMO-LUMO transition broadens the absorption peak over a larger area of the visible spectrum. The absorption of the oxidatively doped PProDOP-NPrS begins at 500 nm, and its absorbance increases into the NIR region where the contribution from PProDOT-Me$_2$ is small. The bleached state of the polymer films and device is represented in FIG. 1B. The sum of the neutral PProDOP-NPrS and doped PProDOT-Me$_2$ spectra provide a high contrast with the colored state throughout the entire visible region, generating a highly transmissive device.

Figures 2A, 2B:
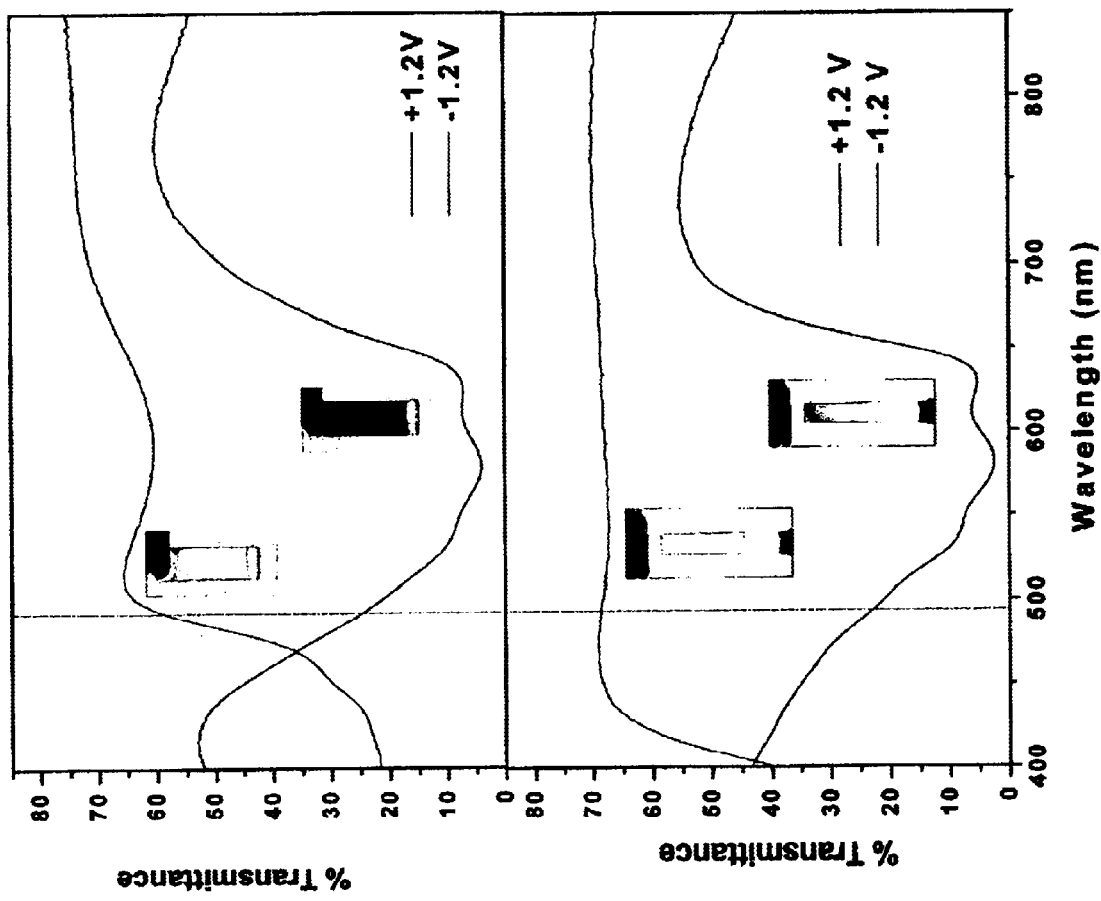
FIG. 2 Transmittance spectra and photographs of devices using PProDOT-Me$_2$ as the cathodically coloring polymer and PBEDOT-NMeCz (A) and PProDOP-NPrS (B) as the anodically coloring layers with the devices in the two extreme (colored and bleached) states. The dashed vertical line represents the onset of the cut-off of the neutral PBEDOT-NMeCz.

FIGS. 2A and 2B show the transmittance spectra and photographs of devices in accordance with the subject invention using PProDOT-Me$_2$ as the cathodically coloring polymer and poly[3,6-bis(2-ethylenedioxythienyl)-N-methyl-carbazole] (PBEDOT-NMeCz) (device A) and PProDOP-NPrS (device B, respectively,) as the anodically coloring layers with the devices in the two extreme (colored and bleached) states. Both devices switch between the two forms when a bias voltage of approximately ±1.0 to 1.2 V is applied. By selecting intermediate bias voltages, the devices can continuously change from colored to transmissive and the spectra evolve from one extreme to the other. Comparison of the results shows that using PProDOP-NPrS as the high band gap polymer has several advantages over the carbazole counterpart. The main benefit is the opening of the transmissivity window throughout the entire visible spectrum by moving the π–π* transition into the ultraviolet region. The cut-off of the PBEDOT-NMeCz is evident at ca. 500 nm. Another advantage of the PProDOP-NPrS based device B is the noticeable increase in the optical contrast as evidenced by an increase in Δ%T from 56% to 68% measured at 580 nm. Furthermore, while doped PBEDOT-NMeCz is blue and its charge carrier absorption is at the same energy as the π–π* transition of the low gap PProDOT-Me$_2$ absorption, PProDOP-NPrS is gray-green in the oxidized state, thus providing some extra blocking of the transmission of the opaque device in the 400–500 nm region.

Figure 3A:
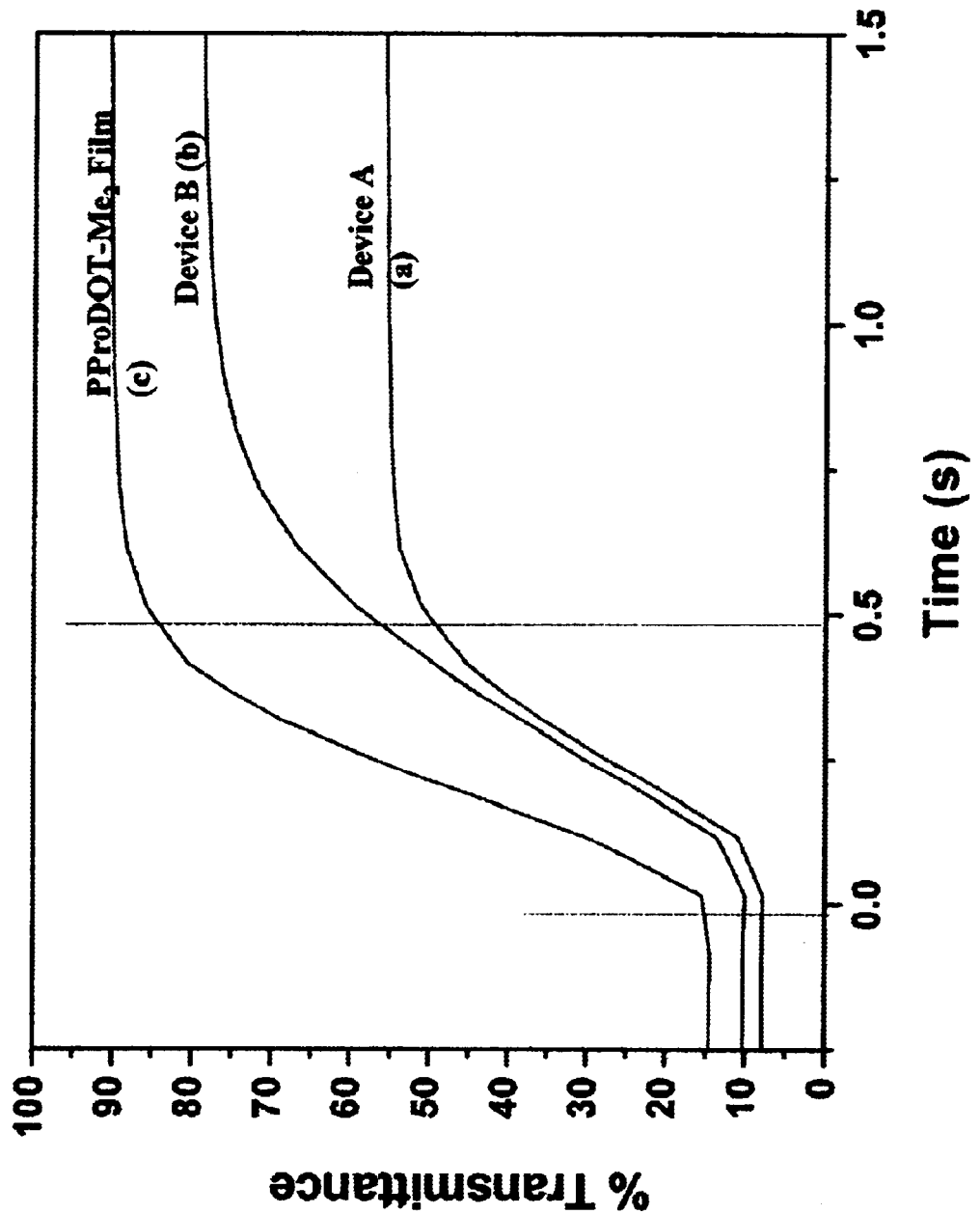
FIG. 3A. Transmittance as a function of switching time of (a) PProDOT-Me$_2$/PBEDOT-NMeCz device, (b) PProDOT-Me$_2$/PProDOP-NPrS device and (c) PProDOT-Me$_2$ film. In these experiments, the variation in monochromatic light transmitted at $\lambda_{max}$ was monitored during repeated redox switching experiments. All experiments were carried out in a Varian Cary 5E Spectrophotometer. The thickness of the PProDOT-Me$_2$ layer was 200 nm, as measured using a DekTak Sloan 3030 profilometer.

Typically, an important characteristic of a ECD is the response time needed to perform a switch from transmissive to opaque and vice versa. In order to analyze the switching characteristics of these windows, the variation in monochromatic light at the wavelength of maximum contrast was monitored during repeated redox stepping experiments. For a comparison, we monitored the change in transmittance of a single PProDOT-Me$_2$ film of the same thickness (about 200 nm) as the films used in the devices. As seen in FIG. 3, both devices switch quite rapidly. The PProDOT-Me$_2$ film alone can be effectively switched in about 0.5 s to attain 95% of its total transmission change (%ΔT=76%). While device A switches in about 500 ms, device B has a somewhat larger dynamic range with a total % transmission change in 600 ms. However, it is remarkable that by adding the PProDOP-NPrS layer, Device B loses only 10% in overall contrast compared to a single PProDOT-Me$_2$ film.

Figure 3B:
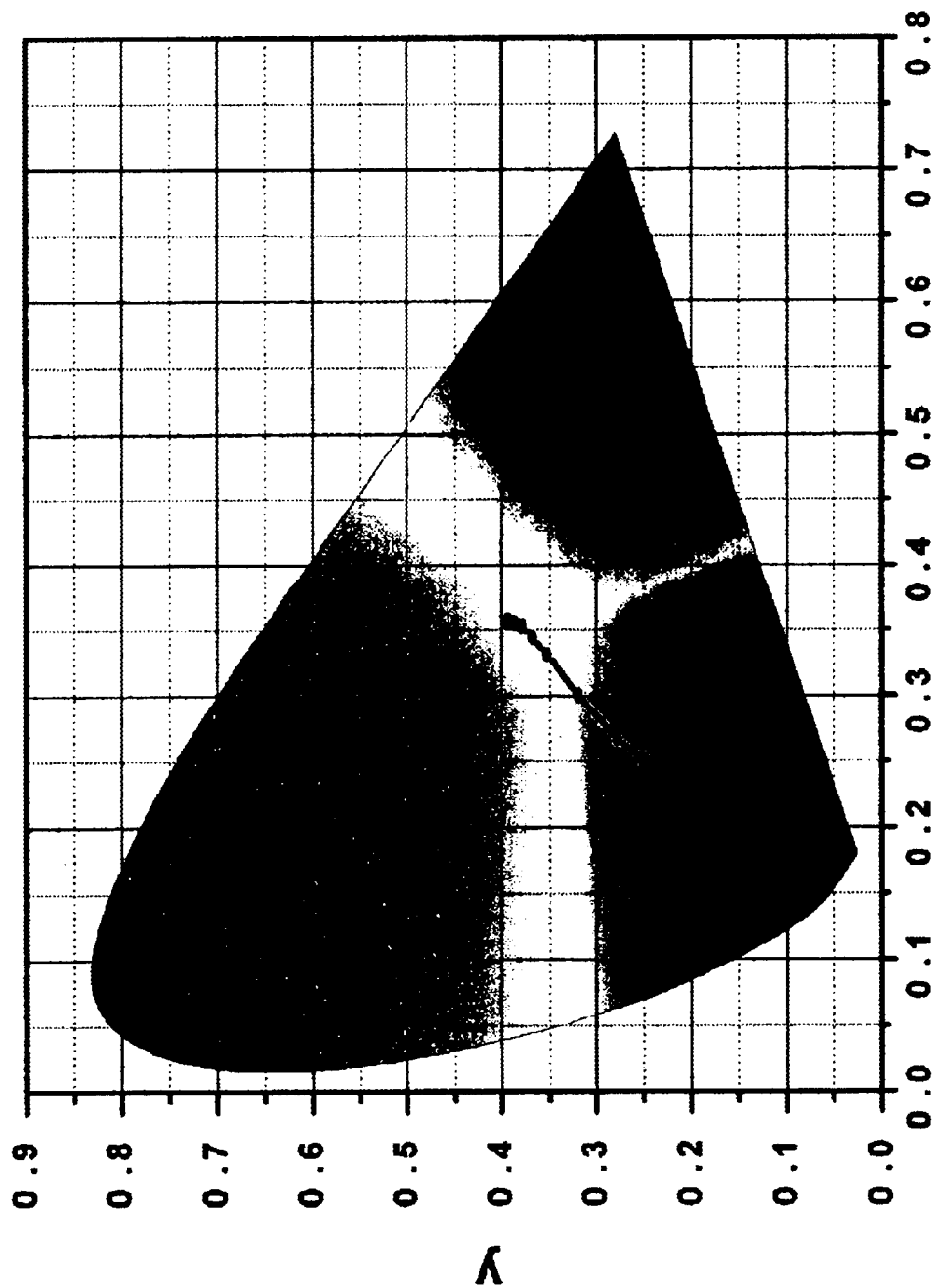
FIG. 3B shows the hue and saturation x-y track for the device and, as the applied potential is changed from −2.5 V to +1.5 V, a straight line that spans between a dark blue area of the color space to a highly transmissive (near white point) blue-green color is observed.
Figure 4A:
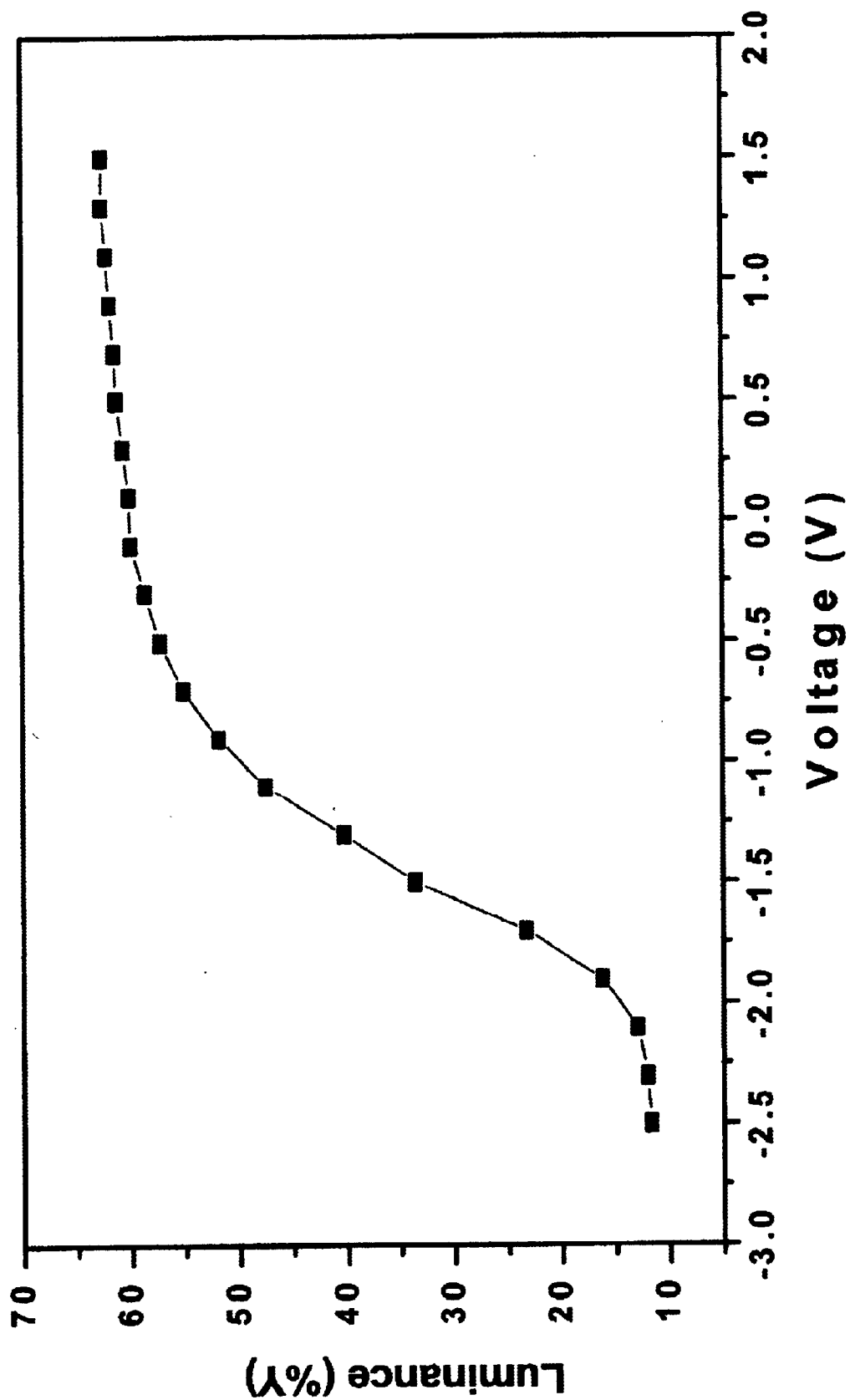
FIG. 4A. Luminance analysis of PProDOT-Me$_2$/PProDOP-NPrS device. The potential dependence of the relative luminance was monitored using a D50 white light source.

Recently, colorimetric analysis (12) has been used to investigate the properties of electrochromic and light-emitting polymers. Both luminance and x-y chromaticity diagrams provide valuable information for understanding changes in the devices color and/or brightness. For example, the potential dependence of the relative luminance offers a different perspective on the transmissivity of a material as it relates the human eye perception of transmittance over the entire visible spectrum as a function of doping on a single curve. FIG. 3B shows the hue and saturation x-y track for Device B as the applied potential is changed from –2.5 V to +1.5 V, which corresponds to the oxidative doping track of PProDOT-Me$_2$. A straight line that spans between a dark blue area of the color space to a highly transmissive (near white point) blue-green color is observed. Therefore, the dominant wavelength of the color is the same throughout the bleaching process; the absorption decreases in intensity as represented by the decrease in the saturation of the color. As seen in the FIG. 4A, in the bleached state, the window shows a luminance of 65% through the positive voltage values. A voltage of –0.5 V is needed to induce a decrease in luminance; dimming of the device luminance continues to increase until a potential of –2 V is attained. The overall luminance change, that is in essence the optical density change perceived by the human eye, is 55%.

The stability of the bleached and/or colored states toward multiple redox switches often limits the utility of electrochromic materials in ECD applications. The main reasons for device failure are different electrochemical windows and/or environmental requirements of the complementary materials. If the two EC materials possess different electrochemical windows for operation, then the applied voltage needed for attaining 100% of the optical contrast increases. Therefore, longer lifetimes are expected for devices operating at low voltages since high-applied potentials can be detrimental to the electrochromic films, the electrolyte, and even to the ITO layer. In a specific embodiment, the oxidation process of the anodic material can coincide with the reduction process of the cathodic EC material in order to maintain charge balance within the ECD.

Figure 4B:
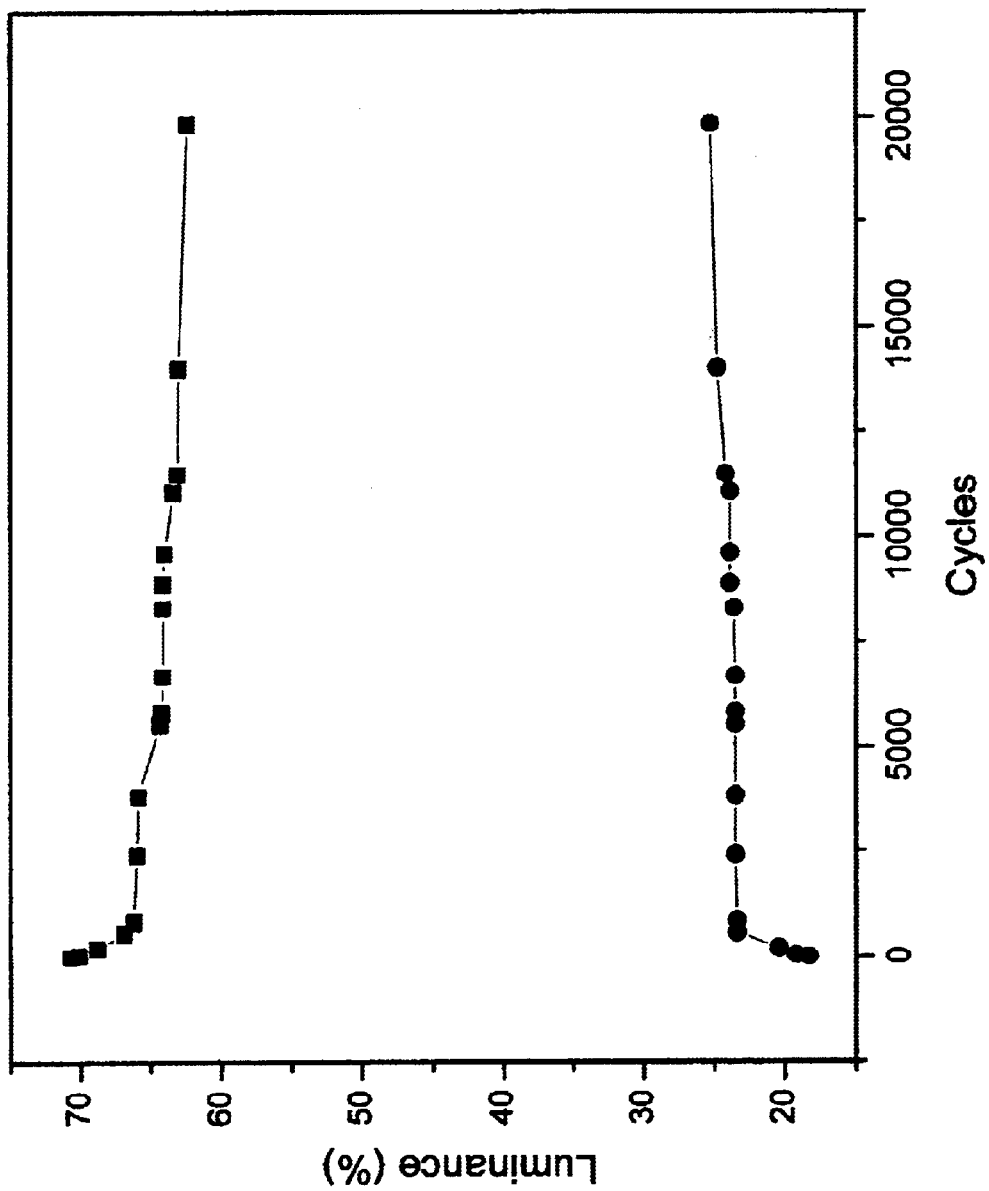
FIG. 4B shows the lifetime of the PProDOT-Me$_2$/PProDOP-NPrS device to multiple electrochromic switches. This study was carried out by continuously stepping the voltage of the device between −1 and +1 V with a 30 s delay at each potential allowing a full color change and hold period. During this time, the luminance was monitored over a period of 7 days. The upper trace (■) shows the decrease in the luminance of the device in the bleached state with the number of cycles performed, while the lower trace (●) is the fading of the dark state during continuous switching. All the measurements were carried out with a Minolta CS 100 Chroma-Meter.

FIG. 4B shows the results from using colorimetry to monitor the luminance change to investigate the long-term stability for device B to multiple deep switches. The device loses 10% of its contrast during the first 500 cycles. After this conditioning period, the degradation proceeds remarkably slowly and the device loses only 4% of its luminance contrast over a period of 20,000 double potential cycles. As the devices are sealed to ambient exposure, significantly longer lifetimes can be realized.

The subject dual polymer ECDs can operate at low applied voltages (±1.0 V) with both films being compatible in the same electrochemical environment. This can greatly increase their lifetime, for example to 86% retention of their initial color (96% retention after break-in) after 20,000 cycles. In addition, PProDOP-NPrS has the ability to switch between a colorless neutral state to a doped gray-green state, possessing the rare property of being a truly anodically coloring polymer with easily accessible redox switching potentials. Furthermore, doped PProDOP-NPrS broadens the absorption peak of the dark state ECD in both the 400–500 nm and 700–800 nm regions of the visible spectrum, where the contributions from the π–π* transition of the PProDOT-Me$_2$ film are small. The devices based on complementary polymers PProDOP-NPrS and PProDOT-Me$_2$ can exhibit an optical contrast of, for example, up to 70% at $\lambda_{max}$ and an overall luminance change of, for example, 53%. The subject devices can switch from a transparent state to a very dark, almost opaque state in less than 1 second, potentially making them useful polymer displays. These characteristics can allow the subject devices to achieve control over the color, brightness, and environmental stability of an electrochromic window.

The subject invention provides electrochromic polymers comprising compounds as set forth in Formula I and/or Formula II

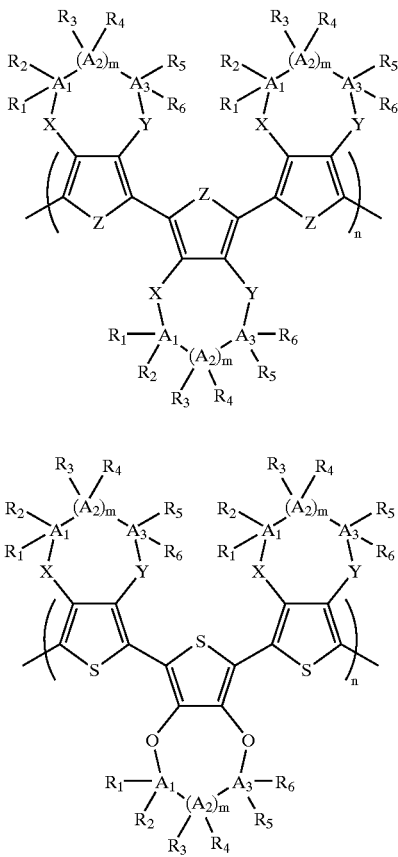

Formula I

Formula II wherein X, Y, and Z can be the same or different and are selected from the group consisting of S, N, O, $Si(R_8)_2$, N—$R_7$, and P—$R_7$;

$A_1$, $A_2$, and $A_3$ can be the same or different and are selected from the group consisting of S, N, O, $Si(R_8)_2$, N—$R_7$, and P—$R_7$;

m is an integer between 0 and 10, preferably between 0 and 5, and more preferably between 0 and 3;

$R_1$ through $R_6$ and $R_8$ may be absent, the same, or different and can be a moiety selected from the group consisting one or two bond(s), H, alkyl, CN, OH, COOH, $SOR_7$, $SO_2R_7$, $SO_3R_7$, heteroalkyl, alkenyl, alkynyl, alkynyl-aryl, alkynyl-heteroaryl, aryl, alkyl-aryl, alkenyl-aryl, heteroaryl, alkyl-heteroaryl, alkenyl-heteroaryl, cycloalkyl, heterocycloalkyl, alkyl-heterocycloalkyl, alkyl-cycloalkyl,

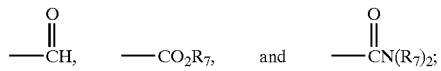

$R_7$ is a moiety selected from the group consisting of H, alkyl, aryl, COOH, heteroalkyl, alkenyl, alkynyl, alkynyl-aryl, alkynyl-heteroaryl, aryl, alkyl-aryl, alkenyl-aryl, heteroaryl, alkyl-heteroaryl, alkenyl-heteroaryl, cycloalkyl, heterocycloalkyl, alkyl-heterocycloalkyl, alkyl-cycloalkyl;

n is at least about (or at least) three, preferably at least about (or at least) four, and more preferably at least about (or at least) five; and wherein any of $R_1$ through $R_8$ may be, optionally, substituted with a moiety selected from the group consisting of alkyl, aryl, halogen, OH, $NH_2$, CN, $NO_2$, COOH, or $SOR_7$, $SO_2R_7$, $SO_3R_7$. In some embodiments, one of $R_1$ and $R_2$ are H, $R_3$ and $R_4$ can be the same or different and are H or alkyl, and one of $R_5$ or $R_6$ is H.

In some embodiments, Z is Si and $R_8$ is an alkyl, aryl, or heteroaryl. Yet other embodiments provide for polymers wherein double or triple bonds exist between one or more of the following exemplary adjacent atom groupings: X and $A_1$; $A_1$ and $A_2$ (when m=1); each of $(A_2)_m$ and $(A_2)_{m+1}$ where m=1, 2, 3, 4, 5, 6, 7, 8, or 9; $A_2$ and $A_3$, when m=1; or $A_1$ and $A_3$ when $A_2$ is absent (m=0). As would be apparent to the skilled artisan, when double or triple bonds exist between the adjacent atoms illustrated in Formulas I and II (e.g., X and $A_1$; $A_1$ and $A_2$ (when m=1); each of $(A_2)_m$ and $(A_2)_{m+1}$ where m=1, 2, 3, 4, 5, 6, 7, 8, or 9; $A_2$ and $A_3$, when m=1; or $A_1$ and $A_3$ when $A_2$ is absent (m=0)), $R_1$, $R_2$, $R_3$, $R_4$, $R_5$, and $R_6$ may, independently, be present, absent, the same, or different as determined by the number of bonds the atom, located at each respective position, is able to form.

Monomers for incorporation into the electrochromic polymers according to the subject invention can be manufactured using, for example, double Williamson etherification, transetherification, or Mitsunobu chemistries. Other chemistries known to the skilled artisan can also be used for manufacture of monomers suitable for incorporation into electrochromic polymers of the invention.

The electrochromic polymers of the subject invention are electrically conducting and can be used in a variety of electrical devices as conductors of current. Thus, the electrochromic polymers of the invention provides for switchable electrical devices comprising electrochromic polymers of the subject invention where the conductivity can be turned on and off. Non-limiting examples of such electrical conductors include circuits in microprocessors, power grids, electrical supply systems in buildings, light fixtures (as both the electrical conductor), or as "wiring" in any electrical device. As another non-limiting example, electrochromic polymers of the subject invention can be used as electroactive material contained within a translucent or transparent insulator. In such an invention, the polymer will be transparent (transmissive) in one state, or in the other. Upon applying a potential to a contact wire, the electrochromic polymer changes color indicating that the circuit is energized. Alternative uses for such wiring includes decorative lighting (coloring of which is determined by the polymer utilized in the construction of the wire). The electrochromic polymers can be used in electrochromic devices such as variable optical attenuators for near infrared and visible light (e.g., in telecommunication devices), microwave shutters for antennae (e.g., stealth technology), pixelated ECD's advertising signage, electronic books, video monitors, stadium scoreboards or announcement boards, video signage, camouflage, warning systems for cell phones, computers (e.g., personal digital assistants), electrochromic windows, greeting cards, dynamic wall art, and billboards. Thus, the subject invention provides methods and means for communication of information or art to individuals comprising the display of information or art to an individual via electrochromic displays. In such inventions, information or art is input into an electrochromic device and displayed.

The subject invention utilizes electrochromic polymers of the invention and the patterning of electrodes on substrate surfaces. For example, gold can be patterned on membranes using metal vapor deposition (MVD) techniques. Despite the large surface area, electrodes suitable for use in the invention (as large as many square meters), electrochromic devices having sub-second switching can be provided. Electrodes can also be of relatively small size. Various methods for making structured electrodes with various resolutions are well known in the art (see, for example, Holdcroft S. *Adv. Mater.* 2001 13:1753; Schlultze J. W.; Morgenstern T.; Schattka D.; Winkels S. *Electrochim. Acta* 1999, 44:1847; and Table 8). These patterning methods are also useful for the construction of dual-polymer flat devices, giving rise to a new type of surface-active electrochromic devices.

In another embodiment, it is possible to use patterned electrodes using simple and inexpensive methods such as line patterning (LP) (see, for example, MacDiarmid et al. [2001] *Synth. Met.* 121:1327) and ITO (indium tin oxide) scorching (Hohnholz et al. [1999] *Adv. Mater.* 11:646). Line patterning allows selective coating of substrates such as glass and transparency paper under normal atmospheric conditions as opposed to other high cost patterning techniques such as lithography or vapor deposition. ITO scorching methods allow selective removal of ITO from the substrate with a metal tip in a closed circuit, followed by the deposition of polymer films on the electrodes formed by the ITO scorching.

Lateral patterning of electrodes allows electrochemical deposition of two polymers on the same surface. These interdigitated electrode fingers (shown, for example, in FIGS. 41, 44A, 44B, and 46) can then be individually addressed. An electrochromic device comprising a cathodically coloring and a complementary anodically coloring polymer can be deposited separately on the patterned lines. These polymers are then switched between their redox states and the device switches between its transmissive and colored states.

The subject invention also provides various electrochromic polymers useful in the construction of such ECDs comprising complementary electrochromic polymers and electrochromic displays or other electrochromic devices. Table 5 shows 5 non-limiting possibilities to match a color or to display a contrast between redox states in dual-polymer EC devices (Film 1 equals polymer 1, etc.; T indicates a transparent state; C1 is color 1, C2 is color 2, etc). Tables 6 and 7 provide exemplary sets of complementary EC polymers. EC polymers suitable for use in ECDs comprising complementary EC polymers include those set forth in Tables 3 and 4, as well as derivatives of the polymers set forth therein (provided that the derivatives exhibit the ability to change color when induced to change redox state). Contrast or color vibrancy can be tuned by adjusting the thickness of polymer coating an electrode (e.g., by adding additional layers of polymer film to the device).

Polymers possessing one bleached state include PEDOT, PProDOT, PProDOT-Me$_2$, PEDOP, PProDOP, PProDOP-NPS, PBEDOT-V, PProDOT-V, PProDOT, PBEDOT-Pyr, and PBEDOT-B(OC$_{12}$H$_{25}$)$_2$. Polymers that possess two or more colored states include, and are not limited to, P3MTh, PBEDOT-Fn, P3MTh, PBEDOT-BP, PBEDOT-C$_2$, and P3BTh. Tables 3 and 4 define the acronyms with full polymer names.

Both the LP and MVD methods allow for the construction of single layer lateral ECD's in which the polymers on a surface are switched relative to one another and the power of the complementary electrochromism can be realized. Both transmissive and metal electrodes will be patterned using the LP method. This method involves printing of patterns on a substrate using a commercial printer, followed by coating of the non-printed areas by a conductive, transparent PEDOT layer or an electroless deposition of a conductor, such as gold. Subsequently, the printer ink is removed. Using this method, the resolution of the patterning is accessible, down to 30 microns (see, e.g., FIGS. 50A–C), and allows construction of sub-millimeter sized ECDs. This method involves coating/metallization of the non-printed parts of the substrate using the difference in surface hydrophilicity of the substrate and the printer ink. FIGS. 58A–C show photographs of the initial patterned electrodes that we have designed. Two (or in some cases more) complementary polymers will be separately deposited on patterned areas and the lateral ECDs will be constructed by covering the active area by an ionically conducting media (i.e., gel electrolyte, ionic liquid, or solid electrolyte). By changing the size and shape of these electrodes the switching characteristics and patterns of the resulting ECDs can be manipulated.

Patterned electrodes allow for the construction of laterally configured dual-polymer electrochromic devices. As shown by FIG. 38, PEDOT was deposited on 2 pixels while PBEDOT-B(OC$_{12}$H$_{25}$)$_2$ was deposited on the other two pixels. Switching these polymers relative to a counter polymer hidden behind these films, the ability to switch from a zero contrast state on the left where both polymers are in their highly transmissive p-doped forms to a high contrast state where both polymers are neutral, demonstrates how these polymers might be used in displays or as camouflage materials. The subject invention provides numerous opportunities for color control with our many EC polymers and the construction of lateral ECD's on flexible surfaces that can range from plastic as shown, to paper or metal substrates (e.g., for electrochromic documents).

The ability to match the colors of two complementary polymer pairs provides for flexibility in the design of window-type ECDs. Lateral ECDs, in essence ECD's that operate on a single surface or using porous electrodes, can be constructed based upon the color mixing of two polymers deposited on a patterned surface. For example, a device, such as shown in FIGS. 56A–B, can provide a surface that switches from deep blue absorbing to sky blue transmitting utilizing two EC complementary materials.

A number of suitable EC polymers have been developed and can be combined to form either a high contrast device or a multi-color display upon a change in the bias voltage. FIGS. 57A–B show photographs of some single layers of these polymers and demonstrates how color control can be induced. The color and luminance match/contrast between two polymers will be controlled by adjusting the thickness and the redox states of the polymers.

In FIG. 57A, the two polymers are held at the same potential and switched relative to a counter polymer material "hidden" underneath via a porous electrode. As the overall color of the device will be the sum of the two polymers, the Display 1 state will be transmissive and will show the metal electrode underneath (or some printed display), while the Display 2 state will give an overall purple color from the sum of the red and blue. This is also illustrated in FIG. 4; polymers transmissive in Display 1 state provide a high color contrast surface (red and blue) in Display 2 state.

True single layer devices can be constructed using polymer pairs such as those shown in FIG. 57B. Here, PBEDOT-Cz is transmissive yellow in its reduced form, while PBEDOT-V is highly transmissive oxidized (Display 1). Switching the bias on the device will provide the light blue and deep purple colors (Display 2). As such, the surface can be switched from a light yellow to a deep blue.

The lateral type devices can be constructed with the addressing of each EC layer independently and requires electrical insulation between lines or pixels. Typical hand held displays with feature sizes on the order of 25–50 microns will cause the human eye to "color average". Other applications, such as signs or camouflage allow for larger feature sizes on the order of millimeters to centimeters. In non-limiting examples, substrate patterning can be performed via metal vapor deposition (MVD) or line patterning (LP). Alternatively, ink-jet and screen printing processes can be used for substrate patterning.

Reflective electrodes comprising any conductive metal, e.g., gold, as the conducting layer can be patterned using masking and MVD. As illustrated in FIGS. 35A–C, three masks on a 4.5 cm×4.5 cm×0.25 mm (Length×width×thickness) brass substrate have been created using interdigitated electrode patterns. This has allowed us to deposit gold electrodes by MVD to create a laterally configured ECD's.

This method provides successful metallization of any substrate such as glass and plastics. Among these, porous substrates appear suitable to enhance the switching time of the polymers as the diffusion of the counter-ions is directed to short distances through the membranes to the counter polymer beneath. Thus, ECDs having the schematic design shown in FIG. 35E and based, for example, on porous polycarbonate membranes as metallizable substrates can be constructed. Alternatively, single layer ECDs can also be constructed and, of course, any other porous or non-porous substrate can be used in the construction of these ECDs (e.g., single or dual layer ECDs). These membranes can also be used in flexible ECDs with high switching rates (Chandrasekhar P., Zay B. J., Birur G. C., Rawal S., Pierson E. A., Kauder L., Swanson T. [2002] *Adv. Funct. Mater.* 12:95).

EXAMPLE 1
Synthesis of Exemplary N-alkyl Substituted Pyrroles

A series of several of N-alkyl substituted pyrroles can be synthesized in accordance with the subject invention. The N-alkyl substituted poly(3,4-propylenedioxypyrrole)s (PProDOPs) were originally designed as potentially processable electrochromic polymers, featuring the assets of poly(3,4-alkylenedioxypyrrole)s (PXDOPs) (low oxidation potential, outstanding stability to overoxidation and potential switching, and multi-color electrochromism). N-substitution modifies the electron rich character of the heterocycle thus leading to a new set of colors including purple, green, brown and blue. Spectroelectrochemistry showed that the absorbance of the π–π* transition in the neutral state is blue shifted compared to the non N-derivatized PProDOP. In the case of poly(N-glycol ProDOP) (N-Gly PProDOP), this transition displays a maximum at 306 nm (onset at 365 nm) thus giving an almost colorless highly transparent neutral polymer with a relative luminance greater than 99% for a film thickness of about 200 nm. Another interesting feature of the subject N-substituted PProDOPs is their well-defined electrochemistry where almost "ideal" behaviors are obtained with N-Propyl PProDOP (N-Pr PProDOP), N-Octyl PProDOP (N-Oct PProDOP) and N-Glycol PProDOP (N-Gly PProDOP). For these polymers which show an $E_{1/2}$ less than –0.1 V vs. Fc/Fc$^+$ (+0.2 V vs. SCE), the ratio between anodic and cathodic peak currents at a scan rate of 20 mV/s is almost of 1.0 and the difference between anodic and cathodic peak potentials ($\Delta E_p$) is less than 8 mV. In addition, these polymers have not only shown interesting electrochromic properties in the visible. A very strong absorption is observed in the near-infrared range (NIR) upon doping thus allowing the use of these polymers for the realization of switchable devices in the NIR which are of high interest in military applications.

Electropolymerization was carried out with an EG&G Princeton Applied Research model 273 potentiostat/galvanostat employing a platinum button working electrode (diameter: 1.6 mm; area 0.02 cm$^2$), a platinum flag counter electrode, and a 0.01 M Ag/AgNO$_3$ reference (Ag/Ag$^+$). The electrolyte used was 0.1 M LiClO$_4$/PC. The reference was calibrated externally using a 5 mM solution of ferrocene (Fc/Fc$^+$) in the electrolyte ($E_{1/2}$(Fc/Fc$^+$)=+0.070 V vs. Ag/Ag$^+$ in 0.1 M LiClO$_4$/PC). The potentials were calibrated versus Fc/Fc$^+$ in the same electrolyte, as recommended by IUPAC[46]. All potentials are reported versus Fc/Fc$^+$. The electrodeposition was performed from a 0.01 M solution of monomer in the electrolyte at a scan rate of 20 mV/s. Cyclic voltammetry was carried out using the same electrode setup using monomer-free electrolyte of 0.1 M LiClO$_4$/PC. Corrware II software from Scribner Associates was used for data acquisition and control of the potentiostat.

Spectroelectrochemical spectra were recorded on a Varian Cary 5E UV-visible-NIR spectrophotometer connected to a computer at a scan rate of 600 nm/min. A three electrode cell assembly was used where the working electrode was an ITO-coated glass (7×50×0.6 mm, 20 Ω/□, Delta Technologies Inc.), the counter was a platinum wire and a 0.01 M Ag/AgNO$_3$ reference electrode. The potentials were applied using the same EG&G potentiostat as previously described and the data recorded with Corrware II software for electrochemical data and with the Varian Cary Win-UV for spectral data.

General Procedure of N-alkylation of ProDOP:[47] Sodium hydride (1.2 equiv. free from mineral oil) was carefully added to the solution of ProDOP (1.0 equiv.) in freshly distilled THF at room temperature. After stirring for 1 h, alkylating reagents (1.2 equiv.) were added and the reaction mixtures were refluxed for 3–4 h. After cooled to room temperature, THF was removed by rotary evaporator and water was carefully added. The aqueous solution was extracted with ether (3 times) and dried over MgSO$_4$. Purification by column chromatography on silica gel using hexane/ethyl acetate afforded N-alkylated ProDOP respectively. For 2d, the semi-purified product 3 was dissolved in THF and tributylammonium fluoride (1.0 M in THF) was added. Taking the same procedure described above, 2d was obtained as a clear oil.

Colorimetry measurements were obtained by use of the Minolta CS-100 chroma meter and CIE recommended normal/normal (0/0) illuminating/viewing geometry for transmittance measurements.[58] A similar three electrode cell as for spectroelectrochemistry was employed. The potential was controlled by the same EG&G potentiostat. The sample was illuminated from behind by a D50 (5000 K) light source in a light booth specially designed to exclude external light. The color coordinates are expressed in the CIE 1931 Yxy color space where the Y value is a measure of the luminance in Cd/m$^2$. The relative luminance, expressed in %, was calculated by dividing the Y value measured on the sample by the Y$_0$ value corresponding to the background. Note that the relative luminance is frequently reported instead of the luminance because it gives a more meaningful value.[48]

Polymer films for spectroelectrochemistry were prepared by galvanostatic deposition on ITO (R$_s$≦10 Ω/□). ITO supported films were grown at 0.01/cm$^2$ mA in 0.1 M LiClO$_4$/PC containing 0.01 M of monomer.

N-Me ProDOP (2a): a colorless oil; $^1$H NMR (300 MHz, CDCl$_3$) δ6.14 (s, 2H), 3.97 (m, 4H), 3.46 (s, 3H), 2.13 (m, 2H); $^{13}$C NMR (75 MHz, CDCl$_3$) δ129.5, 106.5, 72.8, 34.2, 24.5; FT-IR (CDCl$_3$) 3021 (s), 1460 (m), 1371 (s), 1216 (s), 1056 (s) cm$^{-1}$; HRMS (FAB) calculated for C$_8$H$_{11}$NO$_2$ (M$^+$) 153.0789, found 153.0723.

N-Pr ProDOP (2b): a colorless oil; $^1$H NMR (300 MHz, CDCl$_3$) δ6.17 (s, 2H), 3.97 (m, 4H), 3.59 (t, J=7.1 Hz, 2H), 2.12 (m, 2H), 1.71 (q, J=7.1 Hz, 2H), 0.87 (m, J=7.1 Hz, 3H); $^{13}$C NMR (75 MHz, CDCl$_3$) δ128.6, 105.7, 72.3, 51.9, 35.2, 24.3, 11.1; FT-IR (CDCl$_3$) 3043 (s), 2989 (s), 1558 (s), 1423 (m), 1225 (s), 919 (s) cm$^{-1}$; HRMS (FAB) calculated for C$_{10}$H$_{15}$NO$_2$ (M$^+$) 181.1102, found 181.1125.

N-Oct ProDOP (2c): a colorless oil; $^1$H NMR (300 MHz, CDCl$_3$) δ6.17 (s, 2H), 3.97 (m, 4H), 3.61 (t, J=7.1 Hz, 2H), 2.12 (m, 2H), 1.62 (m, 2H), 1.20 (m, 10H), 0.87 (t, J=7.1 Hz, 3H); $^{13}$C NMR (75 MHz, CDCl$_3$) δ135.8, 105.7, 73.2, 72.4, 35.2, 33.1, 31.7, 29.3, 29.2, 29.1, 26.8, 22.6; FT-IR (CDCl$_3$) 3055 (s), 2988 (s), 1558 (m), 1421 (m), 1265 (m), 909 (s), 706 (s) cm$^{-1}$; HRMS (FAB) calculated for C$_{15}$H$_{25}$NO$_2$ (M$^+$) 251.1885, found 251.1901.

N-Gly ProDOP (2d): a colorless oil; $^1$H NMR (300 MHz, CDCl$_3$) δ6.25 (s, 2H), 3.96 (m, 4H), 3.80 (t, J=4.9 Hz, 2H), 3.75–3.63 (m, 4H), 3.63–3.52 (m, 6H), 2.11 (m, 2H); $^{13}$C NMR (75 MHz, CDCl$_3$) δ138.8, 106.3, 72.5, 72.3, 71.1, 70.7, 70.4, 61.8, 50.1, 35.1; FT-IR (CDCl$_3$) 3448 (br), 2930 (s), 2872 (s), 1557 (m), 1460 (m), 1413 (m) cm$^{-1}$; HRMS (FAB) calculated for C$_{13}$H$_{21}$NO$_5$ (M$^+$) 271.1419, found 271.1405.

Figure 6:
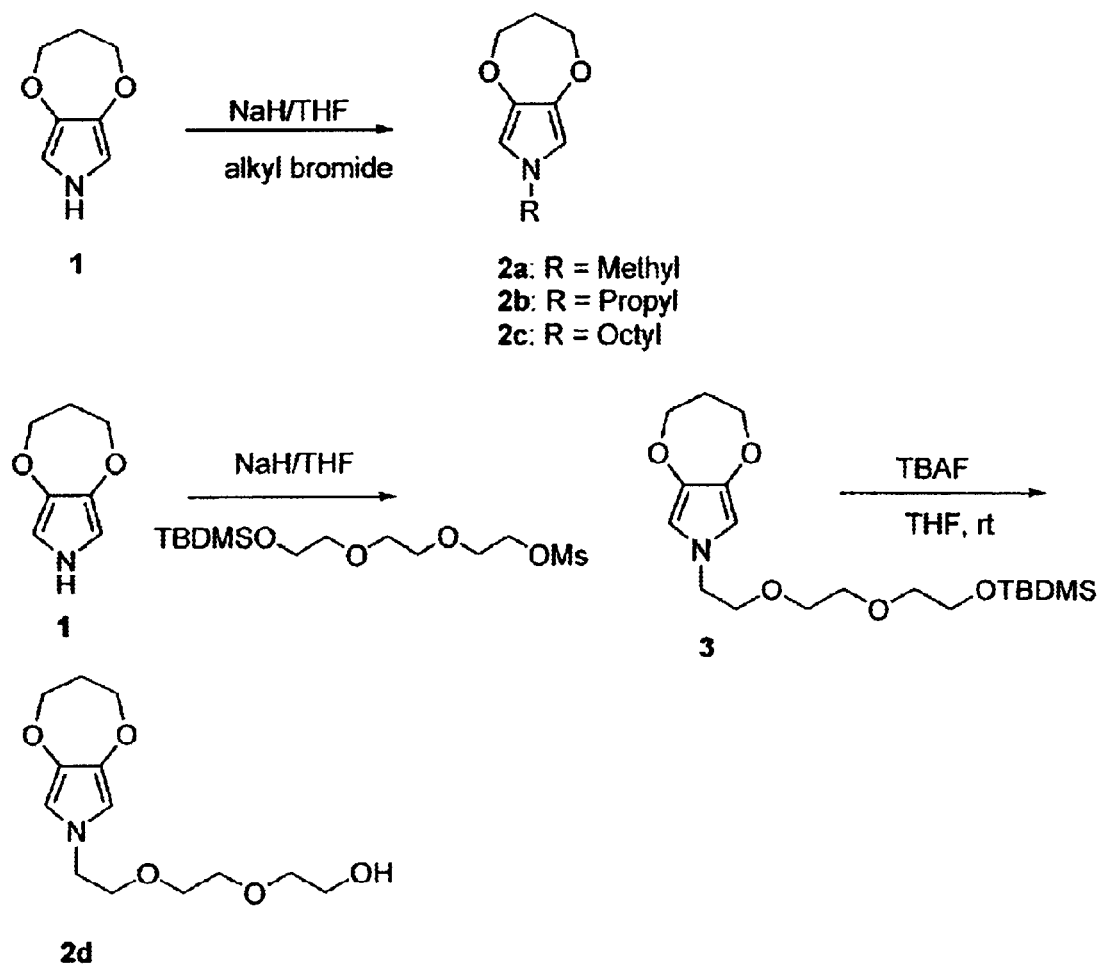
FIG. 6. Synthesis of N-substituted ProDOPs.

N-substitution of 3,4-propylenedioxypyrrole (ProDOP) was performed through a N-alkylation type reaction with several alkyl chains having different length and hydrophilic character (see FIG. 6). The alkyl groups employed here vary from a short to a long chain and from a hydrophobic to hydrophilic chain. The ProDOP was treated with sodium hydride and alkyl bromides were added at room temperature. The reaction mixtures were refluxed for designated times and the purification by chromatography afforded N-alkylated products 2a–c respectively. For 2d, t-butyldimethylsilyl (TBDMS) protected tri(ethyleneglycol) mesylate was added to the solution of 3,4-propylenedioxypyrrole after treated with sodium hydride. After the reaction was completed and purified, the deprotection by tributylammonium fluoride afforded the N-triethyleneglycolated ProDOP.

Oxidative electropolymerization of the monomers was carried out in propylene carbonate (PC) with 0.1 M LiClO$_4$ as electrolyte. It should be noted that the electropolymerization characteristics of these N-substituted ProDOPs is especially sensitive to the nature of the solvent and electrolyte used. Table 1 shows the oxidation potentials observed for the monomers during oxidation at a scan rate of 20 mV/s. As noticed for pyrrole and N-alkyl pyrroles, the monomer oxidation potential of ProDOP (E$_{ox,m}$=+0.58 V vs. Fc/Fc$^+$) is higher than N-substituted ProDOPs. The propylenedioxy substituent in the 3- and 4-positions of the pyrrole ring increases the electron rich character of the monomer thus leading to a lower monomer oxidation potential for ProDOP than pyrrole. In addition, N-alkyl substitution also increases the electron density in the monomer by inductive effect. As a result, N-substituted ProDOPs exhibit a lower oxidation potential than ProDOP between +0.50 to +0.54 V vs. Fc/Fc$^+$, as shown in Table 1. Note that the oxidation potential of the monomer slightly increases with the chain length since the monomer oxidation occurs at +0.50 V for N-Me ProDOP, +0.51 V for N-Pr ProDOP, +0.52 V for N-Oct ProDOP and +0.54 V for N-Gly ProDOP vs. Fc/Fc$^+$. This slight difference might stem from the impact of the alkyl chain on the nitrogen atom. A long chain probably distorts the p-orbitals of the nitrogen and so its participation to the conjugation. As a result, the heterocycle is less electron rich with a long alkyl chain on the nitrogen and is therefore less readily oxidized.

Figure 7A:
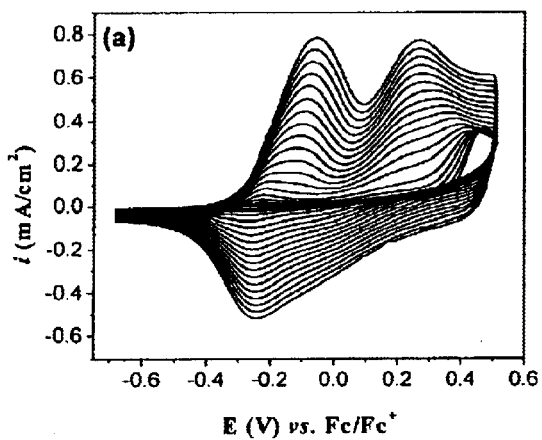
FIG. 7. Electrodeposition of N-alkyl ProDOPs by potential scanning from a 0.01 M solution of monomer in 0.1 M LiClO4/PC at 20 mV/s on a Pt button (area=0.02 $cm^2$): (a) N-Me PProDOP (20 cycles), (b) N-Pr PProDOP (150 cycles), (c) N-Oct PProDOP (150 cycles), (d) N-Gly PProDOP (50 cycles).
Figure 7B:
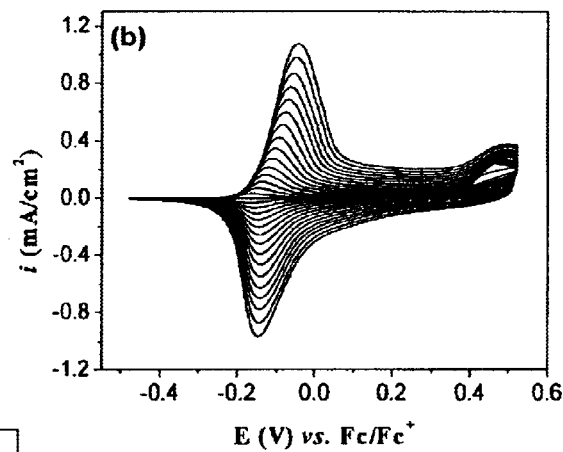
Figure 7C:
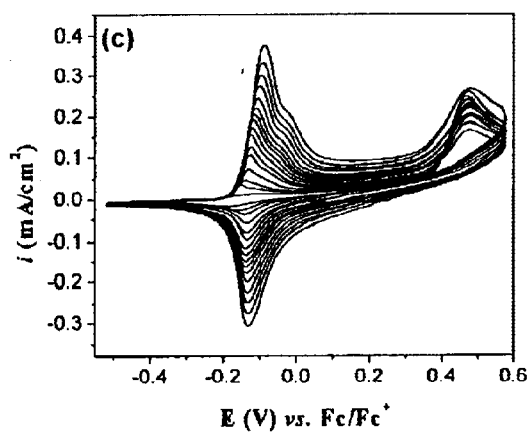
Figure 7D:
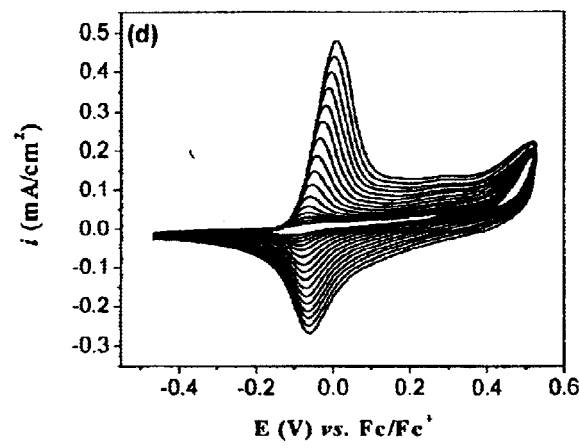
Figure 8A:
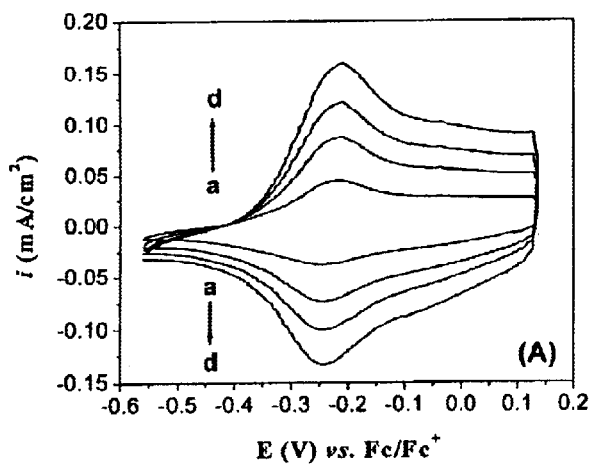
FIG. 8. Cyclic voltammogram of thin N-alkyl PProDOP films in monomer free solution of 0.1 M $LiClO_4$/PC: (A) N-Me PProDOP, (B) N-Pr PProDOP, (C) N-Oct PProDOP, (D) N-Gly PProDOP at a scan rate of (a) 50 mV/s, (b) 100 mV/s, (c) 150 mV/s, (d) 200 mV/s.
Figure 8B:
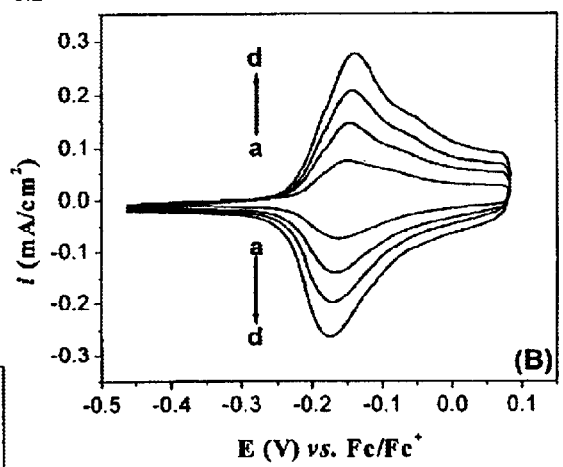
Figure 8C:
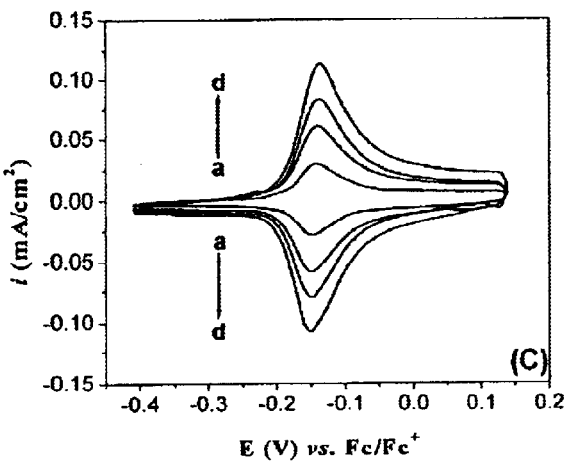
Figure 8D:
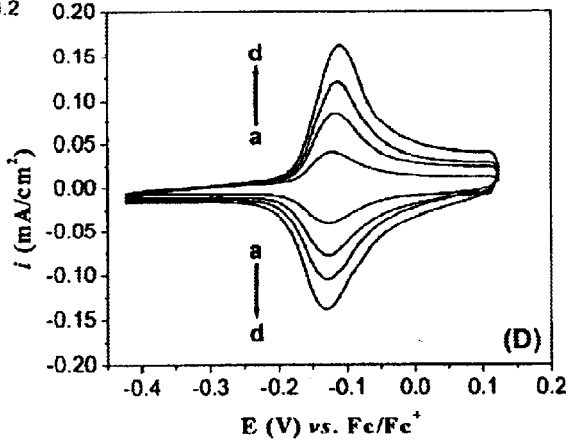

Electropolymerization was performed for all monomers using multiple scan cyclic voltammetry using a 0.01 M solution of monomer in 0.1 M LiClO$_4$/PC. The appearance of a peak distinct from the polymer redox process at a lower potential than monomer oxidation (+0.20 V vs. Fc/Fc$^+$) in the case of N-Me PProDOP polymerization seems to indicate a growth involving the coupling of soluble oligomers (FIG. 7a) which are indeed more reactive than the monomer.[49] For the other N-substituted ProDOP monomers, the polymerization proceeds at more slower rate. This substantial decrease of the electropolymerization rate has been reported previously for N-alkylated pyrroles and was attributed to the decrease of conductivity resulting from the N-substitution.[50] Usually, the longer the chain length, the lower the conductivity and therefore the slower the electrodeposition. For instance, after 20 cycles, the anodic peak current of N-Me PProDOP is about 0.80 mA/cm$^2$ while N-Pr PProDOP reaches hardly 0.054 mA/cm$^2$ and N-Oct PProDOP 0.050 mA/cm$^2$. Note that, despite a longer chain, N-Gly PProDOP electrodeposition (see FIG. 7d) is much faster than for the other N-alkyl PProDOP, except N-Me PProDOP, with an anodic peak current of 0.12 mA/cm$^2$ after 20 cycles. This effect is probably the result of an increase of the rate of deposition induced by the more hydrophilic character of the N-Gly ProDOP which provides better adherence to the substrate. It is noteworthy that all the polymers studied except N-Me PProDOP present very narrow redox processes during the growth. Since the half-wave oxidation potentials vary linearly with the inverse of the number of repeating units,[51] this seems to indicate that the polymers formed have a narrow distribution of their chain length.

The polymers were deposited by cyclic voltammetry on a platinum electrode (area: 0.02 cm$^2$) from a 0.01 M solution of monomer in 0.1 M LiClO$_4$/PC electrolyte. In order to compare the electrochemistry of the different N-substituted polymers and since the rate of polymerization is much slower when the chain length is increased, the electrodeposition was performed over only 4 cycles for N-Me ProDOP, 40 cycles for N-Pr ProDOP, 5 cycles for N-Gly ProDOP and 20 cycles for N-Oct ProDOP. As a result, all polymers are in the same range of current densities.

FIG. 8 presents the cyclic voltammogram of thin films of N-substituted PProDOPs at scan rates of 50, 100, 150 and 200 mV/s in 0.1M LiClO$_4$/PC. It is noteworthy that all polymers present a relatively low half-wave oxidation potential, which is characteristic of PXDOPs, and stems from the presence of the propylenedioxy substituent in the 3- and 4-positions. In addition, very well defined and reversible redox processes are seen with N-substituted PProDOPs which contrasts with the broad redox processes reported for N-alkyl pyrroles.[52] The half wave oxidation potentials of the polymers (E$_{1/2}$) are observed between −0.13 V and −0.24 V vs. Fc/Fc$^+$ (see Table 1). As observed for the monomer oxidation potentials, the longer the N-substituent, the higher the E$_{1/2}$. The same phenomenon has been observed for N-alkyl pyrroles[53] and results from the steric effect of the substituent which distorts the polymer backbone thus decreasing the conjugation length. It should be noted that the N-substituted PProDOPs exhibit a capacitive behavior which seems to decrease when the N-substituent chain length increases. As the capacitance is related to the amount of charge stored by volume unit, this may indicate that a longer substituent yields less compact polymer which results in a decrease of the capacitance.

Figure 9A:
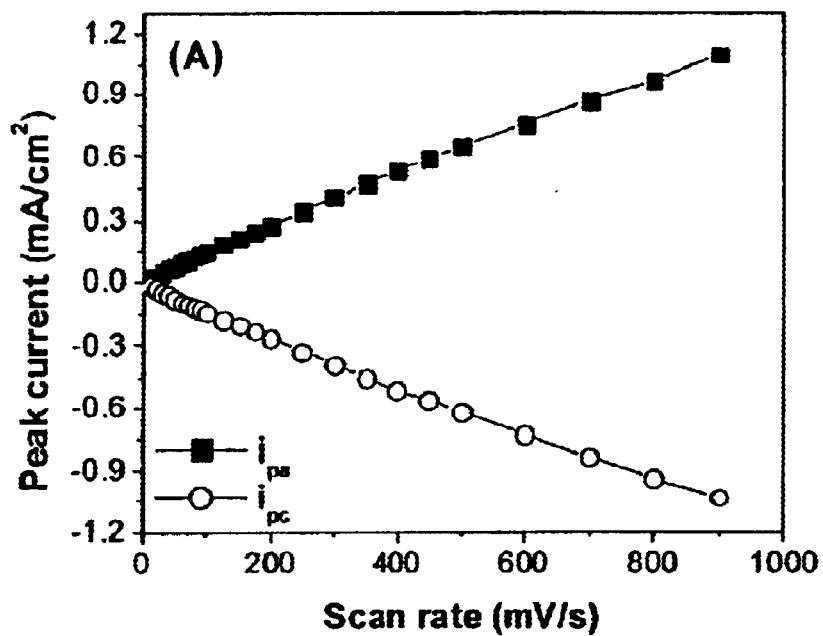
FIG. 9. Scan rate dependence of N-Pr PProDOP film in monomer free solution of 0.1 M $LiClO_4$/PC: (A) change in anodic and cathodic peak currents with scan rate, (B) peak separation ($\Delta E_p$) with increasing scan rate.
Figure 9B:
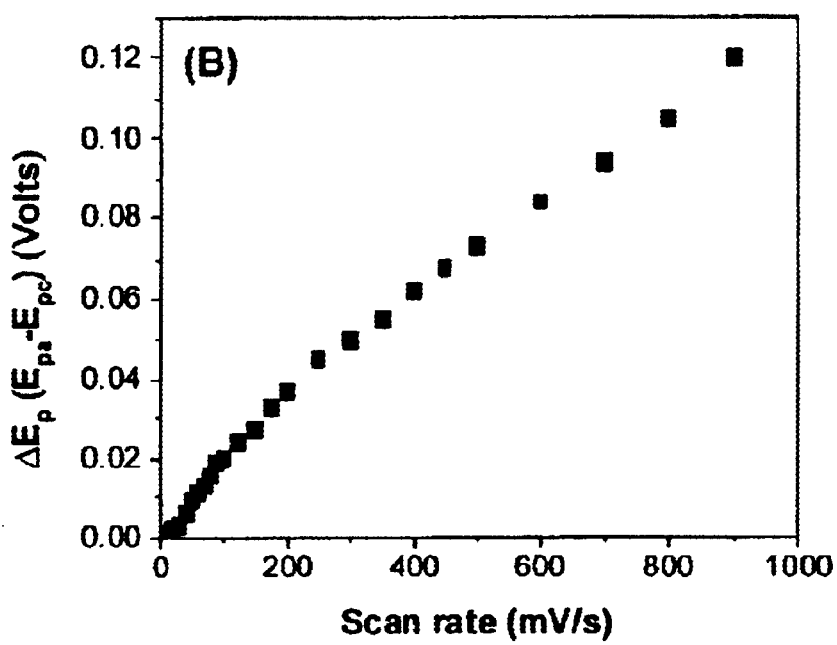

To illustrate the outstanding reversibility of the redox processes, the anodic to cathodic peak current ratios (i$_{pa}$/i$_{pc}$) and the peak separation (ΔE$_p$) are reported in Table 1. Except N-Me PProDOP which exhibits a peak ratio of 1.35 and a relatively high peak separation (92 mV), all other N-substituted PProDOPs present an almost ideal ratio of 1.0 along with a very small $\Delta E_p$ (less than 8 mV) at a scan rate of 20 mV/s. The scan rate dependence of the anodic and cathodic peak currents, and peak separation ($\Delta E_p$) shows a linear dependence as a function of the scan rate as illustrated in FIG. 9 for N-Pr PProDOP. This demonstrates that the electrochemical processes are not diffusion limited and extremely reversible even at very high scan rates. Note that the ability to be switched reversibly in a non diffusion limited process at scan rates as high as 1000 mV s$^{-1}$ is rather unusual for conducting polymers and may stem from the thinness of the polymer films (about 30 nm). FIG. 9b shows the absence of significant anodic to cathodic peak separation which is close to the ideal Nernstian behavior in the thin-layer cell case.54 However, the fact that $\Delta E_p$ increases with the scan rate is an indication that charge transfer problems occur thus giving a rate limitation. As seen in Table 1, when the chain length of the N-substituent increases $\Delta E_p$ decreases, and anodic to cathodic peak ratio gets closer to 1.0 which indicates that the redox processes become more reversible. This effect may stem from the a more porous structure which would allow an easier diffusion of the dopant ions inside the polymer film. In summary, the N-substituted PProDOP electrochemistry has remarkable features compared to polypyrrole and PProDOP because of its very well defined redox processes and outstanding reversibility.

Figure 10A:
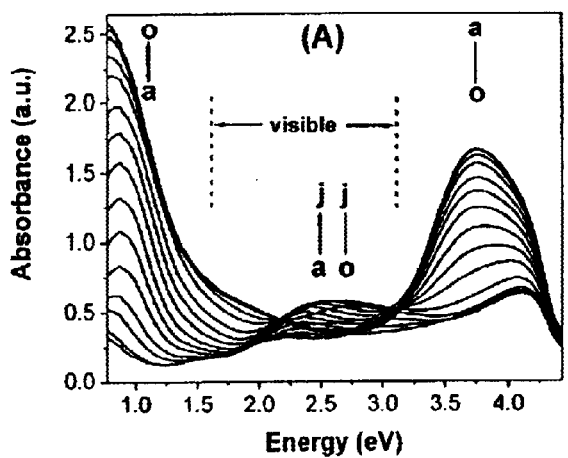
FIG. 10. Spectroelectrochemistry of N-alkyl PProDOPs in 0.1 M $LiClO_4$/PC vs. $Fc/Fc^+$: (A) N-Me PProDOP at applied potentials of: (a) −500 mV, (b) −400 mV, (c) −300 mV, (d) −275 mV, (e) −250 mV, (f) −230 mV, (g) −200 mV, (h) −160 mV, (i) −120 mV, (j) −75 mV, (k) 0 mV, (l) +100 mV, (m) +300 mV, (n) +500 mV, (o) +700 mV; (B) N-Pr PProDOP at applied potentials of: (a) −400 mV, (b) −300 mV, (c) −200 mV, (d) −150 mV, (e) −100 mV, (f) −80 mV, (g) −60 mV, (h) −40 mV, (i) −20 mV, (j) 0 mV, (k) +50 mV, (l) +100 mV, (m) +200 mV, (n) +400 mV, (o) +600 mV; (C) N-Gly PProDOP at applied potentials of (a) −200 mV, (b) −70 mV, (c) −60 mV, (d) −50 mV, (e) −40 mV, (f) −30 mV, (g) −20 mV, (h) −10 mV, (i) 0 mV, (j) +20 mV, (k) +60 mV, (l) +200 mV, (m) +300 mV, (n) +400 mV, (o) +700 mV.
Figure 10B:
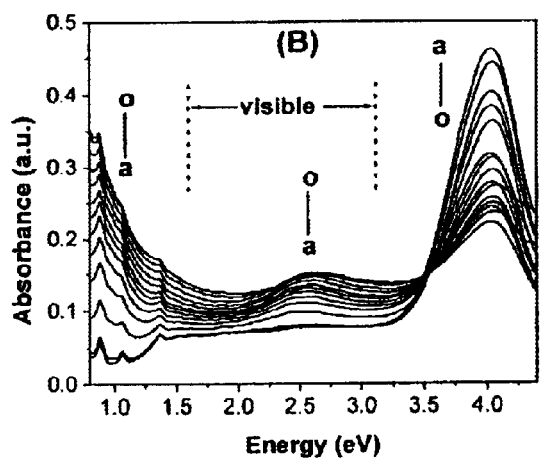
Figure 10C:
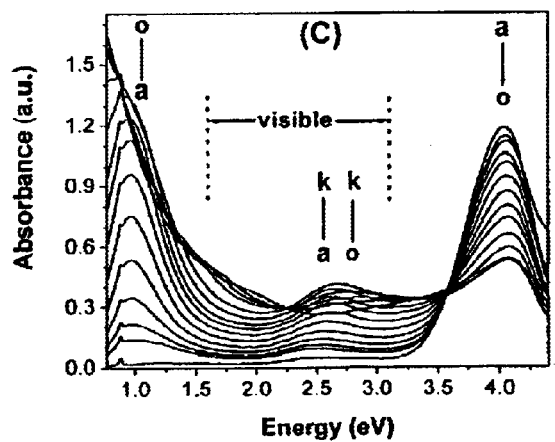

N-substituted PProDOPs have been deposited as thin films on ITO/glass substrates by galvanostatic deposition at a current density of 0.01 mA/cm$^2$ from a 0.01 M monomer solution in 0.1M LiClO$_4$/PC. Note that even if electroactive N-Oct ProDOP thin films can be obtained on ITO/glass, a sufficient thickness to allow the spectroelectrochemical analysis was not achieved probably because of the strong hydrophobicity of the monomer due to the long alkyl chain. FIG. 10 presents the spectroelectrochemistry of N-Me PProDOP (A), N-Pr PProDOP (B) and N-Gly PProDOP (C) in 0.1 M LiClO$_4$/PC. As expected, the N-substitution has blue shifted the $\pi$ to $\pi^*$ transition which lies now in the UV range with a maximum of absorbance ($\lambda_{max}$) at 330 nm (3.75 eV) for N-Me PProDOP, and 306 nm (3.05 eV) for N-Pr PProDOP and N-Gly PProDOP. This corresponds to a band gap (measured at the edge of the $\pi$ to $\pi^*$ absorption band) of 3.0 eV for N-Me PProDOP, and 3.4 eV for N-Pr PProDOP and N-Gly PProDOP which is higher than PProDOP (2.2 eV). The blue shift observed, relative to PProDOP, can be explained by the steric effect of the N-substituent. It should be noted that the ability to introduce and control steric effects in conducting polymers is especially useful because it gives a way of controlling the band gap of the polymer and thus its electrochromic properties. It should also be noted that the longer the chain, the higher is the distortion of the conjugated backbone. However, since N-Pr and N-Gly PProDOP have the same band gap and $\lambda_{max}$, a chain length of 3 carbons seems to be sufficient to reach the maximum steric effect. The significant blue shift obtained by adding a N-substituent to the ProDOP ring open the field of colorless neutral polymers which will get colored upon doping (anodically coloring polymers).

Figure 11:
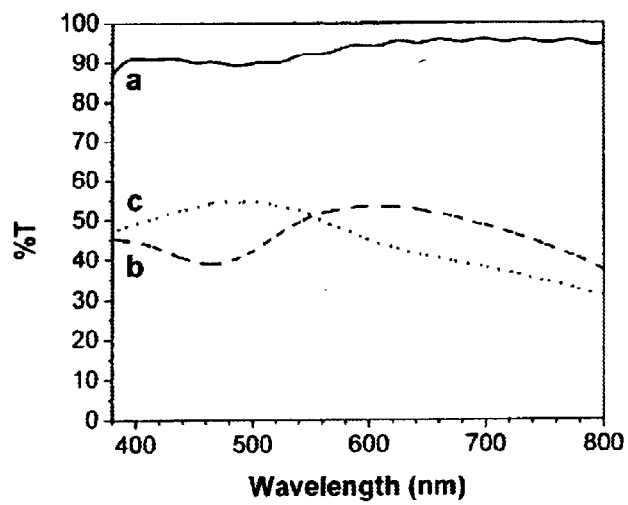
FIG. 11. Transmittance of N-Gly PProDOP in the visible region as a function of wavelength (nm) for 3 different oxidation states: (a) neutral, (b) intermediate, (c) doped.

A small absorption band associated with high energy charge carriers grows in upon oxidation, at 2.59, 2.60, and 2.67 eV for N-Me, N-Pr and N-Gly PProDOP, respectively. Note that this small band subsequently decreases at higher potentials in the case of N-Me PProDOP (above −75 mV vs. Fc/Fc$^+$) and N-Gly PProDOP (above 60 mV vs. Fc/Fc$^+$) as is frequently observed in electroactive conducting polymers. Upon oxidation, the $\pi$ to $\pi^*$ transition is depleted at the expense of a broad and very intense absorption band centered in the near-infrared (NIR) corresponding to the low energy charge carriers. The tail of this NIR band, as well as the intermediate band are responsible for the color of the polymer film since they are located in the visible region of light. It is noteworthy that the neutral state of the N-Gly PProDOP only absorbs in the UV range thus leading to a transparent, colorless film. For N-Me and N-Pr PProDOPs, a residual absorption in the visible is present in the neutral state which gives to the polymer film its coloration (e.g. purple in the case of N-Me PProDOP). Even if all N-substituted PProDOPs present a strong NIR absorbance in their doped state, it should be noted that N-Gly PProDOP has a slightly different behavior at high oxidation levels. Indeed, above 60 mV vs. Fc/Fc$^+$, the transition associated with low energy charge carriers is shifted to higher wavelengths (lower energies). From 60 mV to 700 mV, the intensity of the latter transition increases corresponding to the formation of a highly oxidized but not degraded polymer. After 700 mV, a decrease of the NIR transition is observed which probably corresponds to the beginning of the over-oxidation process. The transmittance (%T) of N-Gly PProDOP in the visible range of light is presented in FIG. 11 for different oxidation levels. In the neutral state (−300 mV vs. Fc/Fc$^+$), the film of polymer is very transparent and transmits more than 90% of the light all over the visible range. At an intermediate potential (+60 mV), the transmittance shows a minimum of 40% at about 470 nm. Note that at this potential, they never transmit more than 50% of the light over the entire visible range. When the polymer reaches its highest oxidation level (+700 mV vs. Fc/Fc$^+$), the transmittance below 550 nm increases at the expense of the transmittance at higher wavelengths. The minimum noticed at 470 nm has disappeared and now corresponds to a maximum of the transmittance in the visible (about 55%). These changes in transmittance over the visible range of light have a great influence on the color of the polymer which switches from a transparent colorless neutral state to a blue doped state. The N-Gly PProDOP is therefore a pure anodically coloring material which is extremely rare among electrochromic polymers.

Figure 12A:
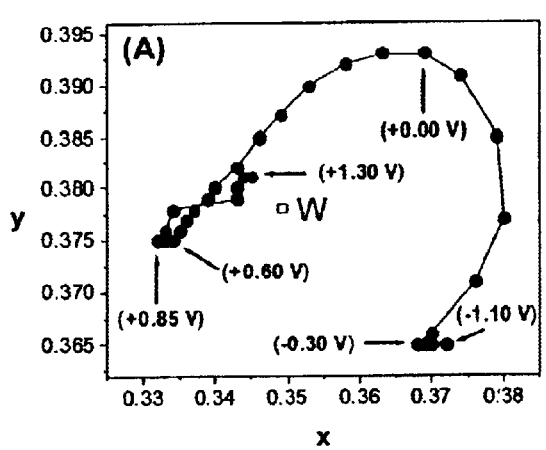
FIG. 12. Colorimetry (x-y diagram) of (A) N-Me PProDOP and (B) N-Gly PProDOP.
Figure 12B:
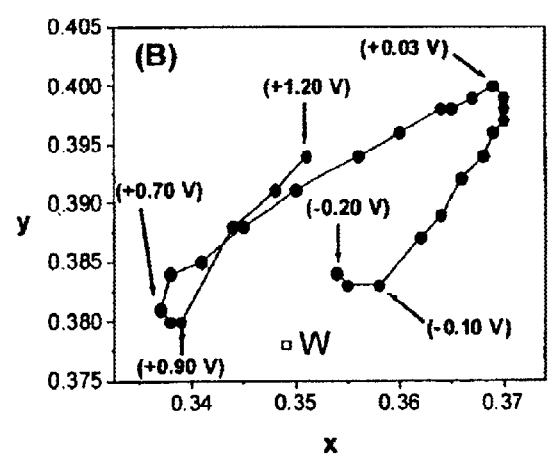

N-Me and N-Gly PProDOPs have shown in the previous sections interesting electrochemical and optical properties. In order to further study the changes in coloration of these polymers upon doping for potential display applications, we have performed an in situ colorimetric analysis of the different polymers.[55] Color is the most important property for a use in display applications and needs to be defined precisely. Therefore we studied the polymers by colorimetry and expressed the results in the CIE 1931 Yxy and CIE 1976 L*a*b* color spaces as recommended by the "Commission Internationale de l'Eclairage" (CIE).[56] The colors observed for each polymer at different oxidation levels are summarized in Table 2. N-Me PProDOP changes from deep purple to blue through a dark green intermediate upon oxidation. It should be noted that a deep purple color has not a single dominant wavelength located on the spectral locus of the CIE 1931 diagram, and therefore results from the addition of several absorptions located at different wavelengths in the visible range.[57] In the case of neutral N-Me PProDOP, these absorptions correspond to the edge of the $\pi$–$\pi^*$ transition and its tail which absorbs throughout the visible region of light. The color track of this polymer in the CIE 1931 Yxy color space is shown in FIG. 12A. We can clearly see that, between −1.10 V and −0.30 V vs. Fc/Fc$^+$, the xy coordinates are almost identical signifying no visible change in the color of the polymer. When the potential is stepped up to +0.85 V, the dominant wavelength of the light transmitted through the material decreases as a result of the formation of charge carriers in the polymer which absorbs at higher wavelengths. At higher potentials, the transitions associated with the charge carriers decrease in intensity, as shown by spectroelectrochemistry, thus resulting in a lower absorption at high wavelengths and therefore a decrease of the dominant wavelength. This behavior is quite typical for electrochromic polymers, as we reported previously.[55] The color track of N-Gly PProDOP, shown in FIG. 12B, presents similar features. However, it should be pointed out that the xy coordinates of this polymer in the neutral state (−0.20 V vs. Fc/Fc$^+$) are almost identical to the white point (x=0.349, y=0.378) meaning that the material is colorless. As seen in Table 2, N-Gly PProDOP changes upon oxidation from colorless to blue-grey through different shades including light pink and grey. These colors are quite different from those observed in PProDOP which switches from orange to light blue-grey through brown.

Figure 13:
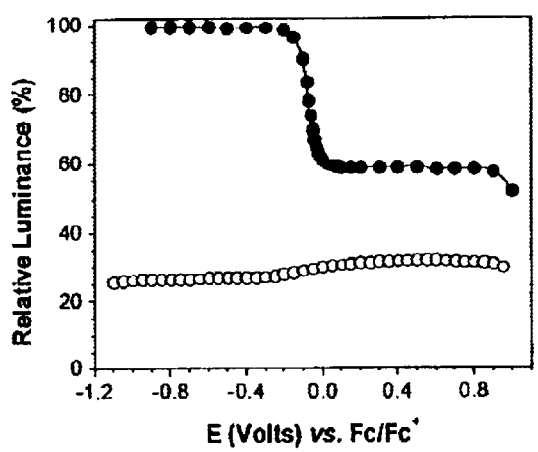
FIG. 13. Relative Luminance of N-Me PProDOP (○) and N-Gly PProDOP (●) as calculated from Yxy coordinates as a function of the potential applied vs. $Fc/Fc^+$.

The luminance, which is a coordinate in the Yxy color space, represents the brightness of a color. It is also very informative since with only one value, it provides information about the perceived transparency of a sample over the entire visible range of light. Instead of Y, it is usually more convenient to express the luminance as %Y which corresponds to the luminance of the sample divided by the luminance of the light source. It should be pointed out that %Y is different from %T because it takes into account the light sensitivity of the human eye, which is not constant over the entire visible range.[55,58] Actually, the human eye perceives brightness with a maximum sensitivity at 550 nm (yellow light). Under 480 nm or above 650 nm, the sensitivity is ten times less than at 550 nm. The relative luminance (%Y) of N-Me and N-Gly PProDOP is presented in FIG. 13. Again, the behavior of these polymers is different from PProDOP which has a lower luminance when neutral than in the doped state, and also presents a minimum at intermediate potentials (darkest state corresponding to the brown color). N-Me PProDOP shows a slightly lower luminance in the neutral state (27%) than in the doped state (32%). This slight change can be explained according to spectroelectrochemistry results. Upon oxidation, there is a transition in the visible (480 nm) associated with charge carriers which grows up upon oxidation. Moreover, the tail of the π to π* transition is located in the visible, as well as the tail of the NIR band associated with low energy charge carriers. Upon doping, the π to π* band is depleted at the expense of the 480 nm and the NIR transition. This doesn't lead to a change in luminance. At higher potentials, the band at 480 nm is depleted while the NIR transition is still growing. This results in a slight decrease of the overall absorbance of the polymer in the visible and therefore yields to the observed increase in the luminance as observed by colorimetry. As emphasized previously, the behavior of N-Gly PProDOP is quite exceptional for an electrochromic polymer. This is confirmed by the luminance measurements which show that the polymer film has a luminance of almost 100% in the neutral state corresponding to a colorless and completely transparent material. The luminance remains almost unchanged when the potential is stepped up to −0.20 V vs. Fc/Fc$^+$, then decreases abruptly to about 55% at −0.10 V and stabilizes at this value up to +0.85 V vs. Fc/Fc$^+$. The difference of behavior between N-Gly PProDOP and N-Me PProDOP is closely related to their band gap. In fact, the π to π* transition in N-Gly PProDOP is entirely located in the UV range and even the tail of the transition does not overlap with the visible range of light. As a result, the depletion of this transition has no effect on the color of the polymer.

Therefore, only the transitions associated with the charge carriers give rise to a visible color. This phenomenon is even more sensitive since the neutral polymer does not show any absorption in the visible. The ability to switch between a colorless neutral state to a doped blue-grey state confers to this electrochromic the rare property of being truly anodically coloring.

In summary, a series of N-substituted PProDOPs has been prepared which shows extremely reversible electrochemistry along with nice electrochromic properties. The low half wave oxidation potentials, resulting from 3,4-propylenedioxy substitution on the pyrrole ring, confers on these polymers a good stability in the doped state since air and moisture are not likely to reduce them. Hence, the N-substitution allows a fine tuning of the band gap and therefore of the optical properties. The ability to construct a pure anodically coloring polymer has been demonstrated with the N-Gly PProDOP. It is noteworthy that very few polymers give this type of color change, going from colorless to blue upon oxidation. The ease with which these new compounds can be derivatized opens a wide range of possibilities for the production of advanced polymers for display applications including electrochromic devices. In particular, the introduction of proper substituents on the propylenedioxy ring should lead to soluble polymers which may be of high interest for processable electrochromics in display applications.

EXAMPLE 2

Optimization of Reflective ECDs

Figure 14:
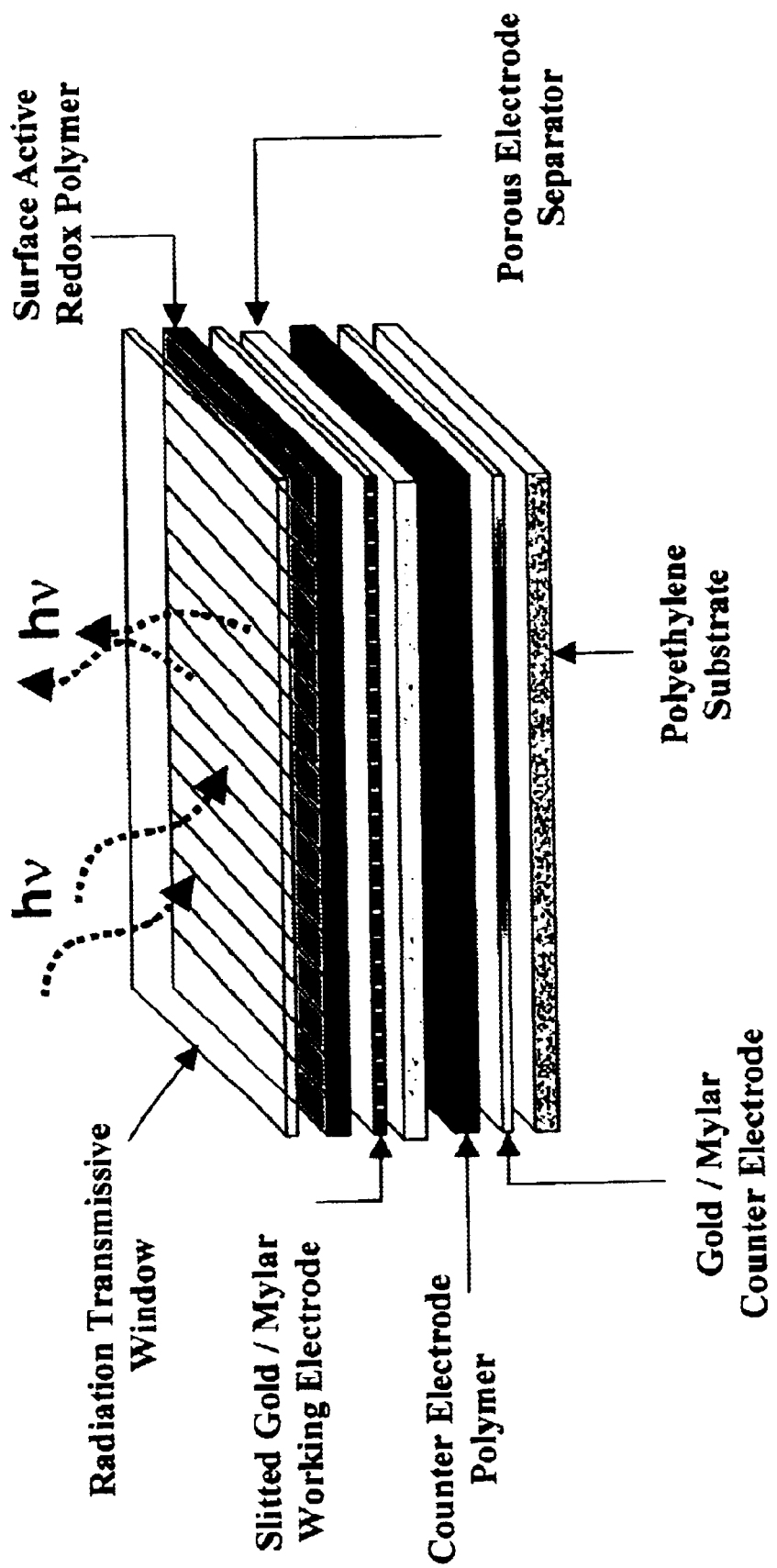
FIG. 14 illustrates (schematically) an outward facing active electrode device sandwich structure originally described in the patent literature [R. B. Bennett, W. E. Kokonasky, M. J. Hannan, L. G. Boxall, U.S. Pat. No. 5,446,577, 1995; b) P. Chandrasekhar, U.S. Pat. No. 5,995,273, 1999].

In this example we address the optimization of ECDs that operate in the reflective mode and are able to modulate the reflectivity in the visible, NIR and mid-IR regions of the spectrum As a device platform which conveniently allows EC property characterization in a reflective mode, we have used an outward facing active electrode device sandwich structure originally described in the patent literature [R. B. Bennett, W. E. Kokonasky, M. J. Hannan, L. G. Boxall, U.S. Pat. No. 5,446,577, 1995; b) P. Chandrasekhar, U.S. Pat. No. 5,995,273, 1999], as shown schematically in FIG. 14. This ECD structure has several benefits. First, the properties of the EC material of interest can be probed through a window chosen to be highly transmissive over the wavelength range of interest. Second, all of the materials can be flexible, allowing significant mechanical deformation without hampering device operation. Finally, by using an especially-designed high viscosity electrolyte, the device can be made self-sealing. In this construction, gold-coated Mylar sheets are used as both counter and working electrodes. The top electrode is cut with a series of parallel slits, separated by about 2 mm, across the active surface making it porous to ion transport during switching. The cell was assembled using a high viscosity polymeric electrolyte composed of LiClO$_4$ dissolved in an acetonitrile (ACN)/propylene carbonate (PC) swollen poly(methyl methacrylate) (PMMA) matrix. At the edges of the device, the ACN in the electrolyte evaporates, leaving behind the PMMA and LiClO$_4$ in PC. As the PMMA becomes insoluble, it seals the outer edges of the device and provides self-encapsulation. The use of this electrolyte minimizes further solvent evaporation, prevents leaking, and allows for long-term testing of the ECD. Both the active top layer and the counter polymer film were electrochemically deposited on the gold-coated Mylar electrodes from solutions of 10 mM monomer in 0.1M LiClO$_4$ in ACN at constant potential. A separator paper, soaked in electrolyte, was used to isolate the back of the working electrode from the counter polymer layer. The top layer is in contact with a window, which is transmissive to the wavelengths of interest, allowing accurate measurements of the active layer reflectivity. We typically use ZnSe for NIR to mid-IR, glass in the NIR and visible, and polyethylene for visible through mid-IR, with somewhat lower performance from the latter on account of IR absorption bands. With this design, only outward facing electroactive polymer is responsible for the surface reflectivity modulation, while the counter electrode polymer is used for charge and coloration balance.

A device based on PProDOT-Me$_2$ as the active top layer, and poly[3,6-bis(2-(3,4-ethylenedioxy)thienyl)-N-methylcarbazole] (PBEDOT-NmeCz) as the back layer has been implemented. As the top film on the device is switched from its neutral, colored state, to its p-doped, bleached state, a gradual and controllable transition from a dark opaque violet to a pale transparent blue is observed. This color change is due to the doping process that modifies the electronic band structure of the polymer, producing new electronic states in the gap and bleaching the $\pi$–$\pi$* transition; consequently the electronic absorptions are shifted toward lower energies outside of the visible region. As constructed, the device switches in 3 seconds between the two extreme electrochromic states shown. It should be noted that this switching time is due to the diffusion of the ions through the gel electrolyte and along the working electrode slits. Improving the design of the ECD, the use of a highly porous working electrode and increasing the electrolyte conductance will decrease the optical response time and can enhance the chromatic contrast of the device.

The reflectance of the sandwich structure was tested over 0.3–5 $\mu$m (0.25–4 eV) at several cell voltages. The visible and near-IR data were measured on a 150 nm thick polymer film under a glass window; the mid infrared data on a 200 nm thick polymer film with a ZnSe window and the parasitic reflectivity of the window was subtracted. Several layers in our device influenced the spectra: the electrochromic polymer, the electrolyte gel, and the gold electrode. Two strong absorption bands from water (2.8 $\mu$m) and C-H stretching (3.3–3.4 $\mu$m) are seen in all of the spectra; these arise from both the polymer and the gel electrolyte, and are relatively constant as the polymer is oxidized and reduced. The fully reduced polymer (−1.5 V; solid line) is strongly absorbing in the visible region (0.4–0.65 $\mu$m) and, thus the reflectance of the device is low in this region. At wavelengths longer than 0.9 $\mu$m (1.4 eV) this polymer layer becomes quite transparent, so the gold layer underneath the polymer dominates the reflectance. At still longer wavelengths vibrational features in the polymer become evident, and the device reflectance is diminished. When fully oxidized, i.e., doped, (+1.0 V), the visible absorption is bleached and, at the same voltage, a strong infrared absorption appears, hiding the underlying gold electrode. The infrared absorption (and the contrast of the device) is strongest at ca. 1.8 $\mu$m. At this wavelength, we detect a reflectance contrast of greater than 90%. This contrast ratio is highly enhanced when compared to results for PEDOT (reflectance contrast of about 50–55%) and polyaniline derivatives. At longer wavelengths (4–5 $\mu$m), the reflectance of the device increases somewhat with the polymer in the doped state, and decreases with the polymer in the undoped state, reducing the contrast to about 60%. At intermediate oxidation states (0 V, −0.5 V, and −1 V) the device has a reflectance that generally is intermediate between that of the fully oxidized and fully reduced states. The exception to this behavior is the doping induced band around 1–1.2 $\mu$m (1–1.2 eV) which is strongest at these intermediate doping levels. The physical interpretation of these spectra is that the undoped insulating polymer has its $\pi$–$\pi$* interband transition in the visible, and is transparent (except for vibrational absorptions) in the IR region. Light doping produces two sub-gap absorption bands, due to the presence of polaron states, and partial bleaching of the interband transition. At full doping, bipolarons are formed, and the polaron interband transition is absent.

A key characteristic of an ECD of this type for displays or for thermal control applications is the lifetime of the device, i.e., the number of switching cycles can undergo before degradation sets in. The redox stability of the cell was determinated by continuously switching the device between its fully absorptive and transmissive states using a switching period of 25 s. After several double potential steps, the reflectivity was measured at a fixed wavelength where the contrast is high. The PProDOT-Me$_2$ based cell using the LiClO$_4$ electrolyte performs hundreds of switches without any degradation of the working electrode. After 1500 switches, the reflectivity of the oxidized form of the polymer has the same initial value, but the neutral form exhibits a decrease in reflectivity. As the device was assembled in air, the oxygen-sensitive neutral form is likely irreversibly oxidized during switching. Preparing the device in an oxygen and water free environment should drastically increase its cyclability, while also opening up a further window in the 2.7–3.1 $\mu$m region. By changing to a lithium trifluoromethylsulfonylimide (3M salt) based electrolyte we have constructed devices which could be switched 10,000 times over a period of 6 days with only approximately 20% loss in contrast.

In conclusion, we have shown that PProDOT-Me$_2$ provides high EC contrast in the visible, NIR and mid-IR regions of the electromagnetic spectrum. Contrast ratios of 55% at 0.6 $\mu$m in the visible, greater than 80% between 1.3 to 2.2 $\mu$m in the NIR, and greater than 50% between 3.5 to 5.0 $\mu$m demonstrate that these conducting polymers are excellent materials for redox switchable reflectivity for a metallic surface over a broad range of spectral energies.

Materials and Procedures: ProDOT-Me$_2$ was synthesized and fully characterized according to previously published procedures. The high viscosity electrolyte based on poly (methyl methacrylate) and lithium perchlorate was plasticized by propylene carbonate to form a highly conducting and transparent gel. To ease the gel synthesis, the PMMA and LiClO$_4$ were first dissolved in acetonitrile. The composition of the casting solution was LiClO$_4$/PMMA/PC/ACN in ratio of 3:7:20:70 by weight.

Electrochemical deposition of the polymer layers was carried out using an EG&G Model 273A potentiostat/galvanostat. A three electrode cell with Ag/Ag$^+$ as the reference, gold coated Mylar as the working, and platinum flag as the counter electrode was used for electrosynthesizing the polymer films.

The reflectance of the sandwich structure was measured over the infrared and visible regions using a Bruker 113v FTIR spectrometer and a Zeiss MPM 800 microscope photometer. In the mid-IR we used a ZnSe window over the polymer and the device was enclosed in a sealed cell to isolate it from the atmosphere. A glass window was used in the visible and near infrared region. Electrical leads attached to the electrodes allowed the polymer to be oxidized and reduced in situ.

EXAMPLE 3

Electrochemical Characterization of High Band Gap Polymers

This example demonstrates the electrochemical characterization of a high band gap N-butanol derivatized PPro- DOP (hereafter PProDOP-BuOH). We also report the characterization of solution polymerized C-alkyl substituted PProDOPs which are cast on electrode surfaces from common organic solvents such as chloroform and dichloromethane.

The chemical structures of the monomers used in this work are depicted in FIG. 15. Chemical polymerization of C-alkyl substituted ProDOPs were carried out in chloroform or methanol with ferric chloride. Free standing films were prepared via filtration through a glass frit under vacuum. Electrochemical polymerization was carried out with an EG&G 273A potentiostat/galvanostat from 0.01M monomer solutions in acetonitrile. 0.1M $Et_4NOTs$ was used as electrolyte. A platinum button electrode was used as a working electrode in a three-electrode cell setup with a platinum flag as the counter electrode and $Ag/Ag^+$ as the reference electrode. For optical measurements, polymer films were galvanostatically deposited on ITO glass at $J=0.5$ $mA/cm^2$.

High Band Gap PProDOP-BuOH. Cyclic voltammetric polymerization of PProDOP-BuOH is given in FIG. 16. The propylenedioxy substituent on the pyrrole ring increases the electron rich character of the monomer relative to pyrrole and the monomer oxidation onset occurs at $E=0.72$ V vs. $Ag/Ag^+$. The irreversible oxidation of monomer in the first cycle is followed by a nucleation loop as shown in the inset. Polymer growth occurs rapidly with little peak separation as the redox switch of the polymer is reversible. The scan rate dependence of the anodic and cathodic peak currents shows a linear dependence which demonstrates the electrochemical processes are not diffusion limited. The polymer can be switched reversibly up to a scan rate of 500 mV/sec. Long term switching of the polymer between the neutral and oxidized states shows less than 20% current loss after 300 cycles. The UV-Vis spectrum of the neutral polymer on ITO/glass showed a blue shifted $\pi-\pi^*$ transition at 410 nm (~3 eV) due to twisting of the backbone by the butanol substituent. Upon oxidation, the $\pi-\pi^*$ transition depletes at the expense of an intense absorption band in the near infrared region.

Soluble PProDOP derivatives: The C-alkylated PProDOPs were chemically polymerized by ferric chloride in methanol or chloroform. Higher yields were obtained when methanol was used as a solvent (~90%). The resulting polymers were isolated in their oxidized form and they were soluble in organic solvents such as chloroform, dichloromethane, and DMF. These polymers are sufficiently electron-rich that complete chemical reduction of these polymers was not possible, even in the presence of strong reducing agents (ammonia or hydrazine). Free standing films were prepared with conductivities up to a maximum of 55 S/cm for PProDOP-2-ethylhexyl). The electrochemical and optical properties of electrochemically deposited films of the C-alkylated PProDOPs showed similar characteristics to the parent polymer PProDOP.

EXAMPLE 4

New Functionalized Derivatives of 3,4-ethylenedioxypyrrole (EDOP, 5a) and 3,4-(1,3-propylenedioxy)pyrrole (ProDOP, 5b)

This example is directed to new functionalized derivatives of 3,4-ethylenedioxypyrrole (EDOP, 5a) and 3,4-(1,3-propylenedioxy)pyrrole (ProDOP, 5b) as especially electron-rich monomers which yield highly electroactive and stable conducting polymers useful for a diverse set of applications have been synthesized. N-Alkylations of ProDOP were carried out to yield a variety of ProDOP derivatives having alkyl, sulfonatoalkoxy, glyme, and glyme alcohol pendant chains. Iodization of EDOP and ProDOP via iodo-decarboxylation afforded iodo-functionalized derivatives useful for subsequent aryl coupling chemistry. N-Protection and formylation of EDOP, followed by Knoevenagel condensation of the resultant 2-formyl-EDOP with aryl acetonitrile derivatives, led to 1-cyano-2-(2-(3,4-ethylenedioxypyrryl))-1-(2-thienyl)vinylene(23)(Th-CNV-EDOP) and 1-cyano-2-(2-(3,4-ethylenedioxypyrryl))-1-(2-(3,4-ethylenedioxythienyl)vinylene(26)(EDOT-CNV-EDOP). A 14-crown-4-ether 34 based dioxypyrrole was synthesized with a cavity potentially useful for lithium ion coordination and sensing in the resultant electroactive polymer. C-Alkylated ProDOPs (43a, 43b, and 43c) containing octyl, ethylhexyl, and dioctyl substituents appended to the central methylene of the propylene bridge, were prepared as monomers for potentially soluble $\pi$-conjugated polymers.

Figure 17:
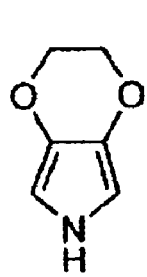
FIG. 17 depicts the initial set of 3,4-alkylenedioxyptrrole monomers prepared.
Figure 17:
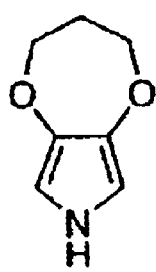
Figure 17:
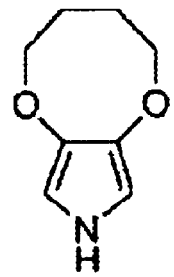
Figure 17:
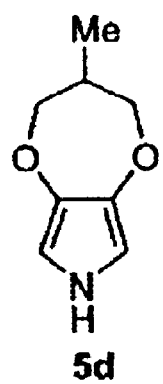
Figure 17:
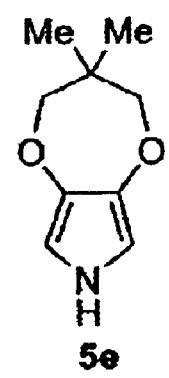
Figure 18:
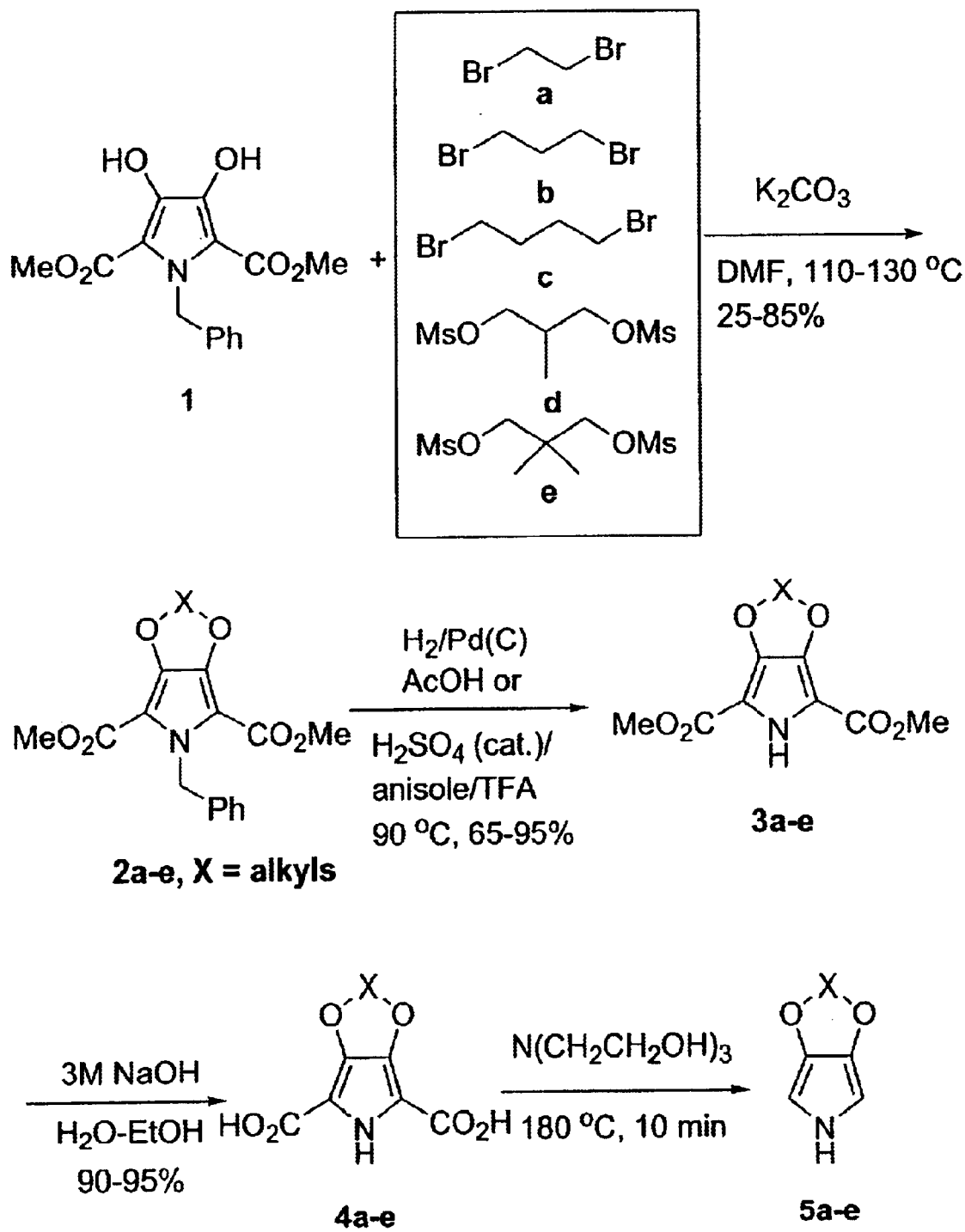
FIG. 18 depicts the general synthetic route to the 3,4-alkylenedioxypyrroles.

The general synthetic route to the 3,4-alkylenedioxypyrroles is illustrated in FIG. 18 and the initial set of monomers prepared are shown in FIG. 17 (Thomas, C. A.; Zong, K.; Schottland, P.; Reynolds, J. R. Adv. Mater. 2000, 12, 222; Gaupp, C. L.; Zong, K.; Schottland, P.; Thompson, B. C.; Thomas, C. A.; Reynolds, J. R. Macromolecules, 2000, 33, 1132; Schottland, P.; Zong, K.; Gaupp, C. L.; Thompson, B. C.; Thomas, C. A.; Giurgiu, I.; Hickman, R.; Abboud, K. A.; Reynolds, J. R. Macromolecules 2000, 33, 7051). These compounds (5a–5e) were synthesized from the known intermediate dimethyl-N-benzyl-3,4-dihydroxypyrrole-2,5-dicarboxylate (1), in five steps in overall yields of 20–25%. This series of reactions (1,4-dioxane ring formation, benzyl group deprotection, hydrolysis, and decarboxylation) afforded the corresponding 3,4-ethylenedioxypyrrole (5a, EDOP) [Merz, A.; Schropp, R.; Dötterl, E. Synthesis, 1995, 795],4-(1,3-propylenedioxy) pyrrole (5b, ProDOP), 3,4-(1,4-butylenedioxy)pyrrole (5c, BuDOP), 3,4-(2-methyl-1,3-propylenedioxy)pyrrole (5d, ProDOP-Me) and 3,4-(2,2-dimethyl-1,3-propylenedioxy) pyrrole (5e, ProDOP-Me$_2$) in moderate to good yields (Schottland, P; Zong, K.; Gaupp, C. L.; Thompson, B. C.; Thomas, C. A.; Reynolds, J. R.; Macromolecules, 2000, 33, 1132).

Figure 19:
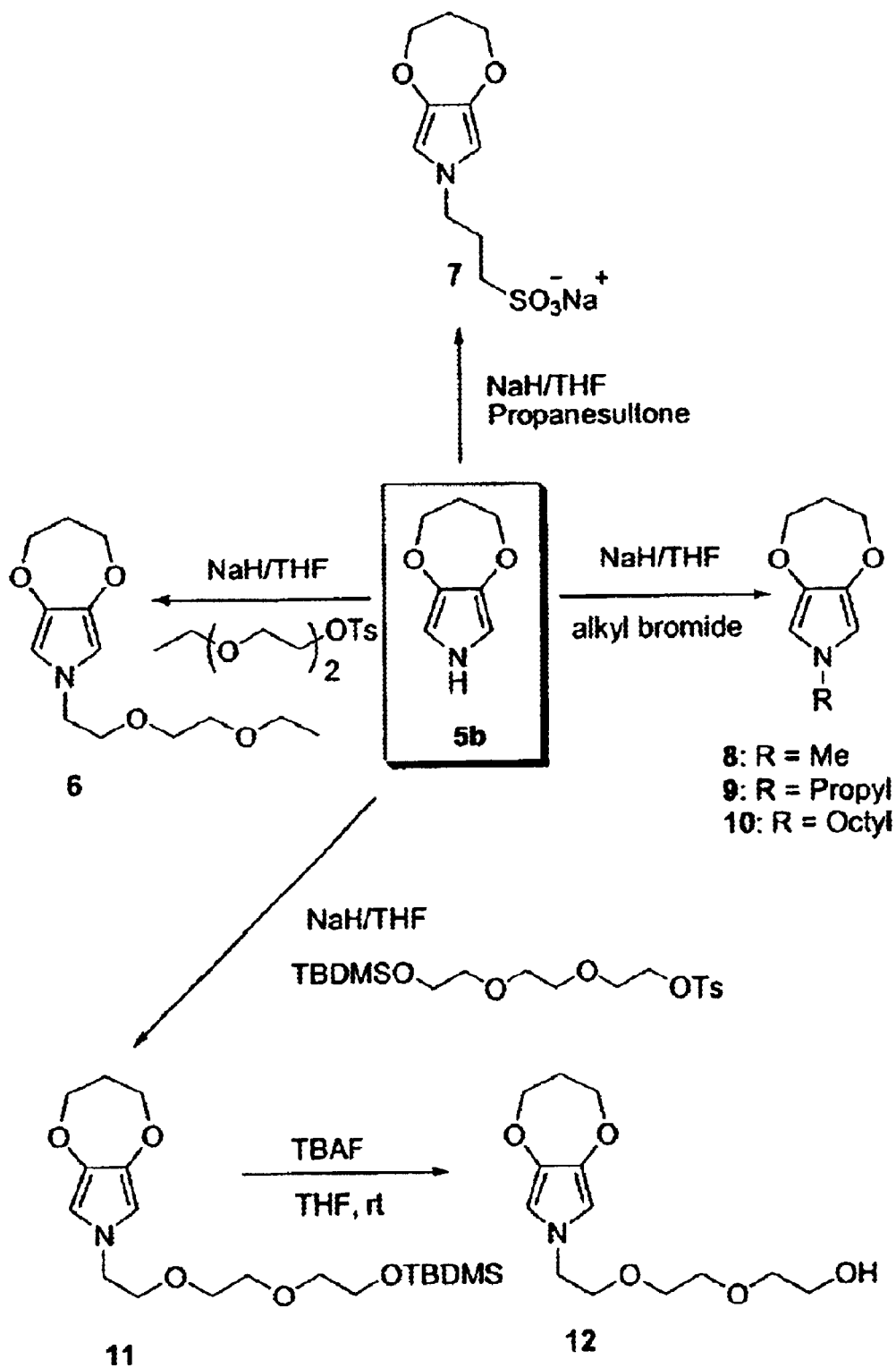
FIG. 19 shows N-alkylated ProDOPs with a variety of pendant substituents ranging from simple alkyl groups to glyme, glyme alcohol, and sulfonatoalkoxy derivatives.

With the parent monomers in hand, we investigated the N-alkylation of ProDOP with a variety of pendant substituents ranging from simple alkyl groups to glyme, glyme alcohol, and sulfonatoalkoxy derivatives as illustrated in FIG. 19. The ease of pyrrole functionalization provides new derivatives with a broad set of structural possibilities in a straightforward manner. Under the conditions used, ProDOP was easily N-alkylated in moderate to good yields of 40–85%. Increasing the polarity of the substituents suggests that the polymers derived from these monomers may ultimately prove useful as biocompatible substrates for cell growth (Thomas, C. A.; Zong, K.; Schottland, P.; Reynolds, J. R., Adv. Mater. 2000, 12, 222; Schmidt, C. E.; Shastri, V. R.; Vacanti, J. P.; Langer, R. Proc. Nat. Acad. Sci. USA, 1997, 94, 8948; Houseman, B. T.; Mrksich, M. J. Org. Chem. 1998, 63, 7552) and, in the case of the sulfonate derivatized system, yield water soluble and self-dopable conducting polymers (Sundaresan, N. S.; Basak, S.; Pomerantz, M.; Reynolds, J. R. J. Chem. Soc., Chem. Commun. 1987, 621; Patil, A. O.; Ikenoue, Y.; Wudl, F.; Heeger, A. J. J. Am. Chem. Soc. 1987, 109, 1858). In general, these N-derivatized ProDOPs can be isolated by column chromatography or precipitation and subsequently stored as solids/liquids under argon in the freezer prior to polymerization.

Figure 20:
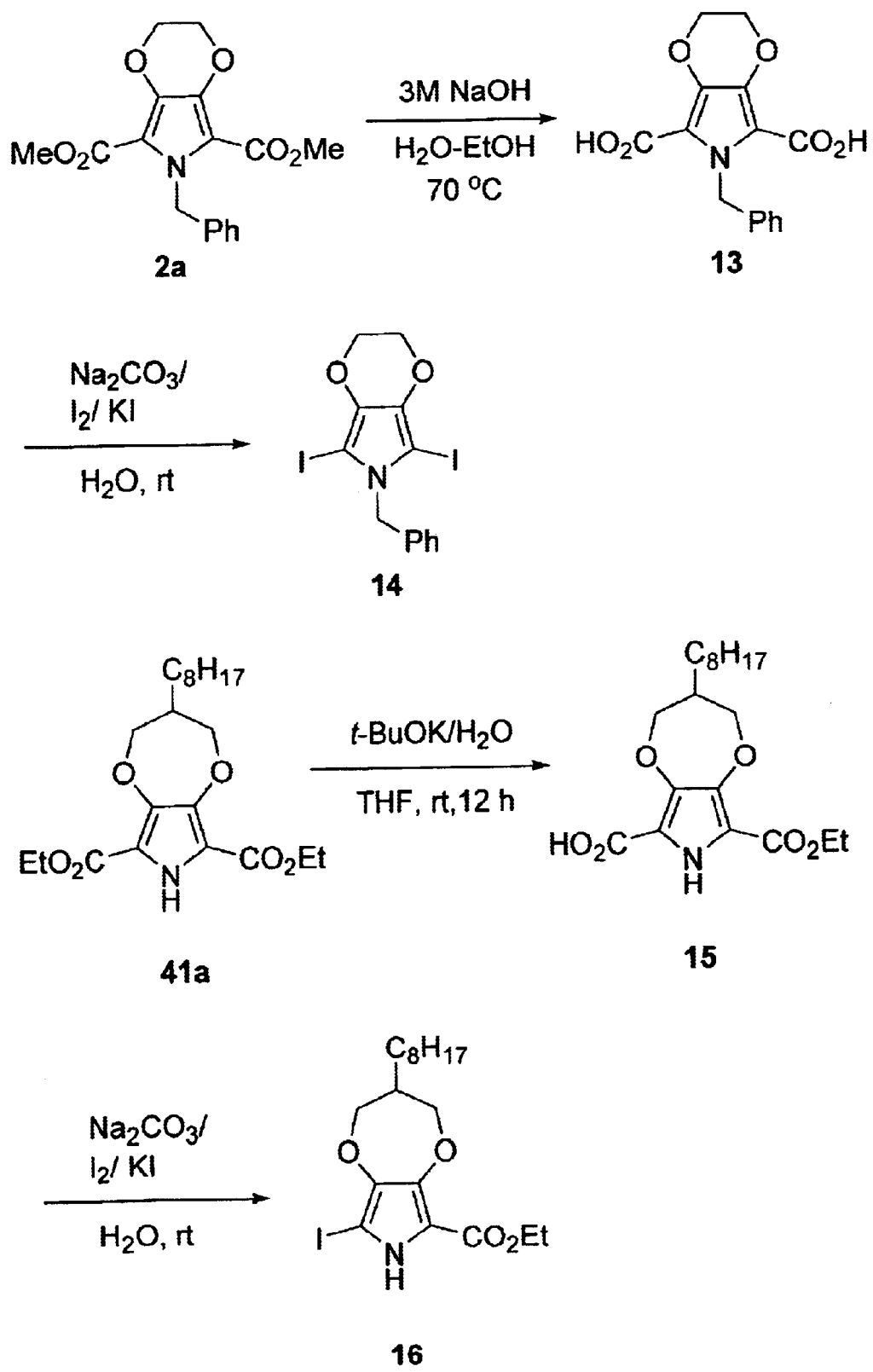
FIG. 20 illustrates iodo-decarboxylation on the N-benzyl-3,4-ethylenedioxypyrrole-2,5-dicarboxylic acid (13).

Next we considered the introduction of halides (bromide or iodide) at the 2- and 5-positions of the aromatic heterocycle in order to increase their utility in preparing multi-aryl ring monomers via transition metal mediated coupling methods such as the Stille, Heck, and Suzuki reactions. Using the thiophene analog EDOT as a comparison, multi-aryl ring monomers have provided a broad set of polymers with a high degree of control of their redox and optical properties (Groenendaal, L. B.; Jonas, F.; Freitag, D.; Pielartzik, H.; Reynolds, J. R. Adv. Mater. 2000, 12, 481). Bromination of EDOP was attempted under various conditions but was not successful due to the instability of EDOP. Bromination via bromine, NBS, and other reagents under standard conditions resulted in rapid and uncontrolled polymerization. We note that the highly electron-rich nature of EDOP, observable by the significantly lower oxidation potential for EDOP relative to pyrrole (Thomas, C. A.; Zong, K.; Schottland, P.; Reynolds, J. R. Adv. Mater. 2000, 12, 222; Gaupp, C. L.; Zong, K.; Schottland, P.; Thompson, B. C.; Thomas, C. A.; Reynolds, J. R. Macromolecules, 2000, 33, 1132; Schottland, P.; Zong, K.; Gaupp, C. L.; Thompson, B. C.; Thomas, C. A.; Giurgiu, I.; Hickman, R.; Abboud, K. A.; Reynolds, J. R. Macromolecules 2000, 33, 7051; Zotti, G.; Zecchin, S.; Schiavon, G.; Groenendaal, L. B. Chem. Mater. 2000, 12, 2996) favors this polymerization. A series of N-protected EDOPs, derivatized with t-BOC, tosyl, silyl, and benzyl groups, was subsequently synthesized and subjected to standard bromination conditions. Surprisingly, the tosyl protected EDOP was very sensitive to air and moisture, rendering the decomposed form. The t-BOC and silyl protected EDOP derivatives were fairly stable, though not enough to tolerate the subsequent oxidative reaction conditions. Finally, while the N-benzyl protected EDOP was sufficiently stable to tolerate the bromination reaction conditions without significant decomposition, successful bromination could not be achieved. As an alternative, iododecarboxylation was examined on the N-benzyl-3,4-ethylenedioxypyrrole-2,5-dicarboxylic acid (13) using a literature procedure (Chong, R.; Clezy, P. S. Aust. J. Chem. 1967, 20, 935; Merz, A.; Kronberger, J.; Dunsch, L.; Neudeck, A.; Petr, A.; Parkany, L. Angew. Chem. Int. Ed. 1999, 38, 1442), Gas shown in FIG. 20. The reaction proceeded smoothly to yield N-benzyl-2,5-diiodo-EDOP (14) in excellent yield which was sufficiently stable for further reaction. In an initial study employing 14, transition metal mediated coupling with 2-trimethyl-stannyl-EDOT lead to the easily oxidized 2,5-bis(2-EDOT)EDOP. As will be illustrated later, the diester/diol derivative of 3,4-dioxypyrrole can also serve as an intermediate to C-alkylation derivatives. In this instance, diester 41a (Scheme 3) could be selectively hydrolyzed (Gassman, P. G.; Schenk, W. N. J. Org. Chem. 1977, 42, 918) by treatment with excess potassium t-butoxide/$H_2O$ (1:1) to yield the mono-hydrolyzed product (15). Subsequent iodo-decarboxylation could be accomplished in the presence of the ester to yield the mono-iodo-compound 16.

Figure 21:
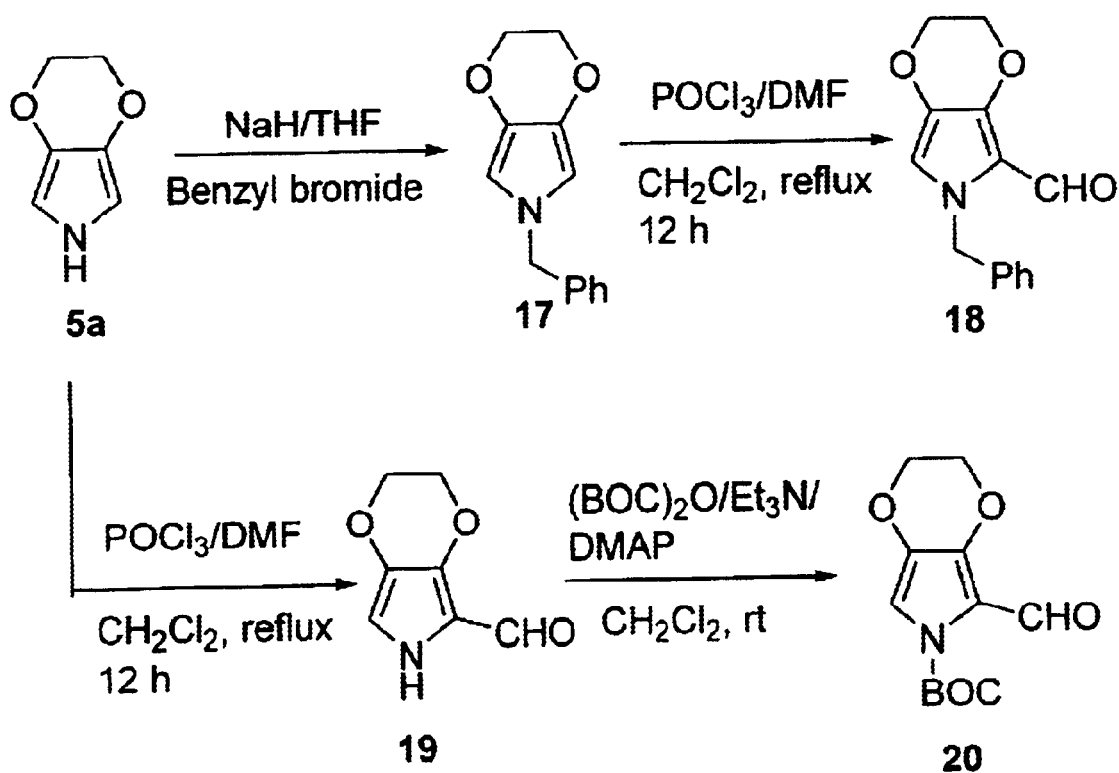
FIG. 21 illustrates the benzyl protection of EDOP proceeded well in a 90% yield to provide N-benzyl-EDOP (17).

In order to obtain useful EDOP monomer derivatives, it is desirable to have N-protected EDOP on hand with the 2- and 5-positions open for further chemical transformations. Several protecting groups were examined and the benzyl and t-BOC groups provided the most useful derivatives in terms of stability, ability for further reaction, and subsequent deprotection. As shown in FIG. 21, the benzyl protection of EDOP proceeded well in a 90% yield to provide N-benzyl-EDOP (17). In another route beginning with an EDOP precursor, the N-benzyl protected 2,5-diester derivative 2a was hydrolyzed to diacid 13 and subsequently decarboxylated by heating in triethanolamine for a short period to yield N-benzyl-EDOP (17) in excellent yield. This latter route is preferred in the synthesis of 17 due to the lack of necessity for isolating EDOP (5a).

With a stable N-benzyl EDOP in hand, we next explored the 2-formylation of 17 via the Vilsmeier-Haack method using a literature procedure (Eachern, A. M.; Soucy, C.; Leitch, L. C.; Arnason, J. T.; Morand, P. Tetrahedron, 1988, 44, 2403). The Vilsmeier-Haack reagent was prepared under standard conditions ($POCl_3$/DMF in $CH_2Cl_2$) and as shown in FIG. 21, direct treatment of 17 with this reagent followed by hydrolysis gave aldehyde 18 in moderate yield. In another route, also shown in FIG. 21, direct treatment of EDOP with the Vilsmeier-Haack reagent under similar conditions yielded the 2-formyl-EDOP (19) and subsequent N-protection by t-BOC gave 20 in good yield. These formylated EDOP derivatives are very useful for further chemical transformations such as Knoevenagel or Wittig type reactions which can be used to incorporate EDOP into more highly conjugated monomer systems.

Figure 22:
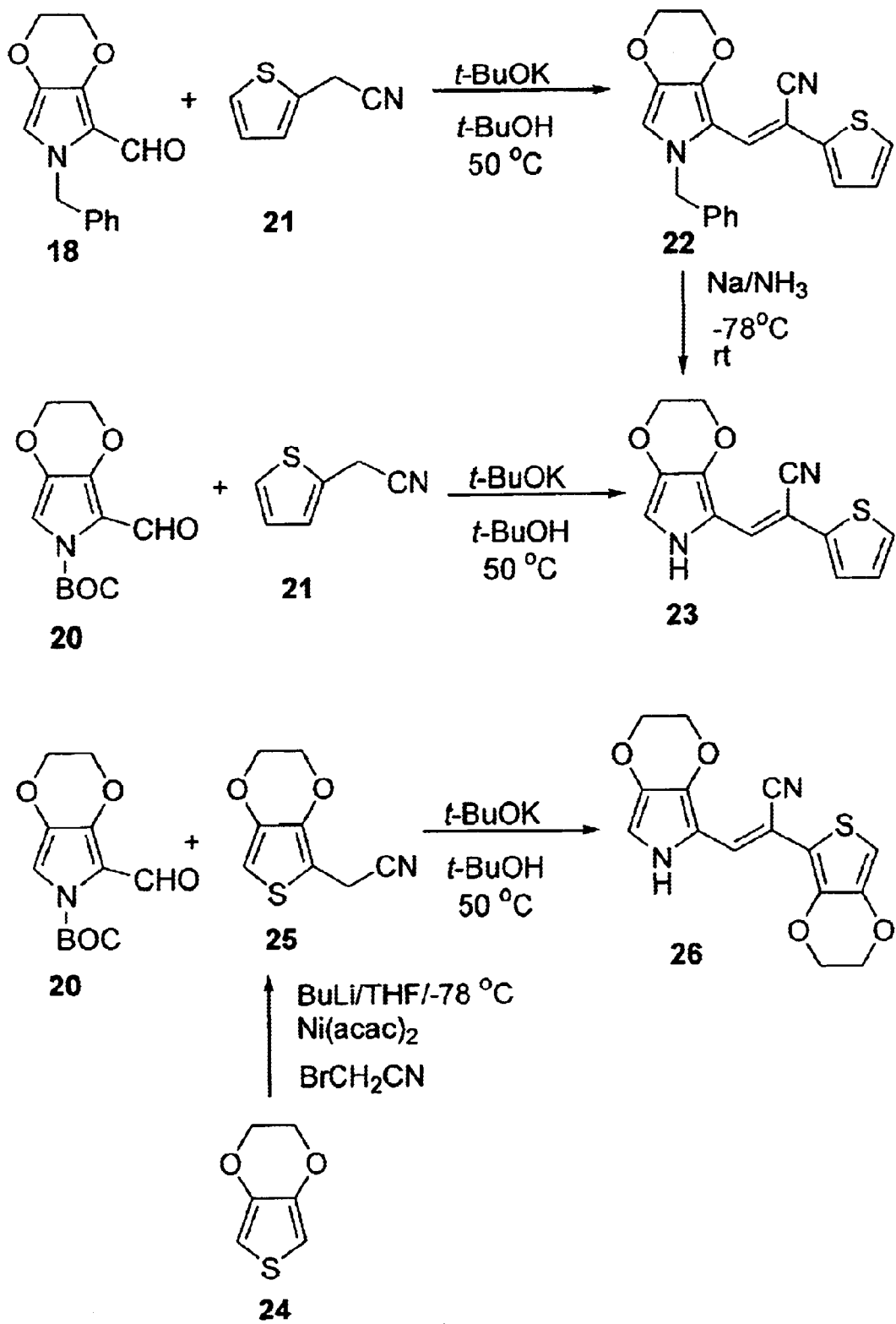
FIG. 22 illustrates the method of synthesis of combined EDOT, EDOP, and thiophene: cyclovinylene donor acceptor monomers.

Conjugated polymers containing alternating donor and acceptor units along the backbone have recently received significant attention due to their reduced electronic band gap and ability to be both p- and n-type doped (van Mullekom, H. A. M.; Vekemans, J. A. J. M.; Havinga, E. E.; Meijer, E. W. Mater. Sci. Eng., 2001, 32, 1). In such polymers, we have utilized the cyanovinylene unit as an electron acceptor and reported the synthesis and electrochemical properties of polymer derivatives made from 1-cyano-2-(3,4-ethylenedioxythienyl)-1-(2-thienyl)vinylene (Th-CNV-EDOT) and 1-cyano-1,2-bis(2-(3,4-ethylenedioxythienyl)vinylene (EDOT-CNV-EDOT) (Sotzing, G. A.; Thomas, C. A.; Reynolds, J. R.; Steel, P. J. Macromolecules, 1998, 31, 3750.). In this work, we note that by combining appropriate donors with the cyanovinylene acceptor we could design polymers with a systematic tuning of the electronic band gap from 1.1 eV to 1.6 eV (Thomas, C. A.; Reynolds, J. R. ACS Symp. Ser. 1999, 735, 367). Due to the high HOMO level of EDOP, we felt that this system might prove especially useful for closing the band gap further. The Knoevenagel condensation of N-benzyl EDOP-aldehyde 18 with 2-thienylacetonitrile afford N-benzyl protected 1-cyano-2-(2-(3,4-ethylenedioxypyrryl))-1-(2-thienyl)vinylene 22 and subsequent deprotection using $Na/NH_3$ gave Th-CNV-EDOP (23) in moderate yield as shown in Scheme 5 (Thomas, C. A.; Zong, K.; Reynolds, J. R., to be published). Within this route, the benzyl group deprotection was found to be difficult and the most commonly used procedures (solvolysis and catalytic hydrogen transfer) were unsuccessful, requiring the use of $Na/NH_3$. In order to overcome this problem, the t-BOC-protected EDOP-aldehyde 20 was employed in the reaction. As illustrated in FIG. 22, the condensation proceeded smoothly to yield the desired product and interestingly occurred with concurrent deprotection. This concurrent condensation and deprotection allowed a simple one-pot reaction by treatment with excess base. It should be noted that the unprotected EDOP-aldehyde 19 did not undergo condensation under similar conditions. Extending this chemistry to an EDOT derivative, 2-(3,4-ethylenedioxythienyl)acetonitrile (25) was synthesized according to a known procedure (Sotzing, G. A.; Thomas, C. A.; Reynolds, J. R.; Steel, P. J. Macromolecules, 1998, 31, 3750) and condensation with 20 gave 1-cyano-2-(2-(3,4-ethylenedioxypyrryl))-1-(2-(3,4-ethylenedioxythienyl)vinylene (EDOP-CNV-EDOT) (26) in good yield.

In addition to the potentially useful electronic and optical properties provided by polyheterocycles, ionic interactions within the material also suggest their potential in ionic drug release (Pernaut, J. M.; Reynolds, J. R. J. Phys. Chem. B. 2000, 104, 4080) and as ion-sensing materials (McQuade, D.

Figure 23:
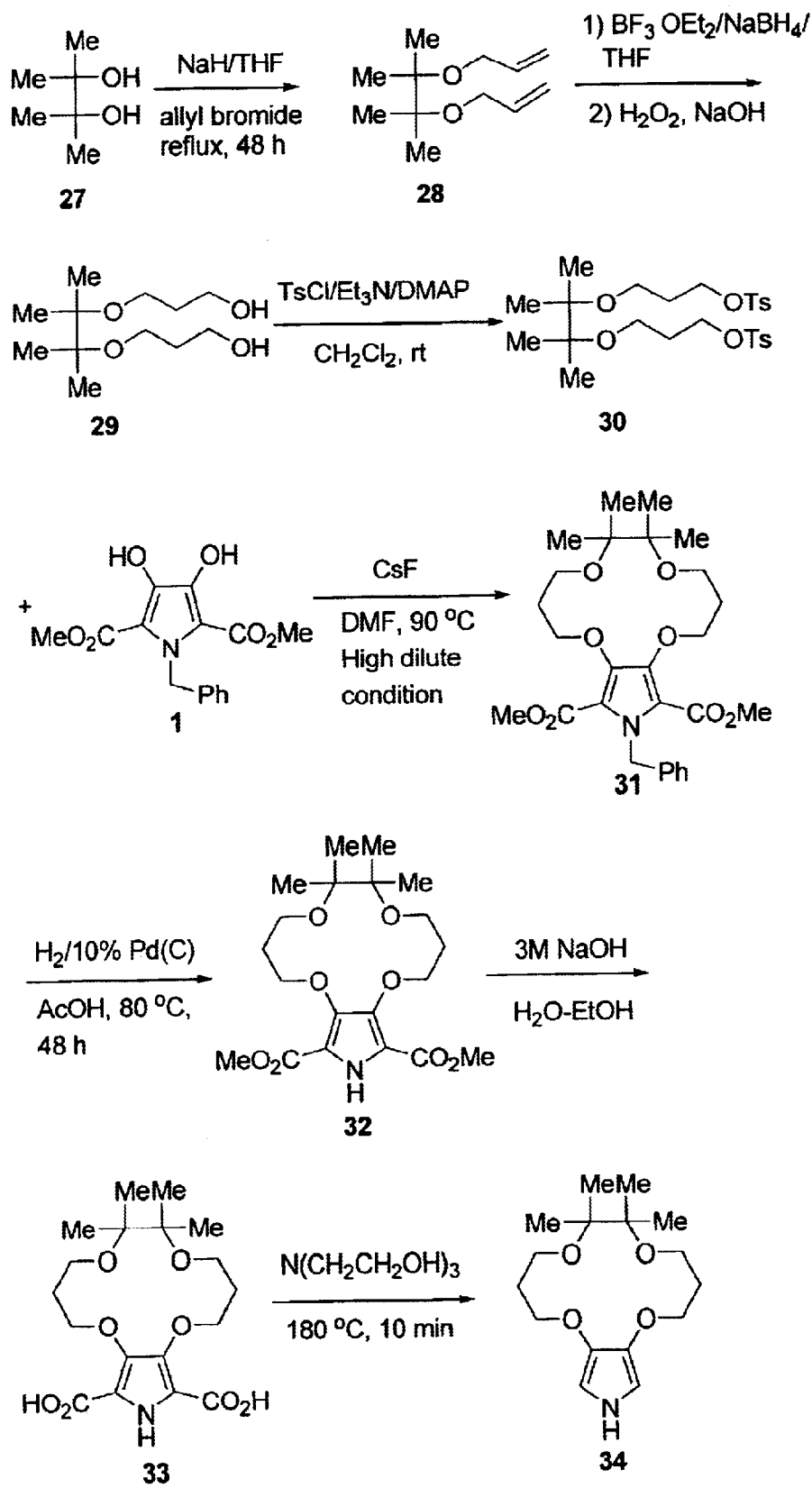
FIG. 23 illustrates the design and synthesis of a 14-crown-4-ether derivatized dioxypyrrole.

T.; Pullen, A. E.; Swager, T. M. Chem. Rev. 2000, 100, 2537). In this area, the possibility of fusing ion complexing groups directly onto conjugated polymer, such that they are in direct electronic communication with the π system, is one route in which high sensitivity sensing materials may be accessible (Reddinger, J. L.; Reynolds, J. R. Chem. Mater. 1998, 10, 3). In connection with the alkylenedioxypyrrole chemistry discussed here and, toward this end, a 14-crown-4-ether derivatized dioxypyrrole was designed and synthesized as illustrated in FIG. 23 which may be potentially useful as a polymeric lithium sensor. Polymerization, redox switching, and ion dependent electrochemical results show this polymer to exhibit a strong electrochromic response which may yield ionochromic materials (Pernaut, J.-M.; Zong, K.; Reynolds, J. R. to be published).

To begin this synthesis, ditosylate 30 was prepared from pinacol (27) according to a literature procedure (Alston, D. R.; Stoddart, J. F.; Wolstenholme, J. B.; Allwood, B. L.; Williams, D. J. Tetrahedron, 1985, 41, 2923) Diol 29 was synthesized through O-allylation, followed by hydroboration/oxidation, and subsequent tosylation to yield 30 as a coupling partner to the dioxypyrrole 1. The coupling reaction was performed by the procedure developed by Murashima and coworkers (Murashima, T.; Uchihara, Y.; Wakamori, N.; Uno, H.; Ogawa, T.; Ono, N. Tetrahedron Lett. 1996, 37, 3133) with slight modifications. In order to achieve a good coupling yield, the traditional preparation method uses simultaneous injection of the two reactants by syringe to the refluxing reaction vessel. The procedure employed here avoids the use of these syringes by employing a Dean-Stark trap and was found to be convenient without any significant yield difference. Deprotection of the benzyl group by catalytic hydrogen transfer and hydrolysis gave the diacid 33 in good yield. Subsequent decarboxylation of 33 in hot triethanolamine gave the 14-crown-4-ether 34 in a 30% yield based on 1.

Figure 24:
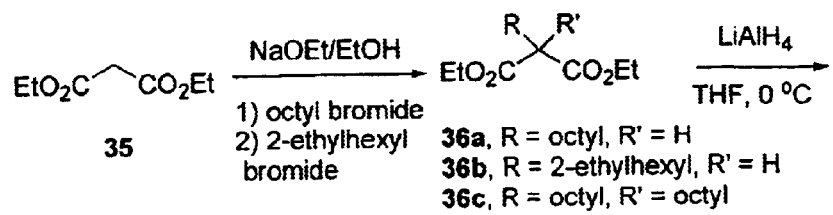
FIG. 24 provides a scheme for the synthesis of a series of modified ProDOP monomers having alkyl chains appended to the central methylene of the propylenedioxy moiety.
Figure 24:
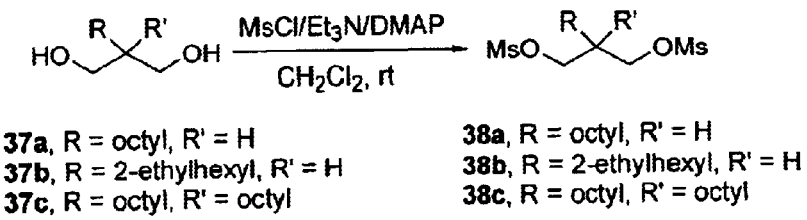
Figure 24:
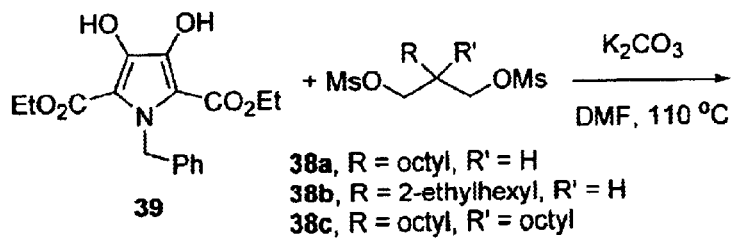
Figure 24:
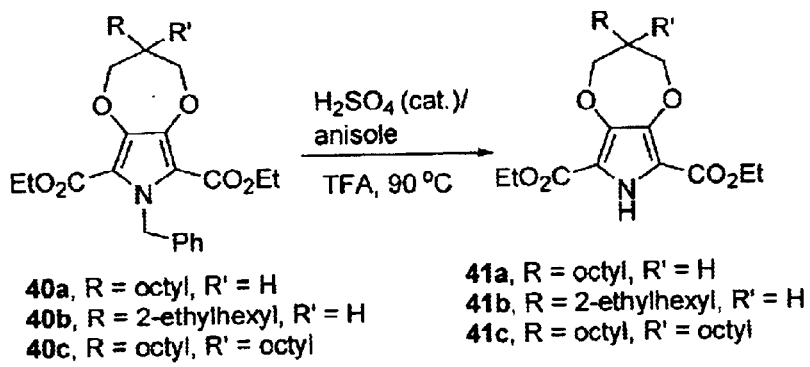
Figure 24:
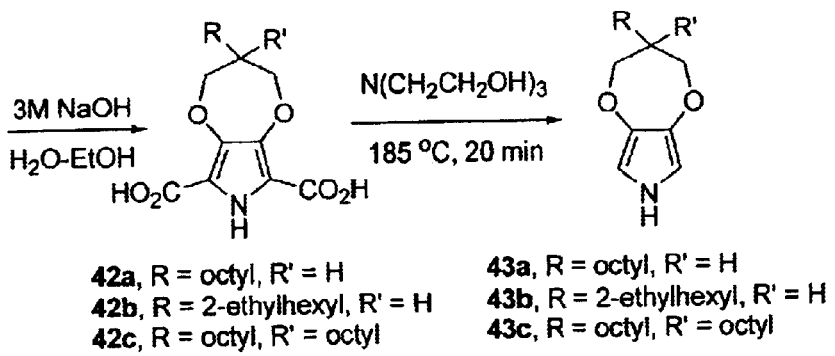

The monomers described above were designed to be used in oxidative electrochemical polymerizations in which the resultant polymers deposit onto the electrode surfaces as insoluble redox active and conducting films. This method can be especially useful when preparing polymers for electrochemically-based devices, but proves to be especially low in the bulk yield of polymer obtained based on the amount of monomer used. Ultimately, it is especially desirable to prepare monomer derivatives which can be polymerized using bulk synthesis conditions and which will yield solution processable polymers. As such, a high conversion of monomer to polymer is possible. This has been demonstrated for numerous conjugated polymer systems, especially those based on polythiophenes (Handbook of Conducting Polymers, $2^{nd}$ Ed., Skotheim, T. A.; Elsenbaumer, R. L.; Reynolds, J. R., Eds., Marcel Dekker: New York, 1998). Towards this end, we have synthesized a series of modified ProDOP monomers having alkyl chains appended to the central methylene of the propylenedioxy moiety, as illustrated in FIG. 24.

Diethyl malonate was alkylated with octylbromide and 2-ethylhexylbromide to yield the mono- and di-alkylated malonates 36a, 36b, and 36c, respectively. After separation, reduction of the diesters with LiAlH$_4$ led to diols 37a, 37b, and 37c which were converted into di-mesylates 38a, 38b, and 38c, respectively. The alkylenedioxy ring formation reaction of N-benzyl-3,4-dihydroxypyrrole-2,5-dicarboxylate (39) with the di-mesylates was performed according to the Merz procedure[8] to yield the cyclized products 40a, 40b, and 40c in moderate to good yield, respectively. Utilizing the procedures employed for the preparation of the XDOP series (Scheme 1), the octyl and ethylhexyl derivatized ProDOPs 43a, 43b, and 43c were synthesized. To date, we have shown that these monomers can undergo oxidative polymerization chemically and electrochemically to give rise to soluble polymers (Zong, K. Z.; Reynolds, J. R. to be published).

The alkylenedioxypyrrole building block provides an immense flexibility for the synthesis of an entirely new family of electron-rich monomers for the synthesis of conducting polymers. N-alkylation allows the incorporation of pendant substituents ranging from non-polar hydrocarbon, through polar neutral species, to ionic species. ProDOPs substituted at the central methylene carbon of the alkylene bridge are easily synthesized. Having these two derivatization positions accessible while not affecting the polymerization position opens up a number of further possibilities, including those in which both N- and C-substitution is carried out on the same molecule. Utilizing various protecting groups at the 3,4-alkylenedioxypyrrole nitrogen allows chemistry to be successfully carried out at the 2-position. Our demonstration of successful halogenation and formylation on 3,4-ethylenedioxypyrrole serves as representative synthetic intermediates for more complex monomer syntheses. We have demonstrated the utility of these derivatives through the coupling of the diiodo molecules with 2-trimethylstannyl-EDOT and the formation of cyanovinylene-linked diheterocycle monomers using the formylated derivative. By controlling the chemistry of the fused dioxy ring system, we can also append ionically interacting systems such as the crown ether moiety demonstrated here. All of these derivatives are illustrative of the many other possibilities that the alkylenedioxypyrroles provide.

General Procedure of N-alkylation of ProDOP (6, 8–11): Sodium hydride (1.2 equiv. free from mineral oil) was carefully added to a solution of ProDOP (1.0 equiv.) in freshly distilled THF at 0° C. After stirring for 1 h, alkylating reagents (1.2 equiv.) were added and the reaction mixtures were refluxed for 3–4 h. After cooling to room temperature, the THF was removed by rotary evaporator and aqueous NH$_4$Cl was carefully added. The aqueous solution was extracted with ether (3 times) and dried over MgSO$_4$. Purification by column chromatography on silica gel using hexane/ethyl acetate afforded the desired N-alkylated ProDOPs.

1-[2-(2-Ethoxy-ethoxy)-ethyl]-3,4-(1,3-propylenedioxy) pyrrole (6). After workup, the crude was purified by column chromatography on silica gel using hexane/ethyl acetate (2:1) as eluent to yield the product as a colorless oil (350 mg, 40%); $^1$H NMR (300 MHz, CDCl$_3$) δ6.22 (s, 2H), 3.96 (m, 4H), 3.81 (t, J=5.5 Hz, 2H), 3.67 (t, J=5.5 Hz, 2H), 3.55 (m, 4H), 3.51 (q, J=7.1 Hz, 2H), 2.11 (m, 2H), 1.20 (t, J=7.1 Hz, 3H); FT-IR (CDCl$_3$) 3021, 2960, 1559, 1541 cm$^{-1}$; HRMS (FAB) (MH$^+$) calcd for C$_{13}$H$_{22}$NO$_4$ 256.1548, found 256.1553.

3-[3,4-(1,3-propylenedioxy)pyrrol-1-yl]-propyl sodium-sulfonate (7). Sodium hydride (0.11 g, 4.70 mmol, washed by pentane) was carefully added to a solution of ProDOP (0.50 g, 3.60 mmol) in freshly distilled THF at 0° C. After stirring for 1 h, 1,3-propanesultone (0.57 g, 4,70 mmol) were added and the reaction mixtures were refluxed for 48 h. After the reaction was completed, the resulting solid was filtered and washed with acetone repeatedly to afford the product as a white powder (1.2 g, 85%); mp >250° C. (decomp); $^1$H NMR (300 MHz, DMSO-d$_6$) δ6.25 (s, 2H), 3.83 (m, 4H), 3.70 (t, J=6.6 Hz, 2H), 2.33 (t, J=7.1 Hz, 2H), 1.98 (m, 2H), 1.86 (pentet, J=7.6 Hz, 2H); $^{13}$C NMR (75 MHz, DMSO-d$_6$)

δ137.5, 105.4, 71.4, 48.1, 39.3, 34.8, 27.1; FT-IR (CDCl$_3$) 3022, 1545, 1419, 1366, 1216, 1185, 1060 cm$^{-1}$; HRMS (FAB) (MH$^+$) calcd for C$_{10}$H$_{15}$NO$_5$SNa 284.0568, found 284.0569.

N-Methyl-3,4-(1,3-propylenedioxy)pyrrole (8). After workup, the crude was purified by column chromatography on silica gel using hexane/ethyl acetate (3:1) as eluent to yield the product as a colorless oil (250 mg, 45%); $^1$H NMR (300 MHz, CDCl$_3$) δ6.14 (s, 2H), 3.97 (m, 4H), 3.46 (s, 3H), 2.13 (m, 2H); $^{13}$C NMR (75 MHz, CDCl$_3$) δ129.5, 106.5, 72.8, 34.2, 24.5; FT-IR (CDCl$_3$) 3021, 1460, 1371, 1216, 1056 cm$^{-1}$; HRMS (EI) (M$^+$) calcd for C$_8$H$_{11}$NO$_2$ 153.0789, found 153.0723.

N-Propyl-3,4-(1,3-propylenedioxy)pyrrole (9). After workup, the crude was purified by column chromatography on silica gel using hexane/ethyl acetate (3:1) as eluent to yield the product as a colorless oil (150 mg, 40%); $^1$H NMR (300 MHz, CDCl$_3$) δ6.17 (s, 2H), 3.97 (m, 4H), 3.59 (t, J=7.1 Hz, 2H), 2.12 (m, 2H), 1.71 (m, 2H), 0.87 (t, J=7.1 Hz, 3H); $^{13}$C NMR (75 MHz, CDCl$_3$) δ128.6, 105.7, 72.3, 51.9, 35.2, 24.3, 11.1; FT-IR (CDCl$_3$) 3043 (s), 2989 (s), 1558 (s), 1423 (m), 1225 (s), 919 (s) cm$^{-1}$; HRMS (EI) (M$^+$) calcd for C$_{10}$H$_{15}$NO$_2$ 181.1102, found 181.1125.

N-Octyl-3,4-(1,3-propylenedioxy)pyrrole (10). After workup, the crude was purified by column chromatography on silica gel using hexane/ethyl acetate (3:1) as eluent to yield the product as a colorless oil (220 mg, 48%); $^1$H NMR (300 MHz, CDCl$_3$) δ6.17 (s, 2H), 3.97 (m, 4H), 3.61 (t, J=7.1 Hz, 2H), 2.12 (m, 2H), 1.62 (m, 2H), 1.20 (m, 10H), 0.87 (t, J=7.1 Hz, 3H); $^{13}$C NMR (75 MHz, CDCl$_3$) δ135.8, 105.7, 73.2, 72.4, 35.2, 33.1, 31.7, 29.3, 29.2, 29.1, 26.8, 22.6; FT-IR (CDCl$_3$) 3055, 2988, 1558, 1421, 1265, 909, 706 cm$^{-1}$; HRMS (EI) (M$^+$) calcd for C$_{15}$H$_{25}$NO$_2$ 251.1885, found 251.1901.

2-(2-{2-[3,4-(1,3-Propylenedioxy)pyrrol-1-yl]-ethoxy}-ethoxy)-ethanol (12). The semi-purified product 11 was dissolved in THF and tetrabutylammonium fluoride (1.0 M in THF) was added and stirred for 1 h at room temperature. After workup, the crude was purified by column chromatography on silica gel using hexane/ethyl acetate (1:1) as eluent to yield the product as a colorless oil (0.5 g, 55%); $^1$H NMR (300 MHz, CDCl$_3$) δ6.25 (s, 2H), 3.96 (m, 4H), 3.80 (t, J=4.9 Hz, 2H), 3.75–3.63 (m, 4H), 3.63–3.52 (m, 6H), 2.11 (m, 2H); $^{13}$C NMR (75 MHz, CDCl$_3$) δ138.8, 106.3, 72.5, 72.3, 71.1, 70.7, 70.4, 61.8, 50.1, 35.1; FT-IR (CDCl$_3$) 3448, 2930, 2872, 1557, 1460, 1413 cm$^{-1}$; HRMS (EI) (M$^+$) calcd for C$_{13}$H$_{21}$NO$_5$ 271.1419, found 271.1405; Anal. Calcd for C$_{13}$H$_{21}$NO$_5$: C, 57.55; H, 7.80; N, 5.16. Found: C, 57.28; H, 7.64; N, 5.05.

N-benzyl-3,4-ethylenedioxypyrrole-2,5-dicarboxylic acid (13). The diester 2a (10 g, 0.03 mol) was suspended in 3 M NaOH aqueous solution (150) and ethanol (10–20 mL) was added as a co-solvent. The reaction mixture was stirred vigorously at 70–80° C. for 6 h. After cooling to 0° C. in an ice-water bath, the reaction mixture was carefully acidified with concentrated HCl. The resulting white precipitate was collected by filtration and washed with water twice to give the diacid as a white powder (8.6 g, 95%); mp 219° C. (decomp); $^1$H NMR (300 MHz, DMSO-d$_6$) δ12.80 (br, 2H), 7.25 (m, 3H), 6.85 (m, 2H), 5.74 (s, 2H), 4.22 (s, 4H); $^{13}$C NMR (75 MHz, DMSO-d$_6$) δ161.8, 140.6, 137.1, 129.1, 127.5, 126.7, 111.7, 65.8, 47.8; HRMS (FAB) (MH$^+$) calcd for C$_{15}$H$_{14}$NO$_6$ 304.0821, found 304.0820.

N-benzyl-2,5-diiodo-3,4-ethylenedioxypyrrole (14) (iodo-decarboxylation). Diacid 13 (0.5 g, 1.65 mmol) was dissolved in an aqueous solution of sodium carbonate (7.7 g, 72.6 mmol) in 30 mL of water. A solution of iodine (0.92 g, 3.69 mmol) and potassium iodide (2.0 g, 12.11 mmol) in water was prepared. The solution of the diacid was slowly titrated by the solution of iodine and potassium iodide at room temperature. As the red-iodine color quickly disappeared in the process of reaction, a white precipitate was formed. After stirring for 30 minutes after the addition was completed, a white precipitate was collected by filtration and washed with water several times to remove inorganic compounds to yield N-benzyl-2,5-diiodo-3,4-ethylenedioxypyrrole (14) as a white powder (0.56 g, 85%): mp 154–155° C.; $^1$H NMR (300 MHz, CDCl$_3$) δ7.25 (m, 3H), 6.99 (m, 2H), 5.09 (s, 2H), 4.26 (s, 4H); $^{13}$C NMR (75 MHz, CDCl$_3$) δ137.7, 137.3, 128.5, 127.3, 126.4, 110.1, 66.5, 53.7; HRMS (FAB) (M$^+$) calcd for C$_{13}$H$_{11}$NO$_2$I$_2$ 466.8879, found 466.8805; Anal. Calcd for C$_{13}$H$_{11}$NO$_2$I$_2$: C, 33.43; H, 2.37, N, 3.00. Found: C, 34.17; H, 2.42; N, 2.94.

2-Ethoxycarbonyl-3,4-[2-(2-Ethylhexyl)-1,3-propylenedioxy]pyrrole-5-carboxylic acid (15). To a solution of diester 41a (4.0 g, 10.11 mmol) in THF was added potassium t-butoxide (4.5 g, 40.44 mmol) and H$_2$O (0.73 g, 40.44 mmol) at 0° C. After stirring for 30 minutes, the reaction mixture was stirred at room temperature overnight. The THF was removed by rotary evaporator and the residue was diluted with water, cooled by ice-water, and acidified with concentrated hydrochloric acid to yield a pale yellow precipitate. After filtering, the product was washed with water and vacuum dried to yield a pale yellow solid as a mono-hydrolyzed compound. A pale yellow solid (3.3 g, 90%): mp 156–157° C.; $^1$H NMR (300 MHz, CDCl$_3$) δ9.06 (s, 1H), 7.60 (br, 1H), 4.37 (q, J=7.1 Hz, 2H), 4.28 (dd, J=11.5, 2.7 Hz, 1H), 4.24 (dd, J=11.5, 3.3 Hz, 1H), 4.05 (dd, J=14.8, 6.6 Hz, 1H), 4.00 (dd, J=14.8, 6.6 Hz, 1H), 2.30 (m, 1H), 1.36 (t, J=7.1 Hz, 3H), 1.40–1.20 (m, 11H), 0.87 (m, 6H); $^{13}$C NMR (75 MHz, CDCl$_3$) δ161.2, 159.6, 129.6, 112.3, 110.0, 101.4, 76.7, 76.2, 61.0, 40.2, 36.1, 32.9, 31.6, 28.7, 25.9, 23.1, 14.3, 14.0, 10.5; HRMS (FAB) (MH$^+$) calcd for C$_{19}$H$_{30}$NO$_6$ 368.2073, found 368.2070; Anal. Calcd for C$_{19}$H$_{29}$NO$_6$: C, 62.11; H, 7.96; N, 3.81. Found: C, 62.32; H, 7.57; N, 3.73.

Ethyl 2-iodo-3,4-[2-(2-Ethylhexyl)-1,3-propylenedioxy]pyrrole-5-carboxylate (16). The procedure taken here is similar to that of compound 15. A light yellow oil (0.3 g, 60%); $^1$H NMR (300 MHz, CDCl$_3$) δ8.63 (s, 1H), 4.34 (q, J=6.5 Hz, 2H), 4.15 (dd, J=11.5, 2.7 Hz, 1H), 4.10 (dd, J=11.5, 3.3 Hz, 1H), 3.94 (dd, J=12.1, 7.1 Hz, 1H), 3.82 (dd, J=12.1, 7.1 Hz, 1H), 2.24 (m, 1H), 1.34 (t, J=7.1 Hz, 3H), 1.39–1.15 (m, 11H), 0.91–0.82 (m, 6H); $^{13}$C NMR (75 MHz, CDCl$_3$) δ160.1, 139.5, 128.7, 110.1, 76.3, 76.2, 60.3, 40.5, 36.2, 32.9, 31.7, 28.7, 25.9, 23.1, 14.5, 14.0, 10.5; FT-IR (CDCl$_3$) 3440, 2963, 2931, 2892, 1690, 1525 cm$^{-1}$; HRMS (FAB) (MH$^+$) calcd for C$_{18}$H$_{29}$NO$_4$I 450.1141, found 450.1104.

N-benzyl-3,4-ethylenedioxypyrrole (17). A solution of EDOP (1.0 g, 8.0 mmol) in THF was cooled to 0° C. and mineral oil free sodium hydride (0.27 g, 12 mmol) was added. After stirring for 20 min., benzyl bromide (1.3 g, 8.0 mmol) in THF was added and the reaction mixture was stirred for 6 h at room temperature. The reaction mixture was concentrated under reduced pressure, diluted with ether, carefully washed with water, and dried over MgSO$_4$. After being concentrated, the residue was purified by chromatography on silica gel using hexane/ethyl acetate (3:1) as eluent to yield a white crystalline product (1.5 g, 90%): mp 69–70° C.; $^1$H NMR (300 MHz, CDCl$_3$) δ7.31 (m, 3H), 7.10 (m, 2H), 6.10 (s, 2H), 4.83 (s, 2H), 4.18 (s, 4H); $^{13}$C NMR (75 MHz, CDCl$_3$) δ138.1, 128.5, 127.7, 127.1, 110.0, 101.7, 65.8, 53.9; FT-IR (CDCl$_3$) 3021, 2980, 2920, 1553, 1425, 1374, 1365 cm$^{-1}$; HRMS (FAB) (MH$^+$) calcd for C$_{13}$H$_{14}$NO$_2$ 216.1024, found 216.1025; Anal. Calcd for C$_{13}$H$_{13}$NO$_2$: C, 72.54; H, 6.09; N, 6.51. Found: C, 72.30; H, 6.04; N, 6.46.

N-benzyl-3,4-ethylenedioxypyrrole (17) from decarboxylation. A round-bottom flask was filled with triethanolamine and heated to 180° C. under argon with vigorous stirring. The diacid 13 (8.5 g, 28.0 mmol) was quickly added as one portion and vigorously stirred for 10 min. The reaction mixture was cooled to room temperature and poured into water. After extracting with methylene chloride (100 mL×3), the combined organic layers were washed with water, dried over MgSO$_4$, and concentrated under reduced pressure. The residue was purified by chromatography on silica gel (deactivated with triethylamine) using hexane/ethyl acetate (3:1) as eluent to yield a white crystalline product (5.4 g, 90%): mp 69–70° C. (identical to 17).

N-Benzyl-2-formyl-3,4-ethylenedioxypyrrole (18). Vilsmeier reagent was prepared by a procedure according to the literature (Eachem, A. M.; Soucy, C.; Leitch, L. C.; Arnason, J. T.; Morand, P. Tetrahedron, 1988, 44, 2403) POCl$_3$ (0.71 g, 4.65 mmol) was added to a DMF (0.34 g, 4.65 mmol) solution in methylene chloride (3.0 mL) at 0° C. and the reaction mixture was allowed to come to room temperature. The solution was then slowly added to a solution of N-benzyl-3,4-ethylenedioxypyrrole (1.0 g, 4.65 mmol) in methylene chloride (5.0 mL) at 0° C. and allowed to come to room temperature. After stirring for 12 h, an excess of 3.0 M NaOH solution was added and stirred for 2 h in a hot water bath. The reaction mixture was extracted with methylene chloride (25 mL×3) and the combined organic layers were dried over MgSO$_4$. Purification of the residue was accomplished by chromatography on silica gel using hexane/ethyl acetate (3:1) as eluent to afford the product as a white solid (0.8 g, 70%): mp 75° C.; $^1$H NMR (300 MHz, CDCl$_3$) δ9.53 (s, 1H), 7.26 (m, 3H), 7.20 (m, 2H), 6.44 (s, 1H), 5.36 (s, 2H), 4.29 (m, 2H), 4.20 (m, 2H); $^{13}$C NMR (75 MHz, CDCl$_3$) δ175.0, 149.9, 137.6, 131.5, 128.6, 127.6, 127.4, 114.5, 114.1, 66.0, 65.2, 52.1; FT-IR (CDCl$_3$) 3021, 2825, 2720, 1646 cm$^{-1}$; HRMS (FAB) (MH$^+$) calcd for C$_{14}$H$_{14}$NO$_3$ 244.0973, found 244.0983; Anal. Calcd for C$_{14}$H$_{13}$NO$_3$: C, 69.12; H, 5.39; N, 5.76. Found: C, 69.00; H, 5.41; N, 5.74.

2-Formyl-3,4-ethylenedioxypyrrole (19). POCl$_3$ (1.67 g, 10.92 mmol) was added to a solution of DMF (0.84 g, 11.44 mmol) in methylene chloride (5.0 mL) at 0° C. and the reaction mixture allowed to come to room temperature. The reaction mixture was then slowly added to a solution of 3,4-ethylenedioxypyrrole (1.3 g, 10.40 mmol) in methylene chloride (5.0 mL) at 0° C. and allowed to come to room temperature. After stirring for 12 h, an excess of 3.0 M NaOH solution was added and stirred for 2 h in a hot water bath. The reaction mixture was extracted with methylene chloride (40 mL×3) and the combined organic layers were dried over MgSO$_4$. Purification of the residue was accomplished by chromatography on silica gel using hexane/ethyl acetate (2:1) as eluent to afford the product as a white solid (1.5 g, 65%): mp 147° C.; $^1$H NMR (300 MHz, CDCl$_3$) δ9.43 (s, 1H), 9.02 (br, 1H), 6.62 (d, J=3.8 Hz, 1H), 4.24 (m, 4H); Anal. Calcd for C$_7$H$_7$NO$_3$: C, 54.90; H, 4.61; N, 9.15. Found: C, 55.03; H, 4.48; N, 9.14.

N-BOC-2-Formyl-3,4-ethylenedioxypyrrole (20). To a solution of aldehyde 19 (0.8 g, 5.2 mmol) in dichloromethane was added (BOC)$_2$O (1.1 g, 5.2 mmol), triethylamine (1.1 g, 10.4 mmol), and 4-dimethylaminopyridine (DMAP) (61 mg, 0.5 mmol). The reaction mixture was stirred for 3 h and concentrated under reduced pressure. The residue was purified by chromatography on silica gel using hexane/ethyl acetate (3:1) as eluent to yield a colorless crystalline product (1.2 g, 90%): mp 94–95° C.; $^1$H NMR (300 MHz, CDCl$_3$) δ10.24 (s, 1H), 6.88 (s, 1H), 4.38 (m, 2H), 4.22 (m, 2H), 1.60 (s, 9H); $^{13}$C NMR (75 MHz, CDCl$_3$) δ180.9, 148.8, 143.2, 134.2, 116.6, 107.9, 85.1, 66.1, 64.9, 27.9; FT-IR (CDCl$_3$) 2930, 2859, 1653, 1544, 1460, 1380, 1322 cm$^{-1}$; Anal. Calcd for C$_{12}$H$_{15}$NO$_5$: C, 56.91; H 5.97; N, 5.53. Found: C, 56.90; H, 5.80; N, 5.73.

N-Benzyl-1-cyano-2-(2-(3,4-ethylenedioxypyrryl))-1-(2-thienyl)vinylene (22): To a solution of the aldehyde 18 (0.60 g, 2.47 mmol) and 2-thiopheneacetonitrile (0.34 g, 2.72 mmol) in t-butanol was added potassium t-butoxide (0.61 g, 5.43 mmol) at room temperature. The reaction mixture was stirred for 3 h at 50° C. After cooling to room temperature, The t-butanol was removed by rotary evaporator and the residue was diluted with dichloromethane, washed with water and dried over MgSO$_4$. The residue was purified by chromatography on silica gel using hexane/ethyl acetate (3:1) as eluent to give the product as a yellow solid which was subjected to debenzylation in the next step. $^1$H NMR (300 MHz, CDCl$_3$) δ7.18 (m, 3H), 7.19 (m, 2H), 7.13 (m, 2H), 6.99 (m, 1H), 6.96 (s, 1H), 6.44 (s, 1H), 4.97 (s, 2H), 4.35 (m, 2H), 4.27 (m, 2H).

1-Cyano-2-(2-(3,4-ethylenedioxypyrryl))-1-(2-thienyl) vinylene (Th-CNV-EDOP) (23): A solution of compound 22 (0.9 g, 2.6 mmol) in THF was very slowly added to a solution of sodium (0.15 g. 6.5 mmol) in NH$_3$ (30 mL) at −78° C. The reaction mixture was stirred for 3 h and a 1.0 M NH$_4$Cl aqueous solution (20 mL) was carefully added. The stopper on the vessel was removed and the reaction was allowed to come to ambient temperature. After evaporation of NH$_3$, the aqueous phase was extracted with dichloromethane and dried over MgSO$_4$. The residue was purified by chromatography on silica gel using hexane/ethyl acetate (3:1) as eluent to yield a yellow crystalline product (0.45 g, 50%): mp 164–165° C.; $^1$H NMR (300 MHz, CDCl$_3$) δ8.60 (br, 1H), 7.30 (s, 1H), 7.16 (m, 2H), 7.02 (dd, J=4.9, 3.8 Hz, 1H), 6.55 (d, J=3.3 Hz, 11H), 4.30 (m, 2H), 4.22 (m, 2H); FT-IR (CDCl$_3$) 3460, 2989, 2930, 2202, 1575, 1538, 1343 cm$^{-1}$; HRMS (FAB) (M$^+$) calcd for C$_{13}$H$_{10}$N$_2$O$_2$S 258.0463, found 258.0457; Anal. Calcd for C$_{13}$H$_{10}$N$_2$O$_2$S: C, 60.45; H, 3.90; N, 10.85. Found: C, 60.35; H, 3.89; N, 10.91.

1-Cyano-2-(2-(3,4-ethylenedioxypyrryl))-1-(2-(3,4-ethylenedioxythienyl)vinylene (EDOT-CNV-EDOP) (26). The procedure used was the same as that for compound 22. However, it should be noted that the BOC group was removed in the process of the condensation which is advantageous over the previous procedure. A yellow crystalline product was obtained (1.20 g, 75%); mp 148° C. (decomp); $^1$H NMR (300 MHz, CDCl$_3$) δ8.60 (br, 1H), 7.34 (s, 1H), 6.49 (d, J=3.8 Hz, 1H), 6.25 (s, 1H), 4.40–4.15 (m, 8H); FT-IR (CDCl$_3$) 3459, 2989, 2934, 2859, 2202, 1569, 1531, 1459, 1344 cm$^{-1}$; HRMS (FAB) (MH$^+$) calcd for C$_{15}$H$_{13}$N$_2$O$_4$S 317.0596, found 317.0601; Anal. Calcd for C$_{15}$H$_{12}$N$_2$O$_4$S: C, 56.95; H, 3.82, N, 8.86. Found: C, 56.44; H, 3.89; N, 8.61.

The known compounds 28–30 were synthesized by the procedure according to the literature (Alston, D. R.; Stoddart, J. F.; Wolstenholme, J. B.; Allwood, B. L.; Williams, D. J. Tetrahedron, 1985, 41, 2923).

2,3-Diallyloxy-2,3-dimethylbutane (28). A clear oil (12.5 g, 85%); $^1$H NMR (300 MHz, CDCl$_3$) δ5.89 (m, 2H), 5.27 (m, 2H), 5.07 (m, 2H), 3.89 (m, 4H), 1.18 (s, 12H).

2,3-Di-(3-hydroxypropoxy)-2,3-dimethylbutane (29). A clear oil (8.2 g, 75%); $^1$H NMR (300 MHz, CDCl$_3$) δ3.75 (m, 4H), 3.57 (m, 4H), 1.76 (m, 4H), 1.15 (s, 12H).

2,3-Di-(3-[p-toluenesulfonyloxy]propoxy)-2,3-dimethylbutane (30). Colorless crystals (8.9 g, 80%); mp 123–124° C. (lit. (Alston, D. R.; Stoddart, J. F.; Wolstenholme, J. B.; Allwood, B. L.; Williams, D. J. Tetrahedron, 1985, 41, 2923) 123–124° C.); $^1$H NMR (300 MHz, CDCl$_3$) δ7.78 (d, J=8.2 Hz, 4H), 7.31 (d, J=8.2 Hz, 4H), 4.09 (t, J=6.0 Hz, 4H), 3.35 (t, J=6.0 Hz, 4H), 2.43 (s, 6H), 1.79 (pent, J=6.0 Hz, 4H), 0.96 (s, 12H).

Dimethyl 14-benzyl-6,6,7,7-tetramethyl-3,4,6,7,10,11-hexahydro-2H,9H, 14H-[1,4,8,11]tetraoxacyclotetradecino[2,3-c]pyrrolo-13,15-dicarboxylate (31). Compound 31 was synthesized by a literature procedure with some modifications (Murashima, T.; Uchihara, Y.; Wakamori, N.; Uno, H.; Ogawa, T.; Ono, N. Tetrahedron Lett. 1996, 37, 3133). A large Dean-Stark trap was fitted into a two-neck round bottom flask (1 L). The Dean-Stark trap was filled with a solution of diol 1 (5.0 g, 15.0 mmol) and ditosylate 30 (6.5 g, 12.0 mmol) in DMF (45 mL). Acetonitrile (450 mL) was added to the two-neck round bottom flask followed by addition of CsF (9.1 g, 60.0 mmol). The reaction mixture was refluxed for 24 h under argon and cooled to room temperature. The solvent was removed by rotary evaporator and poured into water. The aqueous phase was washed with ether (150 mL×3) and the combined organic layers were washed with water and dried over MgSO$_4$. The residue was purified by chromatography on silica gel using hexane/ethyl acetate (2:1) as eluent to yield a colorless solid (2.71 g, 45%): mp 92–93° C.; $^1$H NMR (300 MHz, CDCl$_3$) δ7.22 (m, 3H), 6.90 (m, 2H), 5.99 (s, 2H), 4.13 (t, J=5.0 Hz, 4H), 3.80 (s, 6H), 3.77 (t, J=5.5 Hz, 4H), 1.93 (pent, J=5.5 Hz, 4H), 1.21 (s, 12H); FT-IR (CDCl$_3$) 3022, 2963, 1718, 1700, 1653, 1559, 1541, 1442 cm$^{-1}$; HRMS (FAB) (M$^+$) calcd for C$_{27}$H$_{37}$NO$_8$ 503.2519, found 503.2524; Anal. Calcd for C$_{27}$H$_{37}$NO$_8$: C, 64.40; H, 7.41; N, 2.78. Found: C, 64.22; H, 7.36; N, 2.67.

Dimethyl 6,6,7,7-tetramethyl-3,4,6,7,10,11-hexahydro-2H,9H,14H-[1,4,8,11]tetraoxa-cyclotetradecino[2,3-c]pyrrolo-13,15-dicarboxylate (32). To a solution of 31 (3.0 g, 5.64 mmol) in acetic acid (100 mL) was added carefully 10% Pd (C) (0.6 g) in one portion. The reaction flask was flushed with a hydrogen stream using a balloon containing hydrogen and another hydrogen balloon was fitted onto the reaction flask. The reaction mixture was vigorously stirred for 48 h at 80–85° C. (it should be noted that new hydrogen balloons were added depending on the reaction scale). After cooling to room temperature, the reaction mixture was filtered through a Celite pad and concentrated under reduced pressure. Purification of the residue by chromatography on silica gel using hexane/ethyl acetate (3:1) as eluent afforded 32 as a pale yellow solid (2.21 g, 95%): mp 106–107° C.; $^1$H NMR (300 MHz, CDCl$_3$) δ8.80 (br, 1H), 4.19 (t, J=5.5 Hz, 4H), 3.88 (s, 6H), 3.76 (t, J=6.0 Hz, 4H), 1.93 (pent, J=5.5 Hz, 4H), 1.21 (s, 12H); FT-IR (CDCl$_3$) 3439, 3022, 2998, 2920, 1736, 1523, 1370, 1300 cm$^{-1}$; HRMS (FAB) (MH$^+$) calcd for C$_{20}$H$_{32}$NO$_8$ 414.2127, found 414.2097; Anal. Calcd for C$_{20}$H$_{31}$NO$_8$: C, 58.10; H, 7.56; N, 3.39. Found: C, 58.88; H, 7.70; N, 3.20.

6,6,7,7-Tetramethyl-3,4,6,7,10,11-hexahydro-2H,9H, 14H-[1,4,8,11]tetraoxacyclotetra-decino[2,3-c]pyrrolo-13,15-dicarboxylic acid (33). The diester 32 (2.5 g, 6.1 mmol) was suspended in 3M NaOH (50 mL) and ethanol was added as a co-solvent (10 mL). The reaction mixture was stirred for 6 h at 60° C. and cooled to room temperature. The reaction mixture was extracted with ether to remove any unreacted starting material and by-products and the basic aqueous phase was cooled to 0° C. Acidification by conc. HCl afforded white solids after filtration (2.27 g, 97%). The resulting diacid was used in the next step without further purification.

6,6,7,7-Tetramethyl-3,4,6,7,10,11-hexahydro-2H,9H, 14H-[1,4,8,11]tetraoxacyclotetra-decino[2,3-c]pyrrole (34). The decarboxylation procedure is similar to that of compound 17. A light brown solid (1.50 g, 73%); mp 48–50° C.; $^1$H NMR (300 MHz, CDCl$_3$) 7.09 (br, 1H), 6.27 (d, J=3.3 Hz, 2H), 4.04 (t, J=5.5 Hz, 4H), 3.76 (t, J=6.0 Hz, 4H), 1.90 (pentet, J=5.5 Hz, 4H), 1.18 (s, 12H); $^{13}$C NMR (75 MHz, CDCl$_3$) δ113.0, 102.9, 80.6, 69.9, 59.2, 31.0, 21.5; FT-IR (CDCl$_3$) 3487, 3021, 1653, 1579, 1542, 1227 cm$^{-1}$; HRMS (FAB) (MH$^+$) calcd for C$_{16}$H$_{28}$NO$_4$ 298.2018, found 298.2012; Anal. Calcd for C$_{16}$H$_{27}$NO$_4$: C, 64.62; H, 9.15, N, 4.71. Found: C, 64.47; H, 8.98; N, 4.50.

Diethyl 2-(2-ethylhexyl) malonate (36b). To a solution of NaOEt in ethanol was added diethyl malonate (20.0 g, 0.13 mol) and 2-ethylhexyl bromide (25.1 g, 0.13 mol) at room temperature. The reaction mixture was stirred for 6 h and the ethanol was removed by rotary evaporator. Dilute HCl solution was added and extracted with ether (100 mL×3). The combined ether layers were dried over MgSO$_4$, concentrated, and purified by distillation under reduced pressure (125–126° C., 3.0 mmHg, lit. (Nikishin, G. I.; Ogibin, Y. N.; Petrov, A. D. J. J. Gen. Chem. USSR (Engl. Transl.), 1960, 3510) 126–127° C., 3.0 mmHg) to give 36b as a clear oil (17.7 g, 50%): $^1$H NMR (300 MHz, CDCl$_3$) 4.20 (q, J=7.1 Hz, 4H), 3.41 (t, J=7.7 Hz, 1H), 1.84 (m, 2H), 1.40–1.15 (m, 15H), 0.95–0.80 (m, 6H).

Diethyl 2-octyl malonate (36a). A clear oil (15.4 g, 45%); bp 128–130° C. (3.0 mmHg)(lit. (Shono, T.; Matsumura, Y.; Tsubata, K.; Sugihara, Y. J. Org. Chem. 1982, 47, 3090), 110–123° C., 0.9–1.0 mmHg); $^1$H NMR (300 MHz, CDCl$_3$) 4.20 (q, J=7.1 Hz, 4H) 3.30 (t, J=7.1 Hz, 1H), 1.87 (m, 2H), 1.30–1.10 (m, 15H), 0.87 (t, J=7.1 Hz, 6H).

Diethyl 2,2-dioctyl malonate (36c). A clear oil (17.2 g, 38%); bp 155–156° C. (3.0 mmHg)(lit. (Leznoff, C. D.; Drew, D. M. Can. J. Chem. 1996, 74, 307; Uckert, F.; Setayesh, S.; Muillen, K. Macromolecules, 1999, 32, 4519), 200° C., 0.1 kPa]; $^1$H NMR (300 MHz, CDCl$_3$) 4.20 (q, J=7.1 Hz, 4H), 1.85 (m, 4H), 1.38–1.07 (m, 30H), 0.86 (t, J=6.6 Hz, 6H).

2-(2-Ethylhexyl)-1,3-propanediol (37b). To a solution of the diester 36b (10.0 g, 36.7 mmol) in dry ether was added LiAlH$_4$ (2.8 g, 73.4 mmol) at 0° C. The reaction mixture was stirred for 6 h at room temperature and water (ca. 10 mL) was carefully added. The reaction mixture was stirred for 1 h and allowed to stand to settle the salts. A clear ether layer was carefully decanted and the combined layers were dried over MgSO$_4$. Purification of the crude product by chromatography on silica gel using hexane/ethyl acetate (2:1) as eluent afforded diol 37b as a clear oil (4.8 g, 70%): $^1$H NMR (300 MHz, CDCl$_3$) 3.80 (dd, J=10.4, 3.8 Hz, 2H), 3.61 (dd, J=10.4, 8.2 Hz, 2H), 2.65 (s, 2H), 1.84 (m, 1H), 1.38–1.20 (m, 9H), 1.20–1.08 (m, 2H), 0.90 (t, J=6.6 Hz, 3H), 0.83 (t, J=7.7 Hz, 3H).

2-Octyl-1,3-propanediol (37a). A colorless crystal (5.2 g, 75%)(lit.[31]); mp 45–46° C.; $^1$H NMR (300 MHz, CDCl$_3$) 3.83 (dd, J=10.4, 3.3 Hz, 2H), 3.66 (dd, J=11.0, 7.7 Hz, 2H), 2.42 (s, 2H), 1.78 (m, 1H), 1.40–1.20 (m, 14H), 0.88 (t, J=6.6 Hz, 3H).

2,2-Dioctyl-1,3-propanediol (37c). A clear oil (6.5 g, 65%)(lit. (Leznoff, C. D.; Drew, D. M. Can. J. Chem. 1996, 74, 307; Uckert, F.; Setayesh, S.; Muillen, K. Macromolecules, 1999, 32, 4519); $^1$H NMR (300 MHz, CDCl$_3$) 3.56 (d, J=4.4, 4H), 2.50 (s, 2H), 1.40–1.15 (m, 28H), 0.88 (t, J=6.6 Hz, 6H).

General procedure for the preparation of ditosylates 38a, 38b, and 38c: To a solution of the diol (1.0 equiv.) and toluenesulfonyl chloride (2.0 equiv.) in dichloromethane was dropwise added a solution of triethylamine (2.5 equiv.) and 4-dimethylaminopyridine (0.1 mol %) in dichloromethane at room temperature. The reaction mixture was stirred for 3 h and concentrated under reduced pressure. The residue was dissolved in ether, washed with water several times, and dried over $MgSO_4$. The solvent was removed and the residue was used in the next step without further purification after vacuum drying.

Diethyl N-benzyl-3,4-dihydroxypyrrole-2,5-dicarboxylate(39): The preparation of 39 is similar to that of 1. Colorless crystals (hot methanol, 80%); mp 146° C.; $^1$H NMR (300 MHz, $CDCl_3$) 7.81 (s, 2H), 7.23 (m, 3H), 6.91 (m, 2H), 5.78 (s, 2H), 4.32 (q, J=7.1 Hz, 4H), 1.25 (t, J=7.1 Hz, 6H); $^{13}$C NMR (75 MHz, $CDCl_3$) δ162.8, 139.8, 139.3, 128.6, 127.1, 125.7, 111.2, 61.4, 49.5, 14.4; Anal. Calcd for $C_{17}H_{19}NO_6$: C, 61.25; H, 5.75; N, 4.20. Found: C, 61.00; H, 5.75; N, 4.21.

General procedure for the preparation of Diethyl N-benzyl-3,4-(2-alkyl-1,3-propylenedioxy)pyrrole-2,5-dicarboxylates (40a, 40b, and 40c): To a mixture of diethyl N-benzyl-3,4-dihydroxypyrrole-2,5-dicarboxylate (39) (7.5 g, 22.6 mmol) and ditosylate 38a (7.8 g, 22.6 mmol) in dry DMF was added potassium carbonate (15.6 g, 0.1 mol) at room temperature. The reaction mixture was stirred for 12 h at 110° C. under argon. After cooling to room temperature, the reaction mixture was poured into ice water and extracted with ether. The combined ether layers were dried over $MgSO_4$ and concentrated by rotary evaporator. Purification by chromatography on silica gel using hexane/ethyl acetate (3:1) as eluent afforded the product as pale yellow oil.

Diethyl N-benzyl-3,4-(2-octyl-1,3-propylenedioxy)pyrrole-2,5-dicarboxylate (40a). A pale yellow oil (8.2 g, 75%); $^1$H NMR (300 MHz, $CDCl_3$) 7.20 (m, 3H), 6.90 (m, 2H), 5.90 (s, 2H), 4.26 (q, J=7.1 Hz, 4H), 4.21 (dd, J=8.2, 3.3 Hz, 2H), 3.98 (dd, J=12.1, 6.6 Hz, 2H), 2.22 (m, 1H), 1.50–1.20 (m, 14H), 1.26 (t, J=7.1 Hz, 6H), 0.88 (t, J=6.6 Hz, 3H).

Diethyl N-benzyl-3,4-[2-(2-Ethylhexyl)-1,3-propylenedioxy]pyrrole-2,5-dicarboxylate (40b). A pale yellow oil (7.80 g, 71%); $^1$H NMR (300 MHz, $CDCl_3$) 7.21 (m, 3H), 6.91 (m, 2H), 5.90 (s, 2H), 4.26 (q, J=7.1 Hz, 4H), 4.22 (dd, J=11.5, 2.7 Hz, 2H), 3.88 (dd, J=11.5, 7.1 Hz, 2H), 2.35 (m, 1H), 1.40–1.23 (m, 11H), 1.26 (t, J=7.1 Hz, 6H), 0.90 (t, J=6.0 Hz, 3H), 0.86 (t, J=7.1 Hz, 3H); $^{13}$C NMR (75 MHz, $CDCl_3$) δ160.5, 142.6, 139.2, 128.2, 126.7, 126.1, 114.0, 75.9, 75.8, 60.4, 48.8, 40.0, 36.3, 32.9, 32.3, 28.7, 26.0, 23.0, 14.1, 13.9, 10.5.

Diethyl N-benzyl-3,4-(2,2-dioctyl-1,3-propylenedioxy)pyrrole-2,5-dicarboxylate (40c). A pale yellow oil (5.60 g, 25%); $^1$H NMR (300 MHz, $CDCl_3$) 7.20 (m, 3H), 6.85 (m, 2H), 5.89 (s, 2H), 4.24 (q, J=7.1 Hz, 4H), 3.90 (s, 4H), 1.50–1.10 (m, 34H), 0.87 (t, J=6.6 Hz, 6H); $^{13}$C NMR (75 MHz, $CDCl_3$) δ160.9, 143.3, 137.7, 128.6, 127.1, 126.5, 114.2, 79.4, 61.0, 49.5, 44.4, 32.5, 32.4, 31.0, 30.0, 29.9, 23.5, 23.3, 14.6, 14.5; FT-IR ($CDCl_3$) 3023, 2965, 1716, 1437, 1365, 1291 $cm^{-1}$; HRMS (FAB) (MH$^+$) calcd for $C_{36}H_{56}NO_6$ 598.4107, found 598.4114; Anal. Calcd for $C_{36}H_{55}NO_6$: C, 72.33; H, 9.27; N, 2.34. Found: C, 72.19; H, 9.41; N, 2.14.

Debenzylation of 40a, 40b, and 40c: A reaction mixture of 40a (5.0 g, 10.3 mmol), anisole (1.5 g, 13.4 mmol), $H_2SO_4$ (0.7 g, 7.0 mmol) in trifluoroacetic acid was refluxed for 0.5 h at 90° C. After cooling to room temperature, the trifluoroacetic acid was removed by rotary evaporator and the residue was neutralized by aqueous saturated sodium bicarbonate. The aqueous phase was extracted with ether (3×100 mL) and the combined ether layers were dried over $MgSO_4$.

Purification by chromatography on silica gel using hexane/ethyl acetate (3:1) as eluent afforded the product.

Diethyl 3,4-(2-octyl-1,3-propylenedioxy)pyrrole-2,5-dicarboxylate (41a): A pale yellow oil (2.80 g, 72%); $^1$H NMR (300 MHz, $CDCl_3$) 8.70 (br, 1H), 4.32 (q, J=7.1, 4H), 4.15 (dd, J=11.5, 3.3 Hz, 2H), 4.05 (dd, J=12.1, 6.6 Hz, 2H), 2.18 (m, 1H), 1.45–1.20 (m, 14H), 1.35 (t, J=7.1 Hz, 6H), 0.87 (t, J=7.2 Hz, 3H); $^{13}$C NMR (75 MHz, $CDCl_3$) δ159.8, 141.7, 110.7, 75.6, 60.7, 42.4, 31.8, 29.6, 29.4, 29.2, 28.0, 27.0, 22.5, 14.3, 13.9; FT-IR ($CDCl_3$) 3446, 3022, 2980, 1700, 1653, 1526, 1459 $cm^{-1}$.

Diethyl 3,4-[2-(2-Ethylhexyl)-1,3-propylenedioxy]pyrrole-2,5-dicarboxylate (41b): A pale yellow oil (2.53 g, 70%); $^1$H NMR (300 MHz, $CDCl_3$) 8.65 (br, 1H), 4.37 (q, J=7.1, 4H), 4.24 (dd, J=12.1, 3.3 Hz, 2H), 3.97 (dd, J=12.1, 7.1 Hz, 2H), 2.30 (m, 1H), 1.36 (t, J=7.1 Hz, 6H), 1.40–1.22 (m, 11H), 0.91–0.83 (m, 6H); $^{13}$C NMR (75 MHz, $CDCl_3$) δ159.1, 140.9, 110.0, 75.3, 75.2, 59.9, 39.4, 35.4, 32.1, 31.4, 27.9, 25.2, 22.2, 13.6, 13.2, 9.7.

Diethyl 3,4-(2,2-dioctyl-1,3-propylenedioxy)pyrrole-2,5-dicarboxylate (41c). A pale yellow oil (3.50 g, 65%); $^1$H NMR (300 MHz, $CDCl_3$) 8.61 (s, 1H), 4.33 (q, J=7.1, 4H), 3.94 (s, 4H), 1.35 (t, J=7.1 Hz, 6H), 1.45–1.18 (m, 28H), 0.87 (t, J=6.6 Hz, 6H); $^{13}$C NMR (75 MHz, $CDCl_3$) δ159.7, 142.0, 110.5, 79.2, 60.7, 43.8, 31.8, 30.4, 29.4, 29.2, 22.7, 22.6, 22.5, 14.3, 13.9; FT-IR ($CDCl_3$) 3444, 2932, 2858, 1701, 1530, 1483, 1276 $cm^{-1}$; HRMS (FAB) calcd for $C_{29}H_{49}NO_6$ (MH$^+$) 508.3638, found 508.3641.

Hydrolysis of 41a, 41b, and 41c: The procedure used is the same as that used for the preparation of compound 13.

3,4-(2-Octyl-1,3-propylenedioxy)pyrrole-2,5-dicarboxylic acid (42a): A white powder (2.50 g, 92%); mp 165–167° C.; $^1$H NMR (300 MHz, DMSO-$d_6$) 10.70 (br, 1H), 4.02 (dd, J=11.5, 2.7, 2H), 3.91 (dd, J=12.1, 6.0 Hz, 2H), 2.05 (m, 11H), 1.40–1.20 (m, 14H), 0.84 (t, J=7.1, 3H); HRMS (FAB) (MH$^+$) calcd for $C_{17}H_{26}NO_6$ 340.1760, found 340.1735; Anal. Calcd for $C_{17}H_{25}NO_6$: C, 60.16; H, 7.42; N, 4.13. Found: C, 60.54; H, 7.67; N, 4.10.

3,4-[2-(2-Ethylhexyl)-1,3-propylenedioxy]pyrrole-2,5-dicarboxylic acid (42b): A white powder (2.20 g, 85%); mp 164–165° C.; $^1$H NMR (300 MHz, DMSO-$d_6$) 10.70 (br, 1H), 4.02 (dd, J=12.0, 2.7, 2H), 3.85 (dd, J=12.0, 6.0 Hz, 2H), 2.10 (m, 1H), 1.40–1.17 (m, 11H), 0.89 (t, J=7.1 Hz, 3H), 0.86 (t, J=6.6, 3H); $^{13}$C NMR (75 MHz, DMSO-$d_6$) δ160.3, 140.6, 111.0, 74.8, 74.8, 39.5, 34.9, 32.1, 30.6, 27.8, 25.1, 22.2, 13.6, 10.1; HRMS (FAB) (MH$^+$) calcd for $C_{17}H_{26}NO_6$ 340.1760, found 340.1735; Anal. Calcd for $C_{17}H_{25}NO_6$: C, 60.16; H, 7.42; N, 4.13. Found: C, 60.07; H, 7.56; N, 3.98.

3,4-(2,2-Dioctyl-1,3-propylenedioxy)pyrrole-2,5-dicarboxylic acid (42c). A white powder (2.5 g, 85%); mp 125–127° C.; $^1$H NMR (300 MHz, DMSO-$d_6$) 10.70 (s, 1H), 3.78 (s, 4H), 1.50–1.02 (m, 28H), 0.84 (t, J=7.1, 6H); FT-IR ($CDCl_3$) 3280, 2928, 1700, 1653, 1093; HRMS (FAB) (MH$^+$) calcd for $C_{25}H_{41}NO_6$ 452.3012, found 542.2987; Anal. Calcd for $C_{25}H_{41}NO_6$: C, 66.49; H, 9.15; N, 3.10. Found: C, 66.42; H, 9.28; N, 2.98.

Decarboxylation of the diacids 42a, 42b, and 42c: The procedure used here is the same as that for the preparation of N-benzyl-3,4-ethylenedioxypyrrole (17).

3,4-(2-Octyl-1,3-propylenedioxy)pyrrole (43a): An off-white solid (1.20 g, 85%); mp 79–80° C.; $^1$H NMR (300 MHz, $CDCl_3$) δ7.25 (br, 1H), 6.28 (d, J=3.3 Hz, 2H), 4.01 (dd, J=11.5, 2.2, 2H), 3.85 (dd, J=11.6, 6.6 Hz, 2H), 2.05 (m, 1H), 1.50–1.20 (m, 14H), 0.88 (t, J=6.6 Hz, 3H); $^{13}$C NMR (75 MHz, $CDCl_3$) δ139.4, 103.1, 76.7, 43.6, 31.8, 29.8, 29.4, 29.2, 27.4, 27.1, 22.5, 13.9; FT-IR ($CDCl_3$) 3489, 3021, 2963, 2931, 1653, 1545, 1495, 1380 cm$^{-1}$; HRMS (FAB) (MH$^+$) calcd for $C_{15}H_{26}NO_2$ 252.1963, found 252.1963; Anal. Calcd for $C_{15}H_{25}NO_2$: C, 71.67; H, 10.02; N, 5.57. Found: C, 71.76; H, 9.94; N, 5.19.

3,4-[2-(2-Ethylhexyl)-1,3-propylenedioxy]pyrrole (43b): A pale yellow oil (0.50 g, 40%); $^1$H NMR (300 MHz, CDCl$_3$) δ7.10 (br, 1H), 6.30 (d, J=3.3 Hz, 2H), 4.01 (dd, J=12.1, 2.7, 2H), 3.76 (dd, J=11.5, 6.6 Hz, 2H), 2.15 (m, 1H), 1.40–1.20 (m, 11H), 0.89 (t, J=6.0 Hz, 3H), 0.86 (t, J=7.7 Hz, 3H); $^{13}$C NMR (75 MHz, CDCl$_3$) δ113.9, 103.1, 76.5, 76.4, 41.3, 36.2, 33.0, 31.2, 28.7, 26.1, 23.9, 23.1, 14.0, 10.5; FT-IR (CDCl$_3$) 3490, 2962, 2931, 1543, 1459, 1322 cm$^{-1}$; HRMS (FAB) (MH$^+$) calcd for $C_{15}H_{26}NO_2$ 252.1963, found 252.1965; Anal. Calcd for $C_{15}H_{25}NO_2$: C, 71.67; H, 10.02; N, 5.57. Found: C, 71.44; H, 9.98; N, 5.21.

3,4-(2,2-Dioctyl-1,3-propylenedioxy)pyrrole (43c): A pale brown oil. Full characterization was not successful due to its high instability. $^1$H NMR (300 MHz, CDCl$_3$) δ7.10 (br, 1H), 6.30 (d, J=3.3 Hz, 2H), 3.89 (s, 4H), 1.50–1.00 (m, 28H), 0.85 (t, J=7.1 Hz, 6H).

Supporting Information Available: $^1$H NMR Spectra of 6, 7, 8, 9, 10, 13, 14, 16, 22, 26, 32, 37a, 37b, 37c, 40a, 40b, 40c, 41a, 41b, and 41c. This material is available via the Internet at pubs.acs.org.

EXAMPLE 5

Electrochromic Devices as Platforms for Studying Visible and IR Characteristics in Conducting Polymers Dimethyl substituted poly(3,4-propylenedioxythiophene) (PProDOT-Me$_2$) can be used as a cathodically coloring layer for ECDs.[Welsh, D. M.; Kumar, Anil; Meijer, E. W.; Reynolds, J. R. Adv. Mater. 1999, 11, 1379] PProDOT-Me$_2$ exhibits extremely high contrast, with Δ%T=78% at $\lambda_{max}$ (578 nm), a wavelength where the human eye is highly sensitive. In addition, it exhibits a luminance change of 60%, measured by colorimetric analysis.[Thompson, B. C.; Schottland, P.; Zong, K.; Reynolds, J. R. Chem. Mater. 2000, 12, 1563] Moreover, PProDOT-Me$_2$ switches quite rapidly, with the above noted optical changes occurring in 0.2–0.4 seconds. These enhanced electrochromic properties, relative to the unsubstituted parents PEDOT and PProDOT, are probably due to a more open morphology of the films, allowing for a fast ion exchange during doping. Furthermore, its high coloration efficiency (200 cm$^2$/C) translates into lower charge densities required to perform a switching cycle, thus providing longer device lifetimes.

Ideally, an anodically coloring polymer is chosen to have a high band gap (Eg)>3.0 eV (<410 nm) with the π–π* transition lying in the ultraviolet region of the spectrum. In addition to the required complementary optical properties, proper ECD operation demands a high degree of electrochemical reversibility and compatibility. Recently, our group has explored the possibility of obtaining "truly anodically" coloring polymers based on the newly discovered family of 3,4-alkylenedioxypyrroles.[Zong, K.; Reynolds, J. R. J. Org. Chem. 2001, 66, 6873]. The parent polymer in this family, poly(3,4-ethylenedioxypyrrole) (PEDOP), provides the lowest oxidation potential of any polymer reported to date due to the highly electron rich nature of the dioxypyrrole monomer repeat unit. As pyrroles have somewhat elevated LUMO levels, the band gaps for PEDOP (2.0 eV) and the propylene bridged analog (PProDOP, 2.2 eV) are higher than their thiophene counterparts (PEDOT and PProDOT). In order to increase the band gap even further, we have prepared a series of N-substituted ProDOPs [Sonmez, G.; Schottland, P.; Zong, K.; Reynolds, J. R. to be submitted]. N-alkyl substitution increases the electron density in the monomer and also induces a twist in the polymer backbone, therefore the N-substituted ProDOPs exhibit a higher band gap than underivatized ProDOP. Of this polymer series, ProDOP-NPrS stands out as the best candidate for use in an ECD, due to its relatively fast deposition rate, good film quality and a more saturated color in the doped state.

Different designs of ECDs can be used as tools to explore newly discovered polymers' optical properties at different doping levels and over a broad range of the electromagnetic spectrum. This can be achieved by using the outward facing ECD operating in reflective mode. Another goal is to study the interaction and complementarity of two electrochromic polymers for transmission/absorption window applications, where matching the polymers' oxidation potential and number of active sites is crucial. High quality dual polymer electrochromic devices for use in broadband and high contrast displays can be achieved.

Electrochemical deposition of the polymer layers was carried out using an EG&G Model 273A potentiostat/galvanostat. A three electrode cell with Ag/Ag$^+$ as the reference, gold coated Mylar or ITO/glass as the working, and platinum flag as the counter electrode was used for electrosynthesizing the polymer films. Spectroelectrochemistry was carried out using a Varian Cary 5 spectrophotometer. Colorimetry results were obtained by the use of a Minolta CS-100 Chroma Meter.

The reflectance of the outward facing device was measured over the infrared and visible regions using a Bruker 113v FTIR spectrometer and a Zeiss MPM 800 microscope photometer. In the mid-IR we used a ZnSe window over the polymer and the device was enclosed in a sealed cell to isolate it from the atmosphere. A microscope slide glass was used in the visible and near infrared region. Electrical leads attached to the electrodes allowed the polymer to be oxidized and reduced in situ.

Figure 25A:
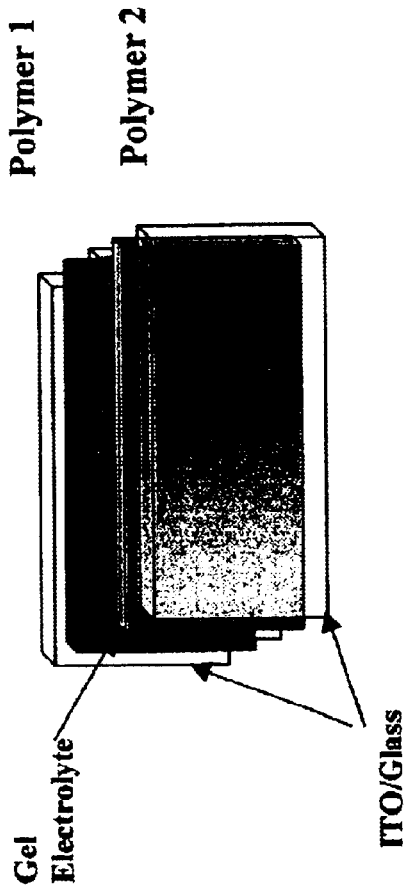
FIGS. 25A–B depict transmissive and reflective ECDs that can utilize electrochromic polymers of the subject invention (Olde FIGS. 34–35).
Figure 25B:
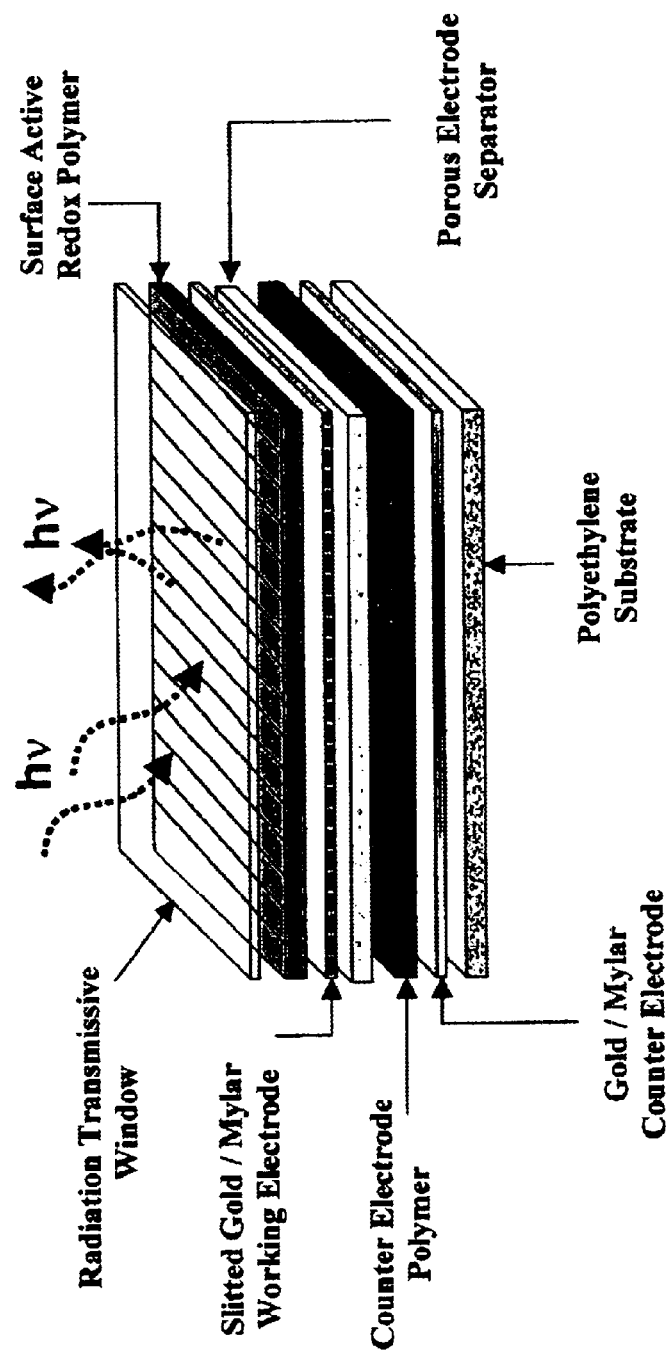

Transmission/Absorption ECDs. In this study we compare two ECDs (having a schematic as shown in FIGS. 25A–B) that have the same cathodically coloring layer (PProDOT-Me$_2$), but different anodically coloring polymers, such as PBEDOT-NMeCz and PProDOT-NPrS. Both devices possess the ability to operate at low applied voltages (±1 V) with both films being compatible in the same electrochemical environment. This greatly increases their lifetime to 86% retention of the color after 20 000 cycles. The devices switch from a bleached state to a dark, colored state in less than 1 second, thus making them useful as fast electrochromic displays. Most importantly, while PBEDOT-NMeCz is yellow in the neutral form and blue in the doped form, the newly discovered PProDOP-NPrS has the ability to switch between a colorless neutral state to a doped grey-green state, possessing the rare property of being a truly anodically coloring material. Furthermore, doped PProDOP-NPrS broadens the absorption peak of the dark state ECD in both the 400–500 nm and 700–800 nm regions of the visible spectrum, where the contribution from the π–π* transition of the PProDOT-Me$_2$ film is small. The devices based on PProDOP-NPrS and PProDOT-Me$_2$ complementary polymers exhibit an optical contrast of about 70% at $\lambda_{max}$ as well as an overall luminance change of 53%, switching from a transparent state to a very dark, almost opaque state.

In our efforts to broaden the absorption peak while retaining the high contrast of our transmission ECDs, we have explored the possibility of having two cathodically coloring polymers with different $\lambda_{max}$. We have used PEDOP ($\lambda_{max}$ at 520 nm) and PProDOT-Me$_2$ ($\lambda_{max}$ at 580 nm). At +1V, both polymers are in their oxidized form and the electrode appears transparent. As we started to decrease the potential to −1V, the peak corresponding to the π–π* transition of the PProDOT-Me$_2$ layer could be seen at 580 nm. In order to observe the π–π* band transition in PEDOP film, a further decrease in the potential to −2V was necessary. When both polymers reached the neutral state a broadening as well as a large increase of the absorption peak could be seen.

Reflective ECDs. As a device platform which conveniently allows EC property characterization in a reflective mode, we have used an outward facing active electrode device sandwich structure originally described in the patent literature,[Bennett, R. B.; Kokonasky, W. E.; Hannan, M. J.; Boxall, L. G. U.S. Pat. No. 5,446,577, 1995; b) Chandrasekhar, P. U.S. Pat. No. 5,995,273, 1999; each of these patents is hereby incorporated by reference in their entireties] as shown schematically in FIG. 25. Here, PProDOT-Me$_2$ is the active top layer, and PBEDOT-NMeCz is the back layer. As the top film on the device is switched from its neutral, colored state, to its p-doped, bleached state, a gradual and controllable transition from a dark opaque violet to a pale transparent blue is observed. We have shown that PProDOT-Me$_2$ based device provides high EC contrast in the visible, NIR and mid-IR regions of the electromagnetic spectrum [Schwendeman, I.; Hwang, J.; Welsh, D. M.; Tanner, D. B.; Reynolds, J. R. Adv. Mater. 2001, 13, 634]. Contrast ratios of 55% at 0.6 μm in the visible, greater than 80% between 1.3 to 2.2 μm in the NIR, and greater than 50% between 3.5 to 5.0 μm demonstrate that these conducting polymers are excellent materials for redox switchable reflectivity for a metallic surface over a broad range of spectral energies. The devices have an outstanding lifetime, undergoing 10,000 switches with only approximately 20% loss in contrast.

EXAMPLE 6

Transmissive ECD

One objective of this example is both to enhance the lifetime under switching conditions and the contrast of transmissive ECDs, and also to tune the function of the device over the entire visible spectrum. The concept for producing such a device is to use layers of polymers that have different $\lambda_{max}$. By overlapping the conducting polymer layers, not only is more of the visible spectrum covered, but the absorbance of the device is also enhanced. This performance was achieved by building a laminated transmissive device based on PEDOP/PProDOT-ME$_2$ as the cathodically coloring layers and the high-gap N-propyl sulfonate derivative of PProDOP (PProDOP-NPrS) as the anodically coloring polymer. The device switches in about 0.5 seconds from a light blue, transmissive state to a deep dark blue, absorptive state with a change in transmittance of 55% at 577 nm (I. Giurgiu, D. M. Welsh, K. Zong, J. R. Reynolds, to be published).

EXAMPLE 7

N-substitution of 3,4-propylenedioxypyrrole (ProDOP)

Electropolymerization was carried out with an EG&G Princeton Applied Research model 273 potentiostat/galvanostat employing a platinum button working electrode (diameter: 1.6 mm; area 0.02 cm$^2$), a platinum flag counter electrode, and a 0.01 M Ag/AgNO$_3$ reference (Ag/Ag$^+$). The electrolyte used was 0.1 M LiClO$_4$/PC. The reference was calibrated externally using a 5 mM solution of ferrocene (Fc/Fc$^+$) in the same electrolyte ($E_{1/2}$(Fc/Fc$^+$)=+0.070 V vs. Ag/Ag$^+$ in 0.1 M LiClO$_4$/PC). The potentials were calibrated versus Fc/Fc$^+$ in the same electrolyte, as recommended by IUPAC[59]. All potentials are reported versus Fc/Fc$^+$. The electrodeposition was performed from a 0.01 M solution of monomer in the electrolyte at a scan rate of 20 mV/s. Cyclic voltammetry was carried out using the same electrode setup and using 0.1 M LiClO$_4$/PC electrolyte. Corrware II software from Scribner Associates was used for data acquisition and potentiostat control.

Spectroelectrochemical measurements were carried out using a Varian Cary 5E UV-visible-NIR spectrophotometer connected to a computer at a scan rate of 600 nm/min. A three electrode cell assembly was used where the working electrode was an ITO-coated glass (7×50×0.6 mm, 20 Ω/□, Delta Technologies Inc.), the counter was a platinum wire and a 0.01 M Ag/AgNO$_3$ reference electrode. The potentials were applied using the same EG&G potentiostat as previously described and the data recorded with Corrware II software for electrochemical data and with the Varian Cary Win-UV for spectral data.

Colorimetry measurements were obtained using a Minolta CS-100 chroma meter and CIE recommended normal/normal (0/0) illuminating/viewing geometry for transmittance measurements.[58] As for spectroelectrochemistry, a three-electrode cell was employed. The potential was controlled by the same EG&G potentiostat. The sample was illuminated from behind by a D50 (5000 K) light source in a light booth designed to exclude external light. The color coordinates are expressed in the CIE 1931 Yxy color space where the Y value is a measure of the luminance in Cd/m$^2$. The relative luminance, expressed in %, was calculated by dividing the Y value measured on the sample by the $Y_0$ value corresponding to the background. Note that the relative luminance is frequently reported instead of the luminance because it gives a more meaningful value.

Polymer films for spectroelectrochemistry were prepared by galvanostatic deposition on ITO ($R_s \leq 10$ Ω/□). ITO supported films were grown at 0.01/cm$^2$ mA in 0.1 M LiClO$_4$/PC containing 0.01 M of monomer.

Figure 26:
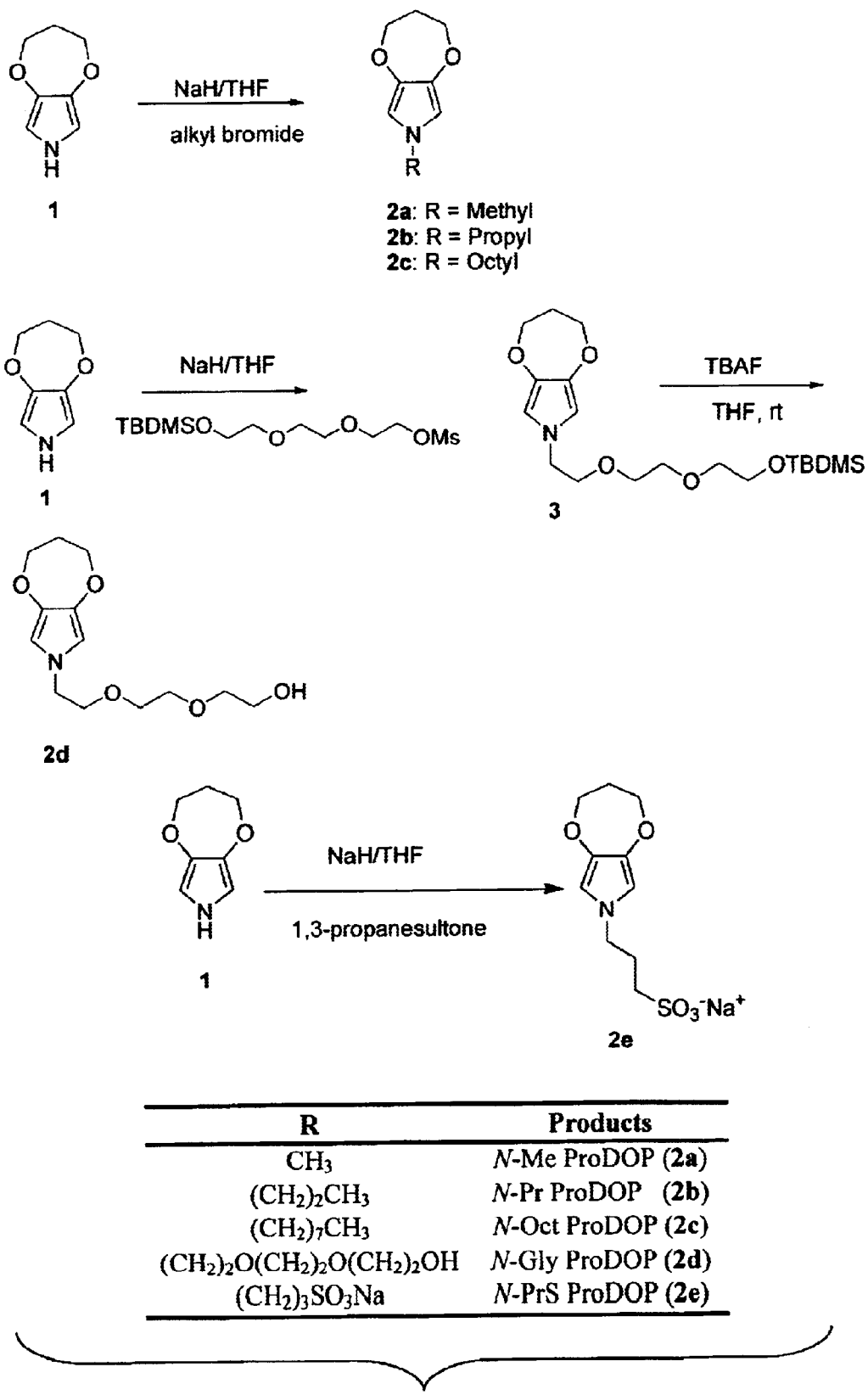
FIG. 26. Synthesis of N-substituted ProDOPs.
Figure 27A:
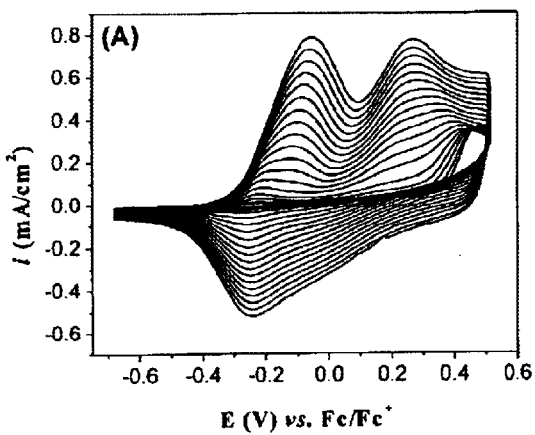
FIG. 27. Potential scanning electrodeposition of N-alkyl ProDOPs from a 0.01 M solution of monomer in 0.1 M $LiClO_4$/PC at 20 mV/s on a Pt button (area=0.02 $cm^2$): (A) N-Me PProDOP (20 cycles), (B) N-Pr PProDOP (150 cycles), (C) N-Oct PProDOP (150 cycles), (D) N-Gly PProDOP (50 cycles), (E) N-PrS PProDOP (15 cycles).
Figure 27B:
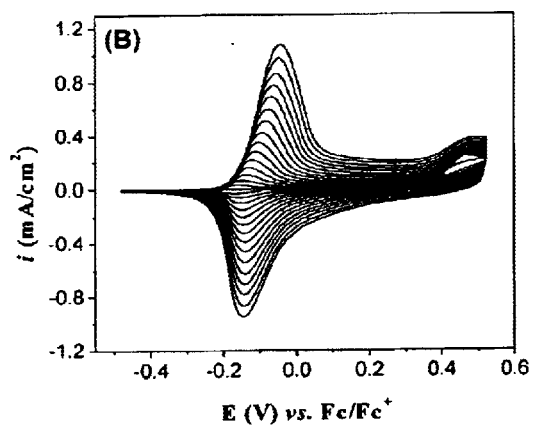
Figure 27C:
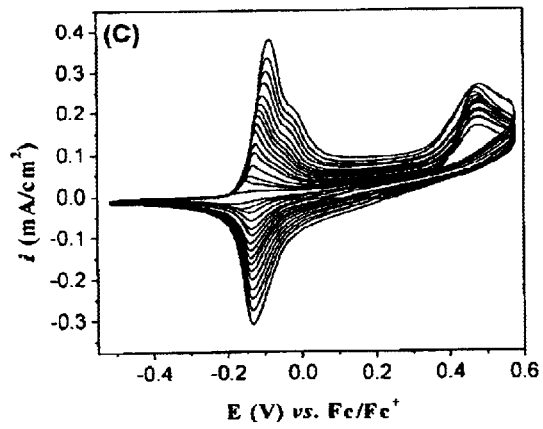
Figure 27D:
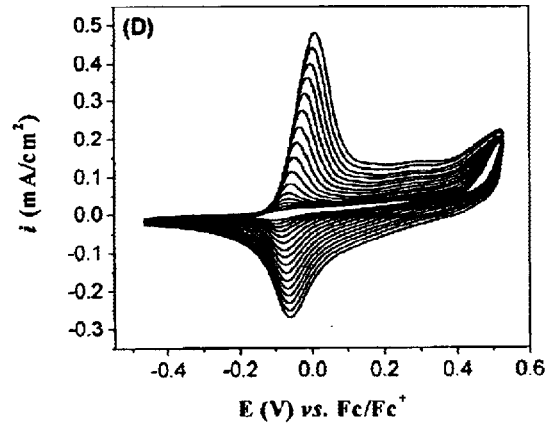
Figure 27E:
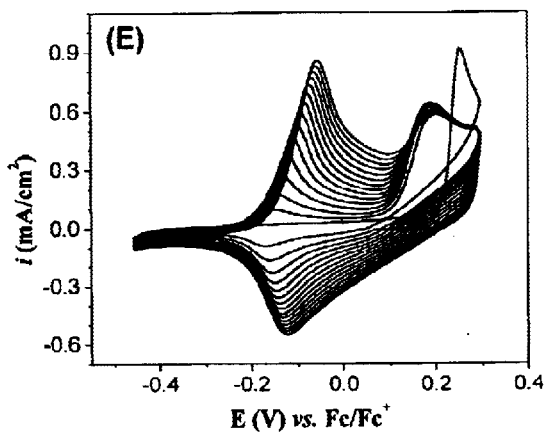
Figure 28A:
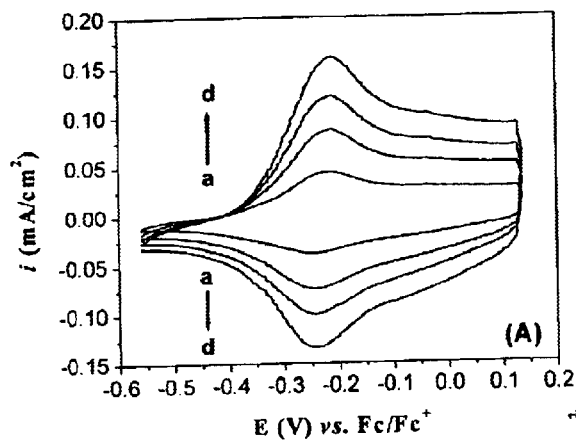
FIG. 28. Cyclic voltammograms of thin N-alkyl PProDOP films in monomer free solution of 0.1 M $LiClO_4$/PC: (A) N-Me PProDOP, (B) N-Pr PProDOP, (C) N-Oct PProDOP, (D) N-Gly PProDOP, (E) N-PrS PProDOP at a scan rate of (a) 50 mV/s, (b) 100 mV/s, (c) 150 mV/s, (d) 200 mV/s.
Figure 28B:
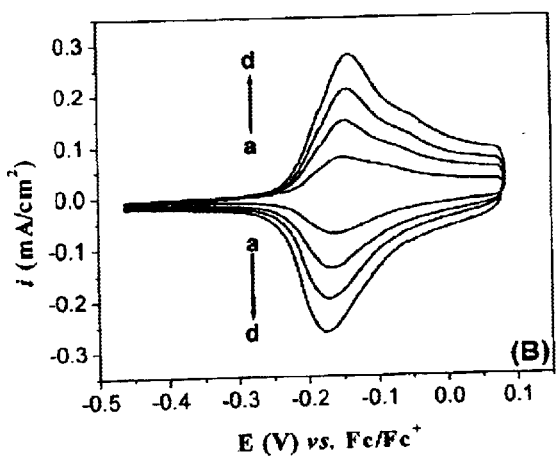
Figure 28C:
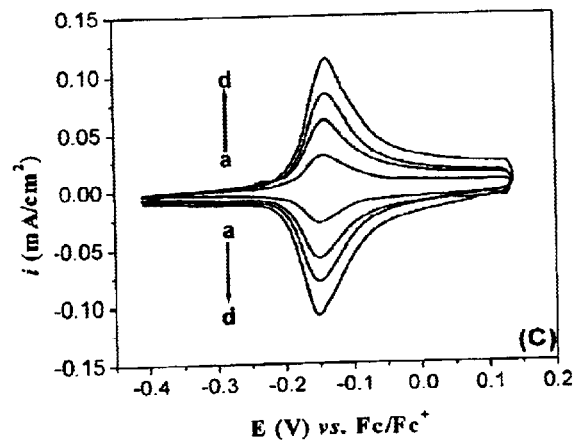
Figure 28D:
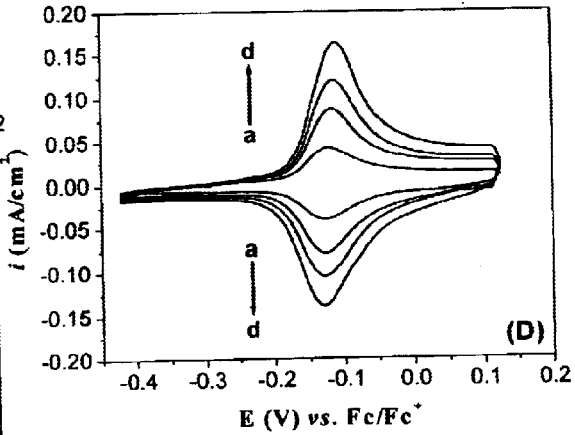
Figure 28E:
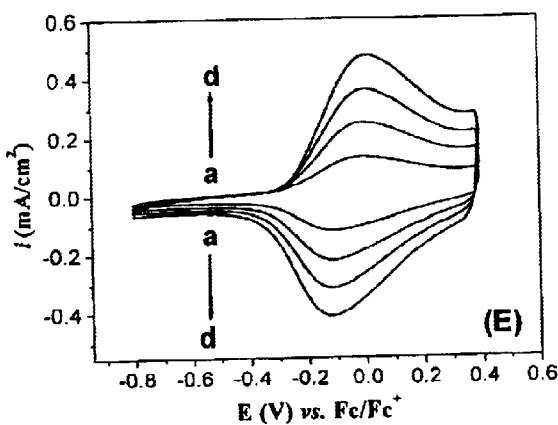

Monomer Synthesis. In this example N-substitution of 3,4-propylenedioxypyrrole (ProDOP) was performed through an N-alkylation with several alkyl chains having different lengths and hydrophilic/hydrophobic character (see FIG. 26). ProDOP was treated with sodium hydride and alkyl bromides were added at room temperature. The reaction mixtures were refluxed for designated times and purification by chromatography afforded the N-alkylated products 2a–c respectively. For 2d, t-butyldimethylsilyl (TBDMS) protected tri(ethyleneglycol) mesylate was added to a solution of ProDOP after treatment with sodium hydride. After the reaction was completed and purified, deprotection by tetrabutylammonium fluoride afforded N-Gly ProDOP. To obtain the sulfonated monomer 2e, ProDOP was treated with NaH in dry THF and 1-propanesulfonate was subsequently added at room temperature. The reaction mixture was refluxed for 24 hours and purification by chromatography afforded ProDOP-N-propyl sodium sulfonate in 85% yield.

Electrochemical Polymerization. Monomers 2a–d were electropolymerized/deposited from solutions containing 10 mM monomer in 0.1 M LiClO$_4$/propylene carbonate (PC). Electropolymerization of 2e was carried out in a mixture of PC and water (94:6). The presence of small amount of water provides for the solubility of the monomer which is otherwise insoluble in acetonitrile (ACN), N,N-dimethylformamide (DMF), or PC. Table 1 shows the monomer's peak oxidation potentials ($E_{p,m}$) monitored during accumulative growth at a scan rate of 20 mV/s. Comparable to the relationship between pyrrole and N-alkyl pyrroles, the oxidation potential of ProDOP ($E_{ox,m}$=+0.58 V vs. Fc/Fc$^+$)is higher than that of the N-substituted ProDOPs. The propylenedioxy substituent in the 3- and 4-positions of the pyrrole ring increases the electron rich character of the monomer, thus leading to low monomer oxidation potentials. In addition, N-alkyl substitution increases the electron density at the redox center via inductive effects, and the resulting monomers possess even lower oxidation potentials than the parent ProDOP. The oxidation potential of the monomer minimally increases with the chain length (+0.50 V for N-Me ProDOP, +0.51 V for N-Pr ProDOP, +0.52 V for N-Oct ProDOP and +0.54 V for N-Gly ProDOP vs. Fc/Fc$^+$). The oxidation potential for monomer 2e is lower than the other N-substituted ProDOPs (+0.25 V vs. Fc/Fc$^+$). This could be due to the fact that N-PRS ProDOP forms more stable radical cations, the positive charge being balanced by the negatively charged sulfonate end group.

Potentiodynamic polymerizations of monomers 2a–e are shown in FIG. 27. In all cases, the low potential polymer redox process is seen to evolve quite nicely. In the case of N-Me PProDOP polymerization (FIG. 27A), the appearance of a peak distinct from the polymer redox process at a lower potential than monomer oxidation (+0.20 V vs. Fc/Fc$^+$) may indicate a growth involving the coupling of soluble oligomers, which are more reactive than the monomer itself. For monomers 2b and 2c, the polymerization proceeds at a much slower rate. This substantial decrease of the electropolymerization rate has been reported previously for N-alkylated pyrroles and was attributed to a decrease in conductivity resulting from the N-substitution. Usually, the longer the substituent, the lower the conductivity of the resulting film and therefore the slower its electrodeposition. For instance, after 20 cycles, the anodic peak current of N-Me PProDOP is about 0.80 mA/cm$^2$ while N-Pr PProDOP only reaches 0.054 mA/cm$^2$ and N-Oct PProDOP 0.050 mA/cm$^2$. Note that, despite a longer chain, N-Gly PProDOP and N-PrS ProDOP electrodepositions (FIGS. 27D and 27E, respectively) are much faster than for the other N-alkyl PProDOPs, except N-Me PProDOP. This increase in the deposition rate is probably induced by the more hydrophilic character of the substituents, which provides a better adherence to the substrate. It is noteworthy that all of the polymers studied, with the exception of N-Me PProDOP, present very narrow redox processes during the accumulative growth. Since the half-wave oxidation potentials vary linearly with the inverse of the number of repeating units, this seems to indicate that the resulting polymers have a narrow molecular weight distribution.

Polymer characterization. The polymers were deposited by cyclic voltammetry on a platinum button electrode (area: 0.02 cm$^2$) from a 0.01 M solution of monomer in 0.1 M LiClO$_4$/PC electrolyte. In order to compare the electrochemical behavior of different N-substituted polymers, and since the rate of polymerization is much slower when the chain length is increased, the electrodeposition was performed over 4 cycles for N-Me ProDOP, 5 cycles for N-Gly ProDOP, 20 cycles for N-Oct ProDOP, 40 cycles for N-Pr ProDOP, and galvanostatically for N-PrS ProDOP at a current density of 0.04 mA/cm$^2$ by passing a total charge of 10 mC/cm$^2$. As a result, all polymers are in a relatively narrow range of current densities.

FIG. 28 shows cyclic voltammograms of N-substituted PProDOP thin films at scan rates of 50, 100, 150 and 200 mV/s in 0.1 M LiClO$_4$/PC. Very well-defined and reversible redox processes are seen with N-substituted PProDOPs in contrast to the broad redox processes reported for N-alkyl pyrroles. Half wave oxidation potentials of the polymers ($E_{1/2}$) are between −0.10 V and −0.25 V vs. Fc/Fc$^+$ (see Table 1). As observed for the monomer oxidation potentials, the longer the N-substituent, the higher the $E_{1/2}$ (with N-PrS ProDOP being the exception), a phenomenon observed as well for N-alkyl pyrroles. This could result from the substituent distorting the polymer backbone and decreasing the degree of conjugation. The capacitive behavior of these materials decreases with an increase in the N-substituent length. We attribute this to a drop in electronic conductivity as inter-chain interactions are decreased with increasing side chain length.

Figure 29:
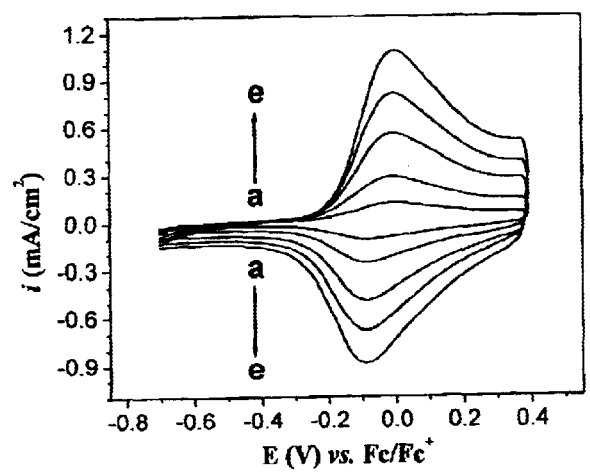
FIG. 29. Cyclic voltammogram of a thin N-PrS PProDOP film in monomer free solution of 0.1 M $LiClO_4$/PC. The polymer film was grown galvanostatically at a current density of 0.04 $mA/cm^2$ by passing a total charge of 10 $mC/cm^2$ from a 0.01 M monomer in PC:$H_2O$ (94:6) without supporting electrolyte. Scan rates are (a) 20 mV/s, (b) 50 mV/s, (c) 100 mV/s, (d) 150 mV/s, (e) 200 mV/s.

FIG. 29 shows the CV of N-PrS PProDOP prepared in the absence of supporting electrolyte. Although we observed well-defined and reversible redox processes in the films prepared in the presence of (FIG. 28E) and without electrolyte, the fact that the current densities are comparable at the same scan rates, leads to the conclusion that the polymer is self-doping.

Figures 30A, 30B:
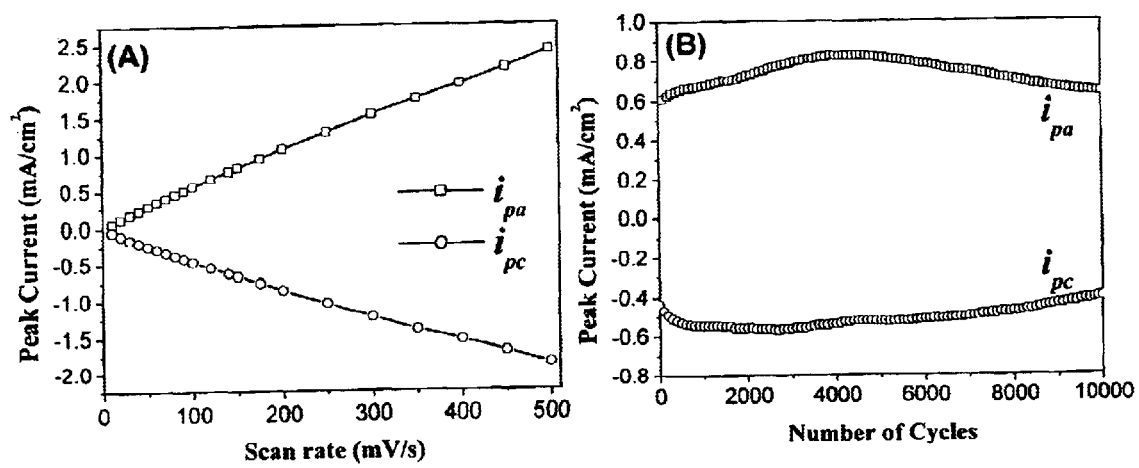
FIG. 30. (A) Variation of anodic and cathodic peak currents as a function of the scan rate for a N-PrS PProDOP film in 0.1 M $LiClO_4$/CAN solution; (B) Variation of anodic (□) and cathodic (○) peak currents as a function of number of cycles for 0.12 µm thick N-PrS PProDOP film, cycled 10,000 times at a scan rate of 100 mV/s.
Figure 31A:
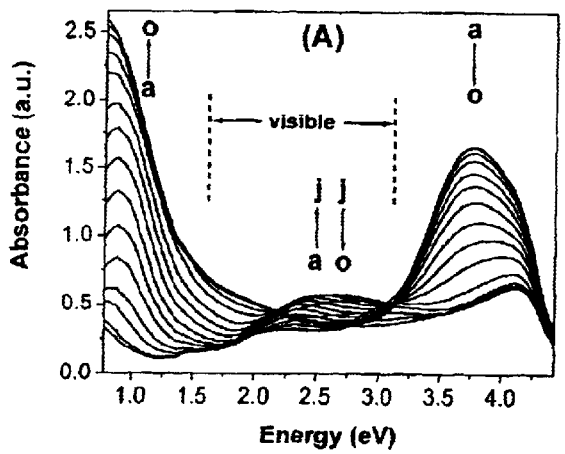
FIG. 31. Spectroelectrochemistry of N-alkyl PProDOPs in 0.1 M $LiClO_4$/PC vs. $Fc/Fc^+$: (A) N-Me PProDOP at applied potentials of: (a) −500 mV, (b) −400 mV, (c) −300 mV, (d) −275 mV, (e) −250 mV, (f) −230 mV, (g) −200 mV, (h) −160 mV, (i) −120 mV, (j) −75 mV, (k) 0 mV, (l) +100 mV, (m) +300 mV, (n) +500 mV, (o) +700 mV; (B) N-Pr PProDOP at applied potentials of: (a) −400 mV, (b) −300 mV, (c) −200 mV, (d) −150 mV, (e) −100 mV, (f) −80 mV, (g) −60 mV, (h) −40 mV, (i) −20 mV, (j) 0 mV, (k) +50 mV, (l) +100 mV, (m) +200 mV, (n) +400 mV, (o) +600 mV; (C) N-Gly PProDOP at applied potentials of (a) −200 mV, (b) −70 mV, (c) −60 mV, (d) −50 mV, (e) −40 mV, (f) −30 mV, (g) −20 mV, (h) −10 mV, (i) 0 mV, (j) +20 mV, (k) +60 mV, (l) +200 mV, (m) +300 mV, (n) +400 mV, (o) +700 mV; (D) N-PrS PProDOP at applied potentials of a) −0.40 V, (b) −0.30 V, (c) −0.25 V, (d) −0.20 V, (e) −0.15 V, (f) −0.10 V, (g) −0.05 V, (h) 0.00 V, (i) +0.05 V, (j) +0.10 V, (k) +0.15 V, (l) +0.20 V, (m) +0.25 V, (n) +0.30 V, (o) +0.50 V.
Figure 31B:
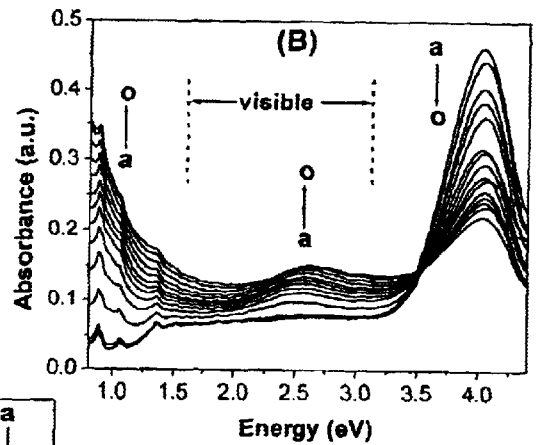
Figure 31C:
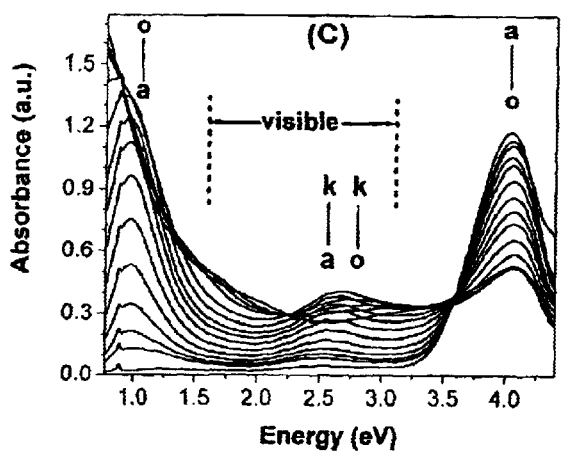
Figure 31D:
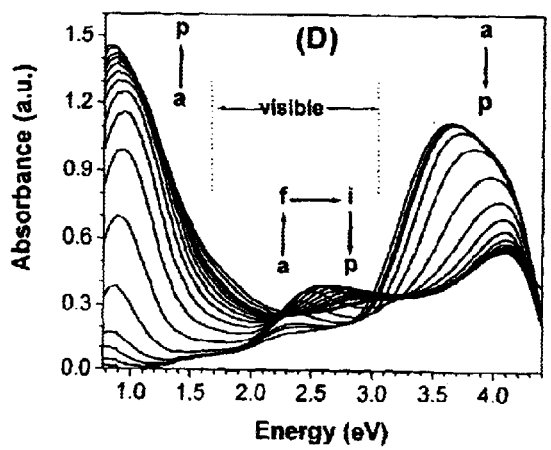

To illustrate the outstanding reversibility of these redox processes, the anodic to cathodic peak current ratios ($i_{pa}/i_{pc}$) and the peak separation ($\Delta E_p$) are reported in Table 1. With the exclusion of N-Me PProDOP which exhibits a peak ratio of 1.35 and a relatively high peak separation (92 mV), all of the other N-substituted PProDOPs present an almost ideal ratio of 1.0 along with a very small $\Delta E_p$ (less than 8 mV) at a scan rate of 20 mV/s. The scan rate dependence of the anodic and cathodic peak currents, and peak separation ($\Delta E_p$) shows a linear dependence as a function of the scan rate as illustrated in FIG. 30A for N-PrS PProDOP. This demonstrates that the electrochemical processes are not diffusion limited and are reversible, even at very high scan rates. The ability to be switched reversibly in a non-diffusion limited process at scan rates as high as 500 mV s$^{-1}$ is rather unusual for conducting polymers and may stem from the thinness of the polymer films (about 30 nm). As seen in Table 1, $\Delta E_p$ decreases with increasing substituent length, and the anodic to cathodic peak ratio gets closer to 1.0, which indicates that the redox processes become more reversible. In summary, the N-substituted PProDOP electrochemistry shows very well-defined redox processes and outstanding reversibility as compared to polypyrrole and PProDOP.

The stability of the polymer for long term switching between oxidized and neutral states is an important characteristic for the use of these materials in device applications. We monitored changes in the anodic and cathodic peak potentials and currents of a 0.12 $\mu$m N-PrS PProDOP film, prepared by galvanostatic deposition at a constant current density of 0.04 mA/cm$^2$. The film was cycled for 10,000 times with a scan rate of 100 mV/s in 0.1 M LiClO$_4$/PC. FIG. 30B shows both the anodic and cathodic peak currents slowly increase during the first few thousand cycles. This is followed by a slow decrease, such that after 10,000 cycles the current response from the polymer is close to its initial value. The overall charge involved in the electrochemical process was calculated for each voltammogram and the total charge lost during this experiment decreases by less than 8% after 5,000 cycles and less than 30% after 10,000 cycles. This shows that N-PrS PProDOP films are able to be switched many times between oxidized and reduced states with relatively small changes in electroactivity making this polymer a good candidate for electrochromic applications.

Spectroelectrochemistry. N-substituted PProDOP thin films were deposited on ITO/glass substrates using a galvanostatic deposition at a current density of 0.01 mA/cm$^2$. Flectroactive N-Oct ProDOP thin films could be obtained on ITO/glass, but they were not thick enough to allow the spectroelectrochemical analysis, probably due to the strong monomer hydrophobicity conferred by the long alkyl chain. FIG. 31 shows the spectroelectrochemistry of N-Me PProDOP (A), N-Pr PProDOP (B), N-Gly PProDOP (C), and N-PrS PProDOP (D) in 0.1 M LiClO$_4$/PC. As expected, the N-substitution has blue shifted the π to π* transition, which now lies in the UV range, with a $\lambda_{max}$ at 330 nm (3.75 eV) for N-Me PProDOP, 340 nm (3.65 eV) for N-PrS PProDOP and 306 nm (4 eV) for N-Pr PProDOP and N-Gly PProDOP. This corresponds to a band gap (measured at the edge of the π to π* absorption band) of 3.0 eV for N-Me PProDOP, 2.9 eV for N-PrS PProDOP and 3.2 eV for the other polymers, which are noticeably higher than that of PProDOP (2.2 eV). The blue shift relative to PProDOP, can be explained by the steric effect of the N-substituent. The ability to control the band gap with steric interaction is especially useful for electrochromic polymers as a broad range of colors can be easily obtained in a single polymer family. The significant blue shift obtained by adding an N-substituent to the ProDOP ring opens up the use of these materials as anodically coloring polymers, which are colorless in the neutral state and become colored upon doping, yet undergo their redox switch at a sufficiently low potential to yield the long lifetimes shown above Neutral N-Gly PProDOP and N-PrS PProDOP absorb only in the UV range thus causing them to be transparent and colorless while N-Me and N-Pr PProDOPs retain a residual coloration (e.g. light purple in the case of N-Me PProDOP).

Upon oxidation, the π to π* transition is depleted at the expense of a broad and intense absorption band centered in the near-infrared (NIR) corresponding to the low energy charge carriers. The tail of this NIR band as well as an intermediate band in the visible region are responsible for the coloration of the polymer films. The intensity of this coloration is, at best, moderate when compared to the neutral colored states of the PProDOP parent or the dioxythiophene polymers.

Figure 32:
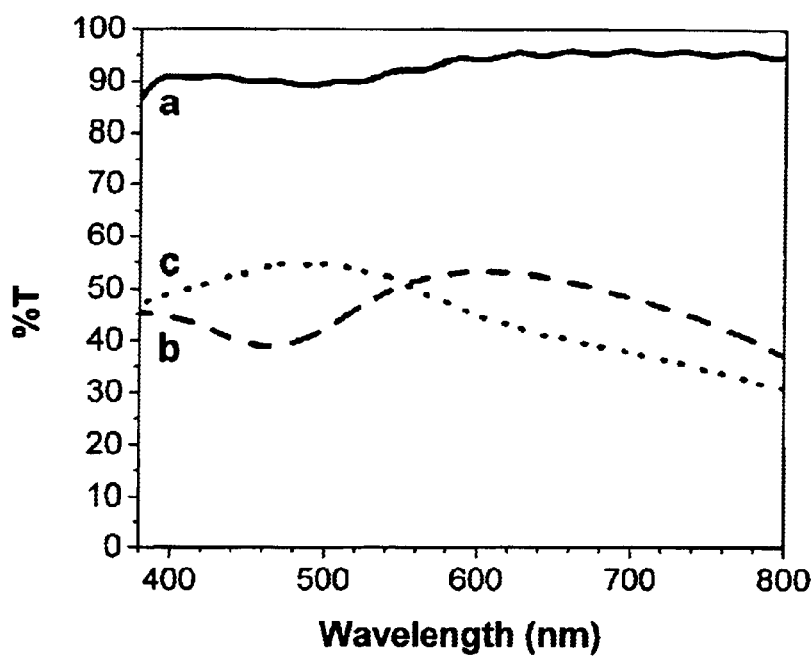
FIG. 32. Transmittance of N-Gly PProDOP in the visible region as a function of wavelength (nm) for 3 different oxidation states: (a) neutral, (b) low doping level, (c) high doping level.

The visible light transmittance (%T) of N-Gly PProDOP at different doping levels is presented in FIG. 32. In the neutral state (−300 mV vs. Fc/Fc$^+$), the polymer film is highly transparent and transmits more than 90% of the light over the entire visible spectrum. At an intermediate potential (+60 mV), the transmittance shows a minimum of 40% at about 470 nm. When the polymer reaches its highest oxidation level (+700 mV), the transmittance below 550 nm increases at the expense of the transmittance at longer wavelengths. The transmittance minimum at 470 nm disappears, and now corresponds to a maximum of the transmittance in the visible (about 55%). These changes in transmittance over the visible range of light have a great influence on the color of the polymer, which switches from a transparent colorless neutral state to a blue-doped state. N-Gly PProDOP is therefore a pure anodically coloring material, which is extremely rare among electrochromic polymers. On the other hand, with similar optical properties, N-PrS PProDOP has several advantages over N-Gly PProDOP. For instance, the deposition rate is much faster, the film quality is better, film conductivities are higher and the colors obtained are more saturated.

Conductivity and processability of N-PrS PProDOP. N-PrS PProDOP free standing films were prepared by galvanostatic deposition on glassy carbon electrodes from solutions of PC and water (94:6) containing 0.01 M monomer with and without 0.1 M LiClO$_4$ at room temperature. Room temperature conductivities of these free-standing films were measured using the four point probe technique and found to below, in the range of $10^{-4}-10^{-3}$ S/cm, in accordance with results reported in the literature for the N-substituted pyrrole derivatives. The resulting polymer films were completely soluble in water in both their oxidized and neutral forms. Due to the electropolymerization method used, monomer consumption is quite low by design making the polymer yields low. Even in the best instances, electropolymerization yields are on the order of 5–10%.

Electrochemically prepared N-PrS PProDOP free-standing films were dissolved in water and the solutions subsequently cast onto glassy carbon button electrodes, followed by the evaporation of water. Cyclic voltammograms of these films in monomer free organic electrolyte showed the polymer to be electroactive with CV response quite similar to that of the electrodeposited films, demonstrating that this polymer is processable and does not lose its electroactivity upon dissolution and subsequent reprecipitation.

To study the optical properties of aqueous solutions of N-PrS PProDOP, polymer films were prepared on a Pt foil working electrode from a solution of 0.01 M monomer in 0.1 M LiClO$_4$/PC:H$_2$O (94:6) using a current density of 0.04 mA/cm$^2$ and a charge density of 0.45 C/cm$^2$. The films were held at a neutralization potential (−0.7 V vs. Ag/Ag$^+$) for 15 minutes, washed with ACN and acetone and dried under vacuum, then subsequently dissolved in 3.0 mL water for spectral investigations. The neutral polymer solution showed a π–π* transition at 285 nm with an absorption onset of 3.45 eV. These values are blue-shifted with regard to the values obtained for thin solid films (see Table 1) as expected as the polymer chains can adopt more twisted average conformations. Similar shifts were reported by Patil et.al. for poly-3-(alkane sulfonate) thiophenes.

Figure 33A:
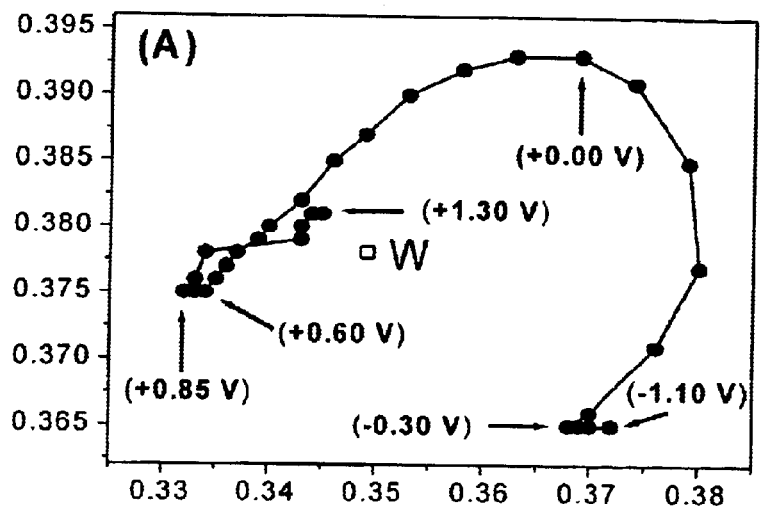
FIG. 33. Colorimetry (x-y diagram) of (A) N-Me PProDOP, (B) N-Gly PProDOP and (C) N-PrS PProDOP FIG. 34. Relative luminance of N-Me PProDOP (○) and N-Gly PProDOP (●) as a function of the potential applied vs. $Fc/Fc^+$.
Figure 33B:
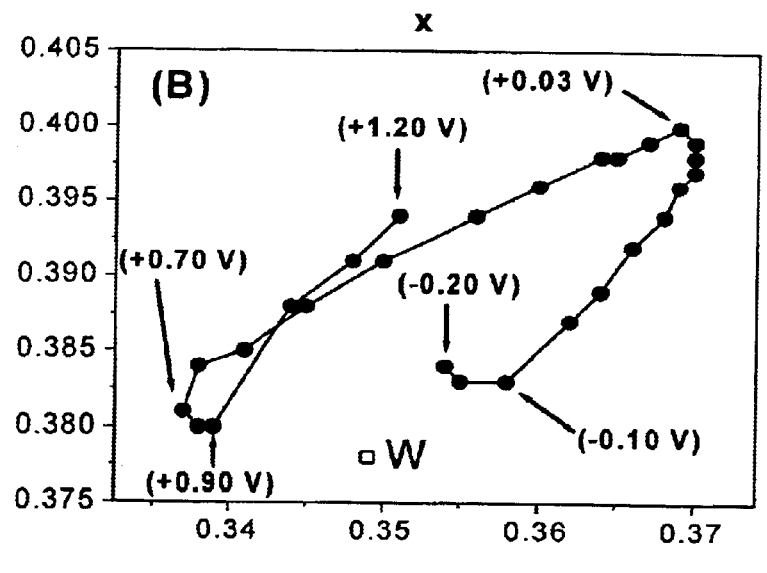
Figure 33C:
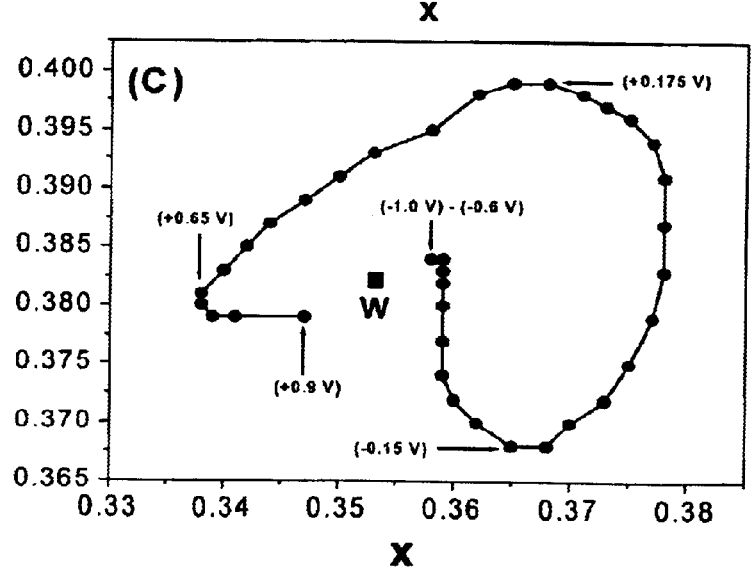

Colorimetry. The results above demonstrate that N-Me, N-PrS and N-Gly PProDOPs have unique electrochemical and optical properties. As color is the most important property for consideration in electrochromic applications, we studied the above polymers by colorimetry and express the results in the CIE 1931 Yxy and CIE 1976 L*a*b* color spaces as recommended by the "Commission Internationale de l'Eclairage" (CIE). The colors observed for each polymer at different doping levels are summarized in Table 2. Upon oxidation, N-Me PProDOP changes from purple to blue through a dark green intermediate. It should be noted that a deep purple color does not have a single dominant wavelength located on the spectral locus of the CIE 1931 diagram, and results from the addition of several absorptions located at different wavelengths in the visible spectrum. The color track of this polymer in the CIE 1931 Yxy color space is shown in FIG. 33A. Between −1.10 V and −0.30 V vs. Fc/Fc$^+$, the xy coordinates are almost invariant signifying no visible change in the color of the polymer. When the potential is stepped up to +0.85 V, the dominant wavelength of the light transmitted through the material decreases as a result of charge carrier formation, showing absorptions at longer wavelengths. At higher potentials, the transitions associated with the charge carriers decrease in intensity, as shown by spectroelectrochemistry, thus resulting in a lower absorption at longer wavelengths and therefore a decrease of the dominant wavelength. This behavior is quite typical for electrochromic polymers. The color tracks of N-Gly PProDOP and N-PrS PProDOP, shown in FIGS. 33B and C respectively, present similar features. However, the xy coordinates of these polymers in the neutral state are in the proximity of the white point (x=0.349, y=0.378), indicating that the materials are colorless. As seen in Table 2, N-Gly PProDOP and N-PrS PProDOP change upon oxidation from colorless to blue-grey through different shades including light pink and grey. These colors are quite different from those observed in PProDOP, which switches from orange to light blue-grey through brown.

Figure 34:
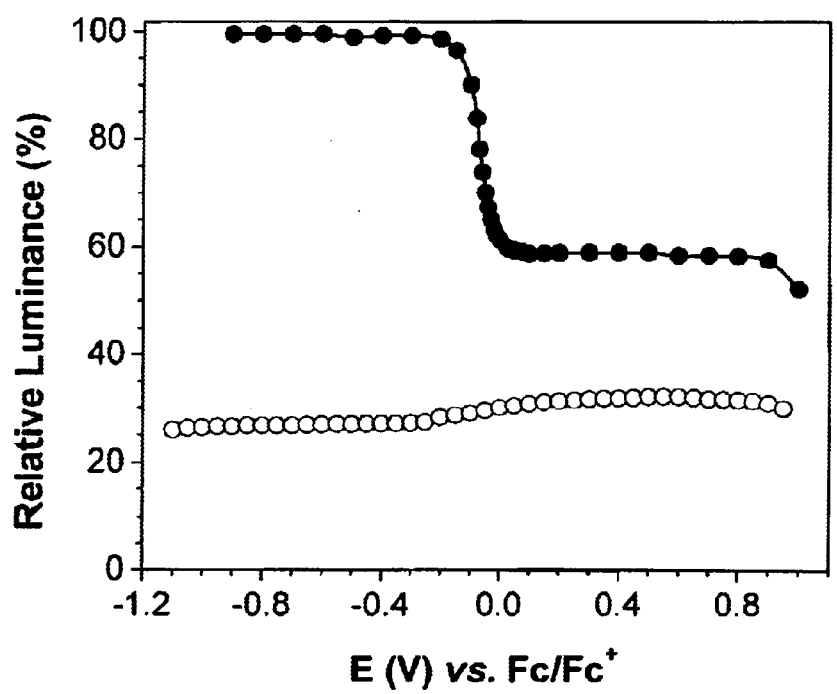

The luminance, which is a coordinate in the Yxy color space, represents the brightness of a color as seen by the human eye. It is also very informative since with only one value, it provides information about the perceived transparency of a sample over the entire visible range of light. %Y is different from %T (single wavelength) as it takes into account the full spectrum and light sensitivity of the human eye, which is not constant over the entire visible range. Relative luminance (%Y) changes of N-Me and N-Gly PProDOP are presented in FIG. 34. Again, the behavior of these polymers is different from that of PProDOP, which has a lower luminance when neutral than in the doped state, and also presents a minimum at intermediate potentials (darkest state corresponding to a brown color). N-Me PProDOP shows a slightly lower luminance in the neutral state (27%) than in the doped state (32%), but the response is relatively featureless. As emphasized previously, the behavior of N-Gly PProDOP is quite exceptional for an electrochromic polymer and is confirmed by the luminance measurements, which show that the polymer film has a luminance of almost 100% in the neutral state corresponding to a colorless and completely transparent material. The luminance remains almost unchanged when the potential is stepped up to −0.20 V vs. $Fc/Fc^+$, then decreases abruptly to about 55% at −0.10 V and stabilizes at this value up to +0.85 V vs. $Fc/Fc^+$. The difference in behavior between N-Gly PProDOP and N-Me PProDOP is closely related to their relative band gaps. In fact, the π to π* transition in N-Gly PProDOP is entirely located in the UV range and even the tail of this transition does not overlap with the visible range of light. As a result, the depletion of the π to π* transition has no effect on the color of the polymer. Therefore, only the transitions associated with the charge carriers give rise to a visible color. N-PrS ProDOP shows similar behavior. The ability to switch between a colorless neutral state and a doped blue-grey state confers to these electrochromics the rare property of being truly anodically coloring.

Conclusions. In summary, a series of N-substituted PProDOPs has been prepared showing reversible and long-lived electrochemistry, along with useful electrochromic properties. Low half wave oxidation potentials confer a high degree of stability in the doped state since air and moisture are not likely to reduce the oxidized forms. The N-substitution allows a fine-tuning of the band gap and therefore of the optical properties of the resulting materials. The ability to design and synthesize pure anodically coloring polymers has been demonstrated with N-PrS and N-Gly PProDOP. The ease with which these new compounds can be derivatized opens up a wide range of possibilities for the production of advanced polymers for display applications including electrochromic devices. In particular, the introduction of proper substituents on the propylenedioxy ring led to soluble and self-doping anodically coloring polymers, which might be of high interest for processable electrochromics in display applications.

EXAMPLE 8
Gold Patterning via Metal Vapor Deposition 3,4-Ethylenedioxythiophene (EDOT), obtained commercially, was purified by column chromatography. 2,5-bis(3,4-Ethylenedioxythiophene)-1,4-didodecyloxybenzene (PBEDOT-B(OC$_{12}$H$_{25}$)$_2$) was synthesized according to methods known in the art. Propylene Carbonate (PC) was used without any purification. Tetrabutylammonium perchlorate (TBAP) (Aldrich Chemical Co., Inc. Milwaukee, Wis.; >99%) was used as electrolyte during electrosynthesis and polymer characterizations. For solid-states device, poly(methylmethacrylate) (PMMA) containing tetrabutylammonium trifluoromethanesulfonate was prepared according to methods known in the art.

Fabrication of the patterned electrodes was performed using masks. Negatives were cut into a 4.5 cm×4.5 cm, 0.25 mm thin brass sheet as shown in FIGS. 35A–C. The negatives comprise 2 independent (FIG. 35A); 2×2 twinned (FIG. 35B); or 3×3 (FIG. 35C) pixels. Pourous polycarbonate membranes (Osmonics Inc., 10 μm pore size) were used as metallizable substrates. The membranes were sandwiched between glass and the covering masks (see FIG. 35D). The sandwich was attached to a rotative handler in a high vacuum chamber. Gold (99.99%) was deposited on the membrane using a thermal metal evaporation technique (Denton Vacuum, DV-502A) until the thickness reached 50 nm (to afford good conductivity and to prevent the sealing of the pores by the gold).

Films were prepared either potentiostatically at 1.2 V (PEDOT deposition) or by multisweep cyclic voltamograms from −0.7 V to 1.3 V (PBEDOT-B(OC$_{12}$H$_{25}$)$_2$). The charge ($Q_p$) was 75 mC (PEDOT) and 30 mC (bisEDOT-Phen) during the deposition process. Two kinds of counter electrodes (CE) could be used. The first was composed of a PEDOT layer anodically polymerized on gold/Mylar thin sheet. The second was a second metallized membrane coated by a PEDOT layer. Independent of the area of the patterned electrode, the necessary charge for the deposition of the PEDOT is the same as the charge deposited on the working electrode.

For polymer electrodeposition and characterization, two cells were used in parallel. The first one contained 0.05M of monomers in 0.1M TBAP/PC fitted with a Ag pseudo-reference (potentials were calibrated using Fc/Fc$^+$, assumed to be +0.07 V vs. Ag/Ag$^+$ reference), a 2×2 cm$^2$ Pt counter electrode (CE) and gold-metallized membrane as the working electrode. The second cell was monomer-free and contained 0.1M TBAP in PC to allow the polymer characterization.

Figure 35F:
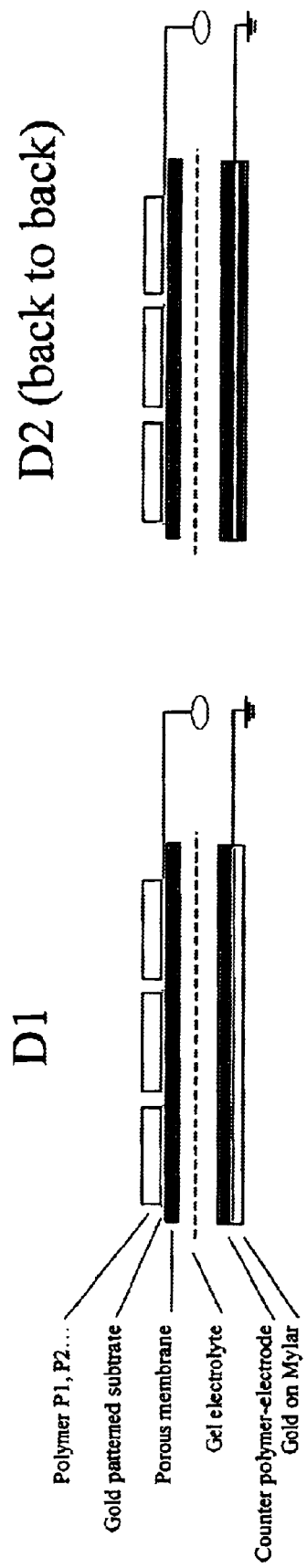

Depending on the nature of the CE, two devices, D1 and D2, can be constructed (see FIG. 35F). In D1, the PEDOT-CE faces towards the working electrode (WE). This is contrasted with to D2, where both electrodes are assembled back to back. Typically, the membrane and the CE are sandwiched between two plastic sheets and encased in gel electrolyte. EDOT and PBEDOT-B(OC$_{12}$H$_{25}$)$_2$ have the same transparent character upon oxidation while, upon reduction, PEDOT appears dark blue and PBEDOT-B (OC$_{12}$H$_{25}$)$_2$ is red-purple (see FIG. 36).

Our metallized membranes allow for the fast percolation of electrolyte through the membrane on the back of the polymers during charge/discharge processes. As a result, we expected fast color switching in a solid-state device, comparable to that observed for the switching using classical electrochemical setups in solution. FIG. 35E shows the pattern shapes on the glass substrate, the membrane, and the penetration of the gold through the pores. This illustrates that the metallized membrane is also porous and that ion transport can occur in solid-state devices. The penetration of the gold through the pores can result in a sufficient amount of gold being left on the internal walls of the various pores such that electrical contact can be made to the gold on the top of the membrane by contacting the bottom of the membrane and, therefore, the gold on the internal walls of the pores. This can allow electrical connection between the electrode pads on top of the membrane to be made by contacting the bottom of the membrane.

We have constructed a device comprised of a single PEDOT pixel as an active switching surface. PC was shown to be a useful solvent to perform electrochemistry with polycarbonate membranes. The polymerization charge density is 50 mC/cm$^2$ and the film is homogeneously deposited on the entire membrane suggesting that no surface resistance induces ohmic drop on the electrode. Upon oxidation, the PEDOT layer appear completely transmissive in the visible range, while it is completely absorptive in the reduced state as expected.

The one-pixel device was built according to the D2 procedure (FIG. 35E) using the same amount of PEDOT at the CE. FIG. 37A shows the oxidized (left) and reduced (right) state of the PEDOT during switching steps. The charge/discharge time dependence graph is shown in FIG. 37B. This device could be reversibly switched between the bleached and colored states several hundred times without any consequent loss of electroactivity. The completion of the transition occurs in 1 second.

A 2×2 pixel device (FIG. 38) allowed us to develop dual-polymer electrochromic devices. First, PEDOT was deposited on 2 pixels, using a potentiostatic method at 1.2 V until 75 mC of charge passed. Second, PBEDOT-B (OC$_{12}$H$_{25}$)$_2$ was deposited on the other pixels using multiple CV scans between −0.7 and +1.3 V. This allowed uniform deposition on all the pixels. The final deposition charge for this step was adjusted to 30 mC to ensure the same bleached state of the oxidized polymer while the reduced state remains very red colored. FIGS. 39A–39C gives the CV in free-monomer solution for PEDOT (39A), PBEDOT-B (OC$_{12}$H$_{25}$)$_2$ (39B) and both films coupled together (39C). FIG. 38 shows a photograph of the dual-polymers coated membrane at two extreme stages (bleach and colored). FIG. 40 illustrates the charge of the device in solution showing the bleached-to-colored transition in the range of a second.

EXAMPLE 9
Line Patterning Electrodes for Electrochromic Devices

Computer generated designs were printed on a plain transparency material. Deposition of gold on non-printed areas was carried out using the procedures given in U.S. Pat. No. 3,676,213 (which is hereby incorporated by reference in its entirety). Removal of printed lines/areas after gold deposition was accomplished by sonicating the substrate in toluene.

Electrode designs used in this work are shown in FIGS. 35A–35C, 41, and 49A–49B, and can be printed using a laser printer on a plain transparency material. White regions represent where the gold coating can take place. Black lines and areas (printer ink) were removed after gold deposition by sonicating in toluene solution for 20 seconds. Surface resistivity between patterned lines was greater than 20 MΩ/□. Optical micrographs of interdigitated substrates in different magnifications (FIGS. 50A–50C) proved the selected deposition of gold on regions where ink is not present. The lateral resolution of the metallization was determined to be ∼30 μm (FIG. 50C).

Line patterning methods benefit from the difference in reaction of the coating material to the substrate and the printed lines on it. The commercial dispersion of PEDOT ("Baytron P", Bayer Corp.) wets plain transparency paper but not the printed lines. Multiple coatings of PEDOT were applied on printed substrates (S$_1$, S$_2$, and S$_3$, where the subscript indicates the number of coatings). The surface resistivities were measured to be 40.9, 15.4, and 10.8 kΩ/□ for S$_1$, S$_2$, and S$_3$, respectively. Since the coating is carried by smearing the PEDOT on the transparency film by a test tube, these values only give a rough idea about the increase of conductivity by increasing the number of coats. The results suggest that the second coating (S$_2$) has a greater effect on increasing the conductivity relative to the third. Interdigitated designs of PEDOT coated electrodes (FIGS. 41 and 42) were prepared using a computer aided design (CAD) software. Printer ink was removed by sonicating the transparency material in toluene solution. The color shown in FIG. 41 is the actual color of PEDOT:PSS coated films measured by a Minolta CS-100 colorimeter. A copper tape was attached to both ends of the films to provide electrical contact. The percent transmittance (%T) of the line patterned PEDOT coated films is on the order of 80% in the visible and near IR region vs. air as shown in FIG. 43.

ITO coated plastic transparent substrates (6 cm×4 cm) were interdigitated using line patterning (substrates comprised nine ITO coated conducting lines (Line width: 4 mm;), parallel to each other, separated by non-conducting gaps (Gap width: 1 mm) (e.g., FIGS. 41 and 47)). Electrochemical deposition of PEDOT on these substrates yielded uniform films and distinct colors with sharp color contrasts between the redox states (FIG. 48). White regions are non-conducting plastic and blue regions are ITO coated conducting plastic. 1

EC poly(3,4-ethylenedioxythiophene) (PEDOT) films were potentiostatically grown (E=1.10 V vs. Ag/Ag$^+$) on substrates from EDOT (0.01M) in TBAP (0.1M)/ACN. Monomer oxidation: 0.83 V vs. Ag/Ag$^+$. EC PBEDOT-Cz films were potentiostatically grown (E=0.5 V vs. Ag/Ag$^+$) on substrates from BEDOT-Cz in TBAP (0.1M)/ACN. Monomer oxidation: 0.48V vs. Ag/Ag$^+$. A platinum sheet is used as the counter electrode. All films are cleaned with monomer free electrolyte solution immediately after growth. EC PEDOT films are switched in electrolyte between −1.2 V and 1.2 V vs. Ag/Ag$^+$. EC PBEDOT-Cz films are switched in electrolyte between −1.2 V and 0.7 V vs. Ag/Ag$^+$.

Electrochemical deposition of the cathodically coloring, electrochromic (EC) PEDOT on line patterned substrates yielded homogenous films with very little IR drop. Electrochromic switching of PEDOT between its redox states was achieved by stepping the potential between −1.2 V (neutral, colored) and +1.2 V (doped, transmissive) vs. Ag/Ag$^+$ (FIG. 44A). EC PEDOT deposits on every other line as a result of line patterning. Optical micrograph of the film proved that there are no shorts between the lines (FIG. 44B). The black spots on the micrograph are due to residual toner inks from the laser pointer. They do not result from electrodeposition because they also exist on the non-deposited and insulated sites.

In order to determine the electrochemical stability of films, chrono-coulometry (monitoring charge with time) experiments were performed by stepping the potential between −1.2 V (25 sec) and 1.2 V (25 sec) vs. Ag/Ag$^+$. Doping/dedoping charge was found to be ∼±1.5 mC/cm$^2$ with a maximum doping current ∼±0.12 mA/cm$^2$(i$_{max}$). The first 25 square-waves resulted in no decrease in i$_{max}$. After 200 square-waves, i$_{max}$ dropped to 0.08 mA/cm$^2$.

PBEDOT-Cz, a multiply colored, anodically coloring electrochromic polymer, is considered to be the complementary polymer for cathodically coloring EC PEDOT. It switches between pale yellow (reduced) and blue (fully oxidized) with an intermediate green color. FIG. 46 illustrates the color change of a PBEDOT-Cz film between its redox states in a three-electrode electrochemical cell. Quantitative measurement of color was carried out using a colorimeter. FIG. 45 shows the color change of PBEDOT-Cz on a Baytron P© line patterned electrode at various potentials based on the L*a*b values recorded by the colorimeter. Since the measurement area of the colorimeter is larger than the targeted area on the substrate, the color measured by the colorimeter does not exactly match with the color in the photograph (i.e., mixing of colors with neighboring lines occurs). Electrochromic switching of PBEDOT-Cz in TBAP is illustrated in FIG. 46.

Patterned electrodes of highly conductive metals (e.g., gold) are useful for the deposition of high quality conducting polymer films and fast EC switching. Vapor deposition techniques require high deposition temperatures (>400° C.) and very low pressures which bring constraints to substrate materials.

Line patterned substrates of gold were used to construct lateral EC devices. PEDOT was used as the active EC material and was electrochemically deposited on the lines from its monomer solution. The polymer deposition occurred on every other line as a result of line patterning. A solid-state device was assembled by depositing PEDOT on each set of IDE fingers separately. Gel electrolyte was applied on the substrate to provide ionic conductivity between electrically insulated lines. EC switching between deep blue and reflective gold states was observed (FIG. 51). Complete coloration/discoloration occurred in less than 3 seconds.

In another example, a dual patterned gold electrode was used to determine the effect of electrode design on switching characteristics (FIG. 52). To achieve this, EC PEDOT was separately deposited on both sides at equal deposition charges. The left rectangle was set to be the anode and the right rectangle was set to be the cathode (two electrode cell configuration). Switching of this device was accomplished in a liquid electrolyte by applying ±0.5 Volts (FIG. 52). Switching between redox states was less than 3 seconds. Solid-state assembly of this device, using the gel electrolyte as the ion-conducting medium, increased the switching time. The voltage required to switch the device also increased to ±1.5 V due to high solution iR drop between rectangles (FIG. 53).

EXAMPLE 10
ITO Scorching

Patterning of ITO/Glass substrates is possible by scorching methods. These methods require burning of ITO by a metal tip in a closed circuit using a power supply. Profilometric analysis of the scorched lines showed complete removal of ITO from the lines drawn by the metal tip. FIG. 54A shows an optical micrograph of a scorched line on an ITO/glass substrate. Lateral resolution of the lines was determined to be 60 $\mu$m. FIG. 54B shows the profilometric scan of a scorched line. Lines drawn on ITO/glass by this method resulted in insulation of patterned regions by >20 M$\Omega$.

Removal of ITO from the plastic substrates can be accomplished by simply scratching the plastic substrate with a metal blade using a plastic ruler. A pattern comprising the letters U and F was designed in Microsoft Word 2000 Paint software and this pattern was drawn on ITO coated polyester using a metal tip (FIG. 55A). This process mechanically removed ITO from the plastic surface. The patterned ITO substrate was then treated with a 2M HCl solution to remove any residue.

The scratched ITO/plastic electrode was then used for electrochemical deposition of poly(3-methylthiophene) (P3MTh). P3MTh is an electrochromic polymer, which reversibly switches between its red-orange (neutral) and blue (oxidized) states. P3MTh was deposited on the letters U and F separately. A lateral electrochromic device was constructed by assigning the letter U as the anode and the letter F as the cathode. The electrochromic switching of this device in liquid electrolyte is shown in FIG. 55B.

The file of this patent contains at least one drawing executed in color. Copies of this patent with color drawings will be provided by the Patent and Trademark Office upon request and payment of the necessary fee.

TABLE 1

| Polymer | $E_{ox/mon}(V)$ vs. Fc/Fc$^+$ | $E_{1/2}$ vs. Fc/Fc$^+$ (V) | $i_{pa}/i_{pc}$* | $\Delta E_p$* (mV) | $\lambda_{max}$ (nm) | $E_g$ (eV) |
|---|---|---|---|---|---|---|
| PProDOP | +0.58 | −0.89 | 1.39 | 160 | 482/523 | 2.2 |
| N-Me PProDOP | +0.50 | −0.24 | 1.35 | 92 | 330 | 3.0 |
| N-Pr PProDOP | +0.51 | −0.16 | 1.02 | 8 | 306 | 3.4 |
| N-Oct PProDOP | +0.52 | −0.14 | 1.02 | 6 | — | — |
| N-Gly PProDOP | +0.54 | −0.13 | 0.99 | 2 | 306 | 3.4 |

*Scan rate: 20 mV/s

TABLE 2

| Polymer | E(V) vs. Fc/Fc$^+$ | Y % | L | a | b | Color |
|---|---|---|---|---|---|---|
| N-Me PProDOP | −1.10 | 25.9 | 58 | 11 | 0 | deep purple |
| | −0.30 | 27.1 | 59 | 10 | 2 | |
| | −0.15 | 28.7 | 60 | 4 | 8 | |
| | 0.00 | 30.1 | 62 | −1 | 5 | dark green |
| | +0.10 | 30.8 | 62 | −3 | 3 | |
| | +0.20 | 31.3 | 63 | −3 | 0 | blue |
| | +0.50 | 32.2 | 64 | −4 | −3 | |
| | +0.70 | 31.7 | 63 | −5 | −4 | |
| N-Gly PProDOP | −0.60 | 99.6 | 98 | 0 | 4 | colorless |
| | −0.20 | 98.6 | 97 | 0 | 4 | |
| | −0.10 | 90.2 | 94 | 2 | 4 | light pink |
| | 0.00 | 61.3 | 81 | 1 | 12 | pink/grey |
| | +0.20 | 58.9 | 79 | −3 | 7 | grey |
| | +0.30 | 58.9 | 79 | −4 | 5 | |
| | +0.40 | 58.9 | 79 | −5 | 3 | |
| | +0.50 | 58.9 | 79 | −6 | 1 | blue/grey |
| | +0.70 | 58.5 | 79 | −6 | −1 | |

TABLE 3

SPECIFIC ELECTROCHROMIC POLYMERS

| Acronyms | Properties | Chemical Names |
|---|---|---|
| PEDOT | 1 | poly(3,4-ethylenedioxythiophene) |
| PProDOT | 1 | poly(3,4-propylenedioxythiophene) |
| PProDOT-Me$_2$ | 1 | poly(3,4-(2,2-dimethylpropylene)dioxythiophene) |
| PEDOP | 1 | poly(3,4-ethylenedioxypyrrole) |
| PProDOP | 1 | poly(3,4-propylenedioxypyrrole) |

TABLE 3-continued

SPECIFIC ELECTROCHROMIC POLYMERS

| Acronyms | Properties | Chemical Names |
|---|---|---|
| PProDOP-NPS | 1 | poly(N-(3-sulfonatopropoxy)-3,4-propylenedioxypyrrole) |
| PBEDOT-V | 1 | poly(1,2-bis(2-ethylenedioxythienyl)vinylene) |
| PProDOT-V | 1 | poly(1,2-bis(2-propylenedioxythienyl)vinylene) |
| PBEDOT-Pyr | 1, 2 | poly(2,5-bis(2-ethylenedioxythienyl)pyridine) |
| PBEDOT-B(OC$_{12}$H$_{25}$)$_2$ | | poly(1,4-bis(2-ethylendioxythienyl)-2,5-didodecyloxybenzene) |
| P3MTh | 1 | Poly(3-methylthiophene) |
| PBEDOT-Fu | 1 | poly(2,5-(2-ethylenedioxythienyl)furan) |
| PBEDOT-BP | 1 | poly(4,4'-(2-ethylenedioxythienyl)biphenyl) |
| PBEDOT-Cz | 1 | poly(3,6-(2-ethylenedioxythienyl)carbazole) |
| P3BTh | 1 | poly(3-butylthiophene) |

1 - p-type dopable compound
2 - n-type dopable compound

TABLE 4

GENERAL ELECTROCHROMIC POLYMERS

| Acronyms | Properties | Chemical Names |
|---|---|---|
| PTh | 1 | Polythiophene |
| Pfu | 1 | polyfuran |
| Ppy | 1 | Polypyrrole |
| PPV | 1, 2 | poly(1,4-phenylene vinylene) |
| MEH-PPV | 1 | 2-methoxy-5-ethylhexyloxy poly(1,4-phenylene vinylene) |
| PCz | 1 | Polycarbazole |
| PEDOT-alkyl | 1 | alkyl poly(3,4-ethylenedioxythiophene) |
| PEDOT-aryl | 1 | aryl poly(3,4-ethylenedioxythiophene) |
| PSNS | 1 | poly(2,5-(2-thienyl) pyrrole) |
| PV | 1 | Polyviologen |
| PM Phth | 1 | poly(metal phthalocyanines) |
| PBiEDOT | 1 | poly(5,5'-biethylenedioxythiophene) |
| PBEDOT-CNV | 1 | poly(1,2-(2-ethylene dioxythienyl) cyanovinylene) |
| PBTh-CNV | 1 | poly(1,2-(2-thienyl)cyanovinylene) |
| PBEDOT-PyrPyr(Ph)$_2$ | 1, 2, 3 | Poly[2,5-bis(2ethylenedioxythienyl)-diphenylpyridopyrazine] |

1 - p-type dopable compounds
2 - n-type dopable compounds
3 - possesses four (4) color states

TABLE 5

Exemplary Complementary Electrochromic Polymers

| Type | Film | State 1 | | State 2 |
|---|---|---|---|---|
| 1 | 1 | T | ↔ | C1 |
| 1 | 2 | T | ↔ | C2 |
| 2 | 1 | C1 | ↔ | C2 |
| 2 | 2 | C1 | ↔ | C3 |
| 3 | 1 | C1 | ↔ | C2 |
| 3 | 2 | C3 | ↔ | C4 |
| 4 | 1 | T | ↔ | C1 |
| 4 | 2 | T | ↔ | C1 |
| 5 | 1 | C1 | ↔ | C2 |
| 5 | 2 | C1 | ↔ | C2 |

TABLE 6

Exemplary Complementary EC Polymers and Colors Electrodes "same bias"

| Type | State 1 | | State 2 | |
|---|---|---|---|---|
| | + | | − | |
| 1 | T | ↔ | blue | PEDOT |
| 1 | T | ↔ | red | PBEDOT-B(OC$_{12}$H$_{25}$)$_2$ |
| 1 | T | ↔ | blue | PEDOT |
| 1 | T | ↔ | orange | PProDOP |
| 1 | T | ↔ | blue | PEDOT |
| 1 | T | ↔ | red | PEDOP |
| | + | | − | |
| 2 | blue | ↔ | red | P3MTh |
| 2 | gray | ↔ | orange | PProDOP |
| 2 | blue | ↔ | yellow | PBEDOT-Cz |
| 2 | blue | ↔ | red | P3MTh |
| 2 | blue | ↔ | yellow | PBEDOT-Cz |
| 2 | blue | ↔ | red | PBEDOT-B(OC$_{12}$H$_{25}$)$_2$ |
| 2 | blue | ↔ | yellow | PBEDOT-Cz |
| 2 | blue | ↔ | red | PBEDOT-Fu |

TABLE 7

Exemplary Complementary EC Polymers and Colors Electrodes "opposite bias"

| Type | +/− | | −/+ | |
|---|---|---|---|---|
| 3 | T | ↔ | blue | PEDOT |
| 3 | yellow T | ↔ | blue | PBEDOT-Cz |
| 3 | Blue | ↔ | yellow T | PBEDOT-Cz |
| 3 | Red | ↔ | blue T | PBEDOT-B(OC$_{12}$H$_{25}$)$_2$ |
| 3 | Red | ↔ | blue | P3MTh |
| 3 | Orange | ↔ | gray | PProDOP |
| 3 | T | ↔ | blue | PEDOT |
| 3 | Red | ↔ | blue | P3BT |

TABLE 8

General Patterning Methods

| Patterning Method | Resolution | Brief Description |
|---|---|---|
| Photolithographic techniques | ~1 μm; limited by light diffraction | Photon dependent direct writing techniques (e.g laser ablation). Complicated and expensive. |
| Micro-contact printing (μCP) | ~1–2 μm edge roughness. | Patterning of monolayer using a stamp allowing area selected polymerization. |
| Scanning Probe Microscopy | ~3 μm | SPM tip (ultra-micro electrode) writes lines of ploymers on the substrate. |
| Inkjet printing | Limited by printer resolution (5–100 μm) | Commercial inkjet printers can be used to print soluble polymers. |
| Screen Printing | ~10 μm | Requires processible (soluble) polymers. |
| Line Patterning | 2–30 μm | Uses the difference in reaction with the substrate and the printed lines on it. |

REFERENCES

1. J. Kido, M. Kimura, K. Nagai, *Science* 267, 1332 (1995).
2. I. D. Brotherston, D. S. K. Mudigonda, J. M. Osbron, J. Belk, J. Chen, D. C. Loveday, J. L. Boehme, J. P. Ferraris, D. L. Meeker, *Electrochim. Acta* 44, 2993 (1999).
3. I. Schwendeman, J. Hwang, D. M. Welsh, D. B. Tanner, J. R. Reynolds, *Adv. Mater.* 13, 634 (2001).

4. D. R. Rosseinsky, R. J. Mortimer, *Adv. Mater.* 13, 783 (2001).
5. R. D. Rauh, *Electrochim. Acta* 44, 3165 (1999).
6. C. Arbizzani, M. Mastragostino, A. Zanelli, *Solar Energy Materials and Solar Cells* 39, 213 (1995).
7. C. L. Lampert, *Solar Energy Materials and Solar Cells* 52, 207 (1998).
8. J. Kim, T. M. Swager, *Nature* 411, 1030 (2001).
9. H. Sirringhaus, N. Tessler, R. H. Friend, *Science* 280, 1741 (1998).
10. A. Montali, C. Bastiaansen, P. Smith, C. Weder, *Nature* 392, 261 (1998).
11. M. Granstrom, K. Petritsch, A. C. Arias, A. Lux, M. R. Andersson, R. H. Friend, *Nature* 395, 257 (1998).
12. B. C. Thompson, P. Schottland, K. Zong, J. R. Reynolds, *Chem. Mater.* 12, 1563 (2000).
13. L. Groenendaal, F. Jonas, D. Freitag, H. Pielartzik, J. R. Reynolds, *Adv. Mater.* 12, 481 (2000).
14. P. L. Burn, A. B. Holmes, A. Kraft, D. D. C. Bradley, A. R. Brown, R. H. Friend, R. W. Gymer, *Nature* 356, 47 (1992).
15. W. A. Gazotti, G. Casalbore-Miceli, A. Geri, A. Berlin, M. A. De Paoli, *Adv. Mater.* 10, 1522 (1998).
16. O. Inganas, T. Johansson, S. Ghosh, *Electrochim. Acta* 46, 2031 (2001).
17. G. A. Sotzing, J. R. Reynolds, P. J. Steel, *Adv. Mater.* 9, 795, (1997).
18. S. A. Sapp, G. A. Sotzing, J. R. Reynolds, *Chem. Mater.* 10, 2101 (1998).
19. S. A. Sapp, G. A. Sotzing, J. L. Reddinger, J. R. Reynolds, *Adv. Mater.* 8, 808 (1996).
20. R. D. Rauh, F. Wang, J. R. Reynolds, D. L. Meeker, *Electrochim. Acta* 46, 2023 (2001).
21. Deb, S. K. *Appl. Opt. Suppl.* 1969, 3, 192.
22. Monk, P. M. S.; Mortimer, R. J.; Rosseinsky, D. R. *Electrochromism: Fundamentals and Applications*; VCH, Weinheim, 1995.
23. Granqvist, C. G.; Azens, A.; Isidorsson, J.; Kharrazi, M.; Kullman, L.; Lindstroem, T.; Niklasson, G. A.; Ribbing, C.-G.; Roennow, D.; Stromme Mattsson, M.; Veszelei, M. *J. Non-Cryst. Solids* 1997, 218, 273.
24. Monk, P. M. S. *J. Electroanal. Chem.* 1997, 432, 175.
25. Bange, K. *Solar Energy Mat. Solar Cells* 1999, 58, 1.
26. Granqvist, C. G.; Azens, A.; Hjelm, A.; Kullman, L.; Niklasson, G. A.; Ribbing, C.-G.; Roennow, D.; Stromme Mattsson, M.; Veszelei, M.; G. Vaivars *Solar Energy* 1998, 63, 199.
27. Agnihotry, S. A.; Pradeep; Sekhon, S. S. *Electrochemica Acta* 1999, 44, 3121.
28. Rauh, R. D. *Electrochemica Acta* 1999, 44, 3165.
29. Tracy, C. E.; Zhang, J.-G.; Benson, D. K.; Czandema, A. W.; Deb, S. K. *Electrochemica Acta* 1999, 44, 3195.
30. Pennisi, A.; Simone, F.; Barletta, G.; Di Marco, G.; Lanza, L. *Electrochemica Acta* 1999, 44, 3237.
31. Meeker, D. L.; Mudigonda, D. S. K.; Osborn, J. M.; Loveday, D. C.; Ferraris, J. P. *Macromolecules* 1998, 31, 2943.
32. Mudigonda, D. S. K.; Meeker, D. L.; Loveday, D. C.; Osborn, J. M.; Ferraris, J. P. *Polymer* 1999, 40, 3407.
33. Brotherson, I. D.; Mudigonda, D. S. K.; Ocborn, J. M.; Belk, J.; Chen, J.; Loveday, D. C.; Boehme, J. L.; Ferraris, J. P.; Meeker, D. L. *Electrochimica Acta*, 1999, 44, 2993.
34. Byker, H. J. *Gentex Corporation*, U.S. Pat. No. 4,902, 108.
35. Mortimer, R. G. *Chem. Soc. Rev.* 1997, 26, 147.
36. Dautremont-Smith, W. C. *Displays I* 1982, 3.
37. Mortimer, R. J. *Electrochimica Acta* 1999, 44, 2971.
38. De Paoli, M.-A.; Casabollore-Miceli, G.; Girotto, E. M.; Gazotti, W. A. *Electrochimica Acta* 1999, 44, 2983.
39. Mastrogostino, M. *Applications of Electroactive Polymers*, Scrosati, B., ed.; Chapman and Hall: London, 1993.
40. Sapp, S. A.; Sotzing, G. A.; Reynolds, J. R. *Chem. Mater.* 1998, 10, 2101.
41. Kumar, A.; Welsh, D. M.; Morvant, M. C.; Piroux, F.; Abboud, K. A.; Reynolds, J. R. *Chem. Mater.* 1998, 10, 896.
42. Skotheim, T. A.; Elsenbaumer, R. L.; Reynolds, J. R. *Handbook of Conducting Polymers*, $2^{nd}$ ed.; Marcel Dekker: New York, 1998.
43. Nalwa, H. S. *Handbook of Organic Conductive Molecules and Polymers*; John Wiley and Sons: New York, 1997.
44. G. A. Sotzing, J. R. Reynolds, *J. Chem. Soc., Chem. Commun.*, 703 (1995).
45. G. A. Sotzing, C. A. Thomas, J. R. Reynolds, P. J. Steel, *Macromol.* 31, 3750 (1998).
46. Gritzner, G.; Kuta, G. *J. Pure Appl. Chem.* 1984, 56, 461.
47. Zong, K.; Reynolds, J. R. *J. Org. Chem.*, 2000, submitted.
48. Overheim, R. D.; Wagner, D. L. *Light and Color*, Wiley: New York, 1982, p.77.
49. Zotti, G.; Schiavon, G.; Berlin, A.; Pagani, G. *Chem. Mater.* 1993, 5, 430.
50. Waltman, R. J., Bargon, J. *Can. J. Chem.*, 1986, 64, 76.
51. Zotti, G.; Martina, S.; Wegner, G.; Schlüter, A. D. *Adv. Mater.* 1992, 4, 798.
52. Diaz, A. F.; Castello, J.; Logan, J. A.; Lee, W. Y. *J. Electroanal. Chem.* 1981, 129, 115.
53. Diaz, A. F.; Bargon, J. *Handbook of Conducting Polymers*, $1^{st}$ ed., vol. I, ed. Skotheim, T. J.; Marcel Dekker: New York; 1986, p.81.
54. Doblhofer, K.; Rajeshwar K. *Handbook of Conducting Polymers*, $2^{nd}$ ed., eds. Skotheim, T. J.; Elsenbaumer, R. L.; Reynolds J. R. ; Marcel Dekker: New York; 1998, p.531.
55. Thompson, B. C.; Schottland, P.; Zong, K.l Reynolds, J. R. *Chem. Mater.* 2000, submitted.
56. CIE; *Colorimetry* (Official Recommendations of the International Commision on Illumination), CIE Public. N°15, Paris, 1971.
57. Wyszecki, G.; Stiles, W. S. *Color Science*; Wiley: New York, 1982.
58. Nassau, K. *Color for Science, Art and Technology*, Elsevier: Amsterdam, 1998.
59. Gritzner, G.; Kuta, G. *J. Pure Appl. Chem.* 984, 56, 461.

We claim:

1. A composition of matter, comprising:
an anodically coloring polymer providing a band gap ($E_g$)>3.0 eV in its neutral state, being fully conjugated in its neutral state and having an oxidation potential less than 0.5 V versus a saturated calomel electrode (SCE).

2. The composition of claim 1, wherein said polymer comprises a poly (3,4-alkylenedioxyheterocycle).

3. The composition of claim 2, wherein said alkylenedioxyheterocycle comprises at least one selected from the group consisting of an alkylenedioxypyrrole, an alkylenedioxythiophene and an alkylenedioxyfuran.

4. The composition of claim 2, wherein said poly(3,4-alkylenedioxyheterocycle) comprises N-alkyl substituted poly(3,4-alkylenedioxypyrrole).

5. The composition of claim 4, wherein said N-alkyl substituted poly(3,4-alkylenedioxypyrrole) is N-Pr PProDOP, N-Gly PProDOP or N-propane sulfonated PPro-DOP (PProDOP-NPrS).

6. The composition of claim 2, wherein said poly(3,4-alkylenedioxyheterocycle) comprises poly(3,4-propylenedioxypyrrole).

7. The composition of claim 6, said poly(3,4-propylenedioxypyrrole) comprises N-alkyl substituted poly(3,4-propylenedioxypyrrole).

8. The composition of claim 7, wherein said N-alkyl substituted poly(3,4-propylenedioxypyrrole) is N-Pr PProDOP, N-Gly PProDOP or N-propane sulfonated PPro-DOP (PProDOP-NPrS).

9. The composition of claim 2, wherein said poly(3,4-alkylenedioxyheterocycle) comprises poly(3,4-ethylenedioxypyrrole).

10. The composition of claim 9, wherein said poly(3,4-ethylenedioxypyrrole) comprises N-alkyl substituted poly(3,4-ethylenedioxypyrrole).

11. The composition of claim 1, wherein said polymer has an oxidation potential in the range between −0.2 and −0.0 volts versus a saturated calomel electrode (SCE).

12. The composition of claim 1, wherein said polymer has an oxidation potential less than 0.0 volts versus a saturated calomel electrode (SCE).

13. The device of claim 12, wherein said oxidation potential is in the range between −0.2 and −0.0 volts.

14. The composition of claim 1, wherein said polymer has an oxidation potential less than 0.2 volts versus a saturated calomel electrode (SCE).

15. The composition of claim 1, wherein said oxidation potential is less than 0.4 volts.

16. An electrochromic device, comprising:

a first electrode;

a second electrode;

an anodically coloring polymer providing a band gap ($E_g$)>3.0 eV in its neutral state, being fully conjugated in its neutral state and having an oxidation potential less than 0.5 V versus a saturated calomel electrode (SCE) in electrical contact with said second electrode and a reducible species in contact with said first electrode, and an electrolyte interposed between said anodically coloring polymer and said first electrode, wherein said device is optically clear when a positive voltage is applied to said first electrode with respect to the second electrode, and colored upon application of a negative voltage to said first electrode with respect to said second electrode.

17. The device of claim 16, wherein said reducible species comprises a cathodically coloring material.

18. The device of claim 16, wherein said anodically coloring polymer comprises a poly(3,4-alkylenedioxyheterocycle).

19. The device of claim 18, wherein said alkylenedioxyheterocycle comprises at least one selected from the group consisting of an alkylenedioxypyrrole, an alkylenedioxythiophene and an alkylenedioxyfuran.

20. The device of claim 18, wherein said poly(3,4-alkylenedioxyheterocycle) comprises N-alkyl substituted poly(3,4-alkylenedioxypyrrole).

21. The device of claim 20, wherein said N-alkyl substituted poly(3 4-alkylenedioxypyrrole) is N-Pr PrroDOP, N-Gly PProDOP or N-propane sulfonated PProDOP (PProDOP-NPrS).

22. The device of claim 18, wherein said poly(3,4-alkylenedioxyheterocycle) comprises poly(3,4-propylenedioxypyrrole).

23. The device of claim 18, wherein said poly(3,4-alkylenedioxyheterocycle) comprises poly(3,4-ethylenedioxypyrrole).

24. The device of claim 16, wherein said oxidation potential is less than 0.4 volts.

25. The device of claim 16, wherein said device switches between an optically clear and a colored state in less than one second.

* * * * *

UNITED STATES PATENT AND TRADEMARK OFFICE
CERTIFICATE OF CORRECTION

PATENT NO. : 6,791,738 B2
DATED : September 14, 2004
INVENTOR(S) : Reynolds et al.

It is certified that error appears in the above-identified patent and that said Letters Patent is hereby corrected as shown below:

Column 4,
Line 31, please delete "0.1 M LiClO$_4$/CAN" and replace with -- 0.1 M LiClO$_4$/ACN --.

Column 11,
Lines 40-41, please delete "the group consisting of S, N, O, Si(R$_8$)$_2$, N-R$_7$, and P-R$_7$" and replace with -- the group consisting of C, S, N, O, Si(R$_8$)$_2$, N-R$_7$, and P-R$_7$ --

Signed and Sealed this

Ninth Day of August, 2005

JON W. DUDAS
*Director of the United States Patent and Trademark Office*